(12) United States Patent
Kobayashi

(10) Patent No.: US 10,872,456 B2
(45) Date of Patent: Dec. 22, 2020

(54) IMAGE PROCESSING DEVICE AND IMAGE PROCESSING METHOD

(71) Applicant: SONY CORPORATION, Tokyo (JP)

(72) Inventor: Goh Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/318,450

(22) PCT Filed: Jul. 14, 2017

(86) PCT No.: PCT/JP2017/025724
§ 371 (c)(1),
(2) Date: Jan. 17, 2019

(87) PCT Pub. No.: WO2018/021068
PCT Pub. Date: Feb. 1, 2018

(65) Prior Publication Data
US 2019/0228558 A1    Jul. 25, 2019

(30) Foreign Application Priority Data

Jul. 29, 2016 (JP) .................................. 2016-149883

(51) Int. Cl.
*G06T 15/04* (2011.01)
*G06T 15/20* (2011.01)
(Continued)

(52) U.S. Cl.
CPC .............. *G06T 15/04* (2013.01); *G06T 7/529* (2017.01); *G06T 7/55* (2017.01); *G06T 15/20* (2013.01); *G06T 19/00* (2013.01); *G06T 19/20* (2013.01)

(58) Field of Classification Search
CPC combination set(s) only.
See application file for complete search history.

(56) References Cited

U.S. PATENT DOCUMENTS

2003/0156117 A1* 8/2003 Higuchi .................. G06T 15/04
                                                                345/582
2005/0280711 A1* 12/2005 Ishii ....................... H04N 5/232
                                                                348/207.99
(Continued)

FOREIGN PATENT DOCUMENTS

| JP | 2006-014174 A | 1/2006 |
|----|---------------|--------|
| JP | 2014-095809 A | 5/2014 |

OTHER PUBLICATIONS

International Search Report and Written Opinion of PCT Application No. PCT/JP2017/025724, dated Oct. 10, 2017, 7 pages of ISRWO.

*Primary Examiner* — Wesner Sajous
(74) *Attorney, Agent, or Firm* — Chip Law Group

(57) ABSTRACT

An image processing device and an image processing method in which a home server that reproduces a 3-dimensional image merely by transmitting a viewing range based on a viewing position and a visual line direction and requesting texture images. The texture images are necessary to generate a 3-dimensional image from a request content server. A content server that groups a plurality of multi-camera units for each of cameras included in the multi-camera unit, sets a priority of the cameras for each group on the basis of an evaluation value of disposition of the cameras in each group, and transmits image data of a surface of the selected cameras in accordance with the set priority and the group selected in accordance with a visual field range of a user to a home server.

15 Claims, 61 Drawing Sheets

(51) Int. Cl.
*G06T 19/00* (2011.01)
*G06T 7/55* (2017.01)
*G06T 19/20* (2011.01)
*G06T 7/529* (2017.01)

(56) References Cited

U.S. PATENT DOCUMENTS

2014/0132706 A1 5/2014 Kira et al.
2018/0204381 A1* 7/2018 Kanatsu .............. H04N 13/282

* cited by examiner

FIG. 9

| FILE NAME | AZIMUTH ANGLE | ELEVATION ANGLE | ROTATION ANGLE | VISUAL LINE VECTOR (X, Y, Z) | | | VIEWPOINT POSITION INFORMATION (X, Y, Z) | | | HORIZONTAL ANGLE OF FIELD | VERTICAL ANGLE OF FIELD | NUMBER OF HORIZONTAL PIXELS | NUMBER OF VERTICAL PIXELS |
|---|---|---|---|---|---|---|---|---|---|---|---|---|---|
| posZ | 0° | 0° | 0° | 0 | 0 | +1 | 0 | 0 | 0 | 100° | 100° | 1024 | 1024 |
| negZ | −180° | 0° | 0° | 0 | 0 | −1 | 0 | 0 | 0 | 100° | 100° | 1024 | 1024 |
| posX | +90° | 0° | 0° | +1 | 0 | 0 | 0 | 0 | 0 | 100° | 100° | 1024 | 1024 |
| negX | −90° | 0° | 0° | −1 | 0 | 0 | 0 | 0 | 0 | 100° | 100° | 1024 | 1024 |
| posY | 0° | +90° | 0° | 0 | +1 | 0 | 0 | 0 | 0 | 100° | 100° | 1024 | 1024 |
| negY | 0° | −90° | 0° | 0 | −1 | 0 | 0 | 0 | 0 | 100° | 100° | 1024 | 1024 |

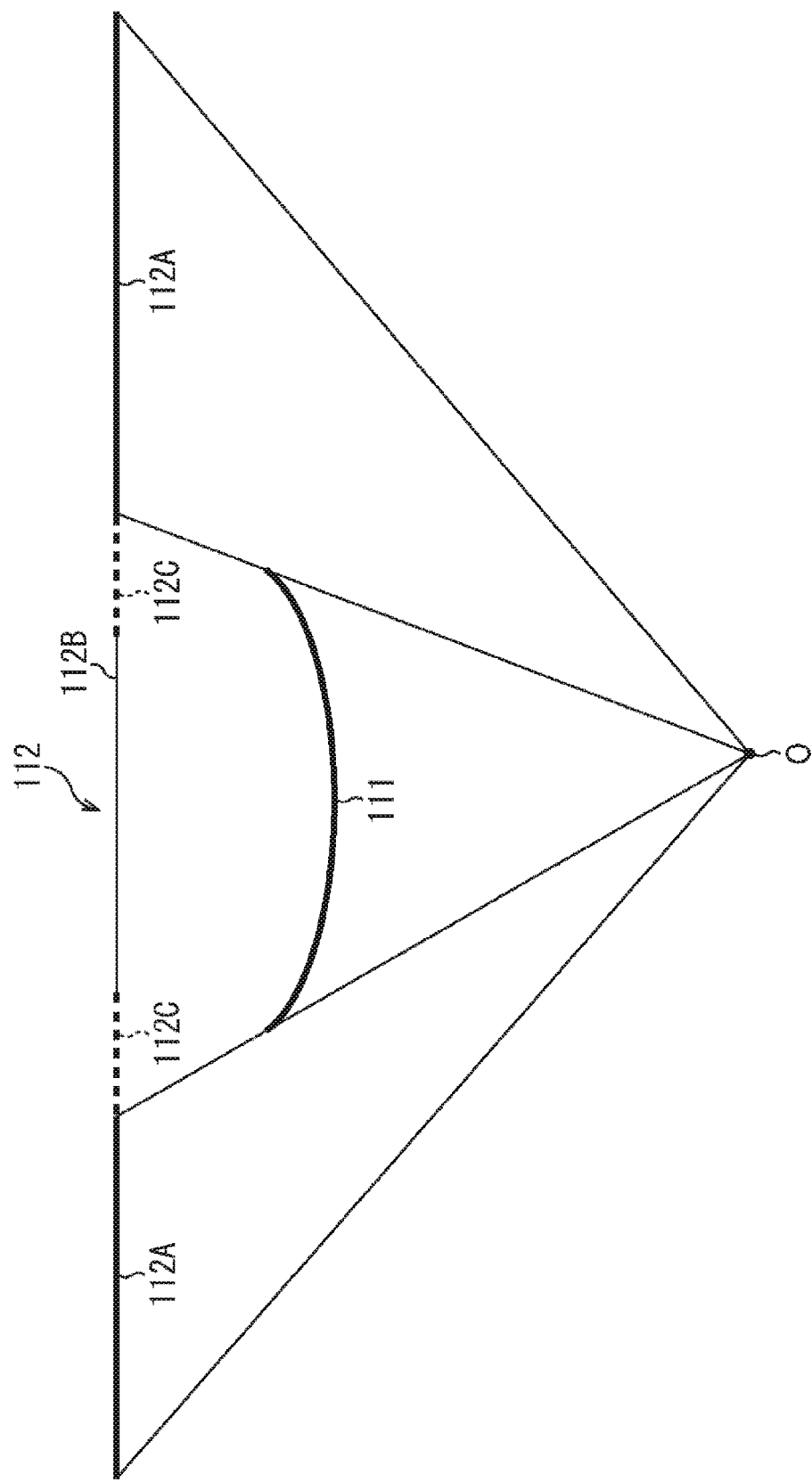

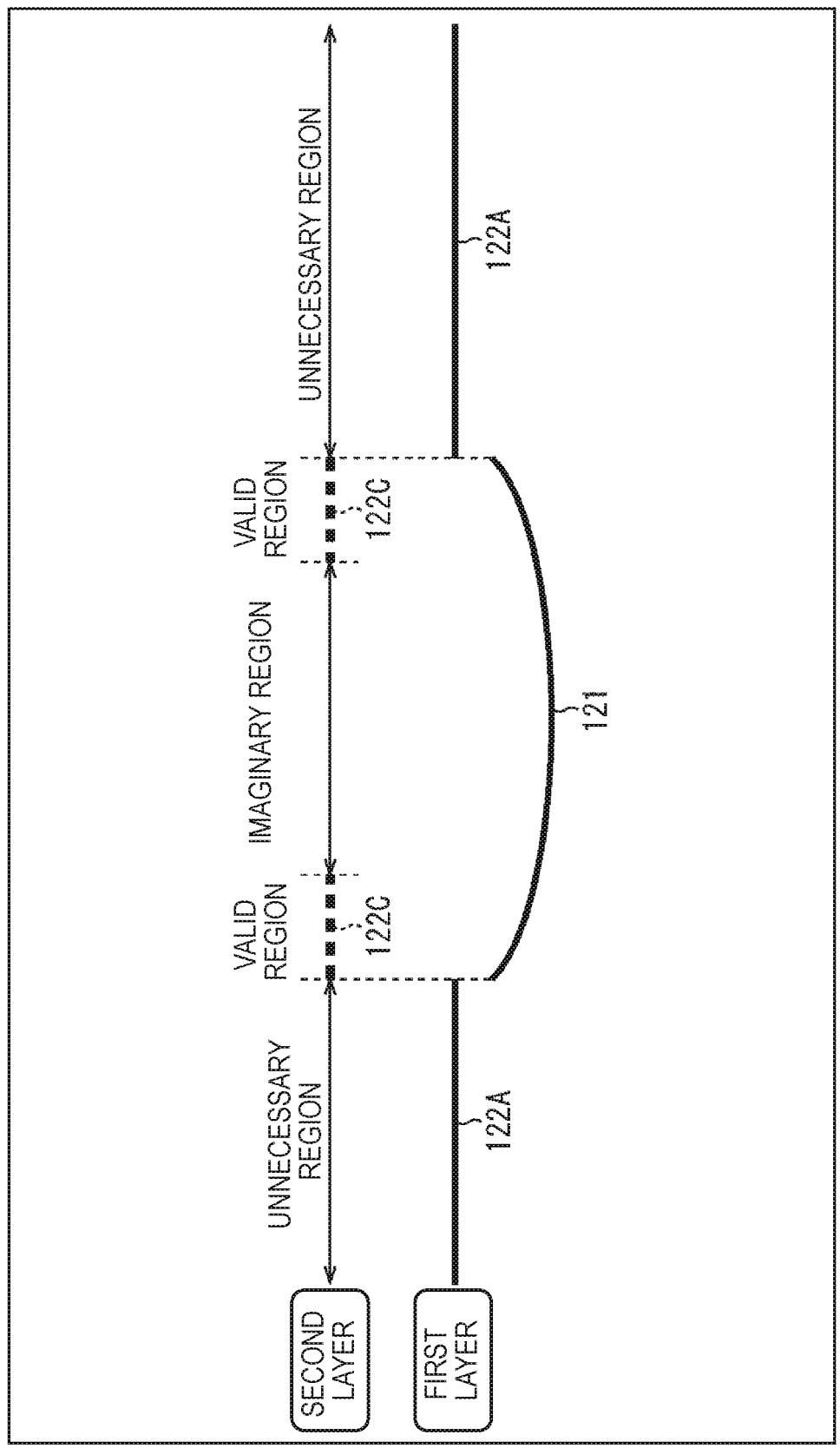

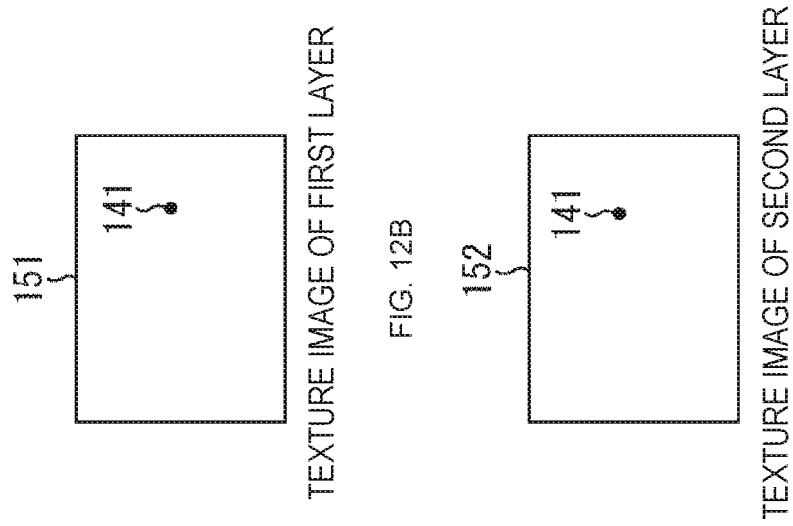

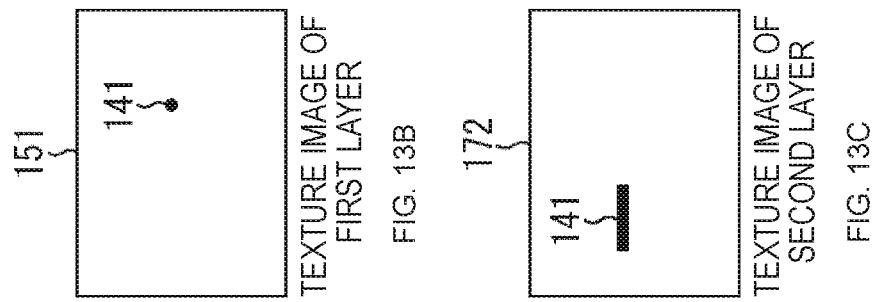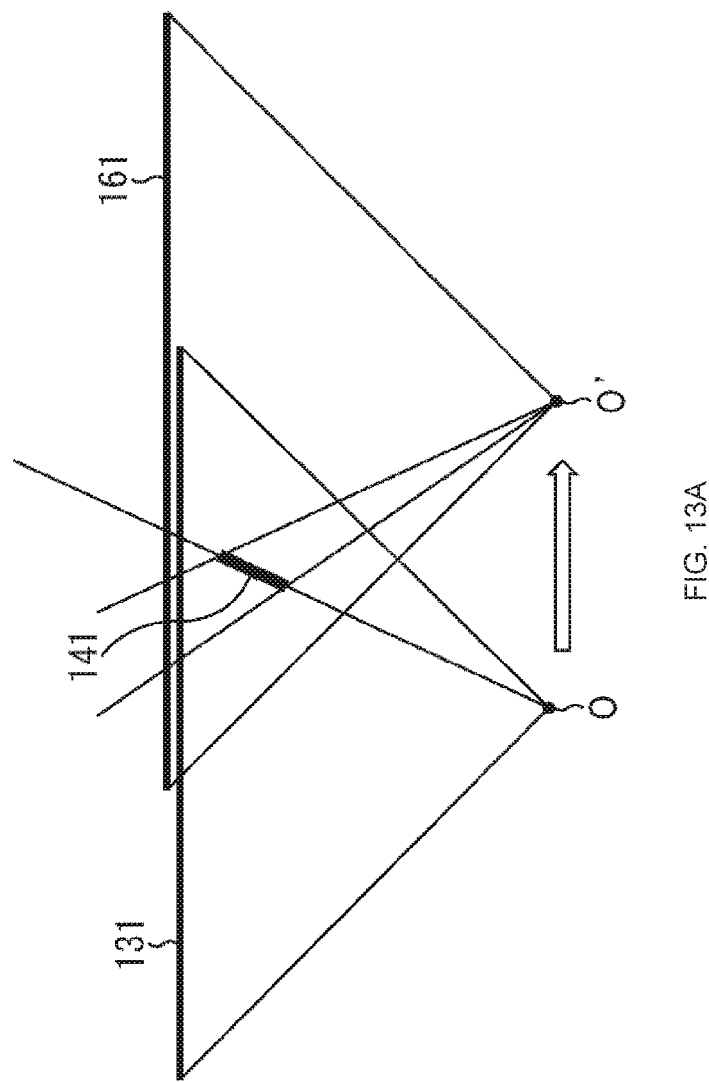

FIG. 15

| FILE NAME | AZIMUTH ANGLE | ELEVATION ANGLE | ROTATION ANGLE | VISUAL LINE VECTOR (X, Y, Z) | | | VIEWPOINT POSITION INFORMATION (X, Y, Z) | | | HORIZONTAL ANGLE OF FIELD | VERTICAL ANGLE OF FIELD | NUMBER OF HORIZONTAL PIXELS | NUMBER OF VERTICAL PIXELS |
|---|---|---|---|---|---|---|---|---|---|---|---|---|---|
| posZ2 | 0° | 0° | 0° | 0 | 0 | +1 | +a | 0 | 0 | 100° | 100° | 1024 | 1024 |
| negZ2 | −180° | 0° | 0° | 0 | 0 | −1 | −a | 0 | 0 | 100° | 100° | 1024 | 1024 |
| posX2 | +90° | 0° | 0° | +1 | 0 | 0 | 0 | +a | 0 | 100° | 100° | 1024 | 1024 |
| negX2 | −90° | 0° | 0° | −1 | 0 | 0 | 0 | −a | 0 | 100° | 100° | 1024 | 1024 |
| posY2 | 0° | +90° | 0° | 0 | +1 | 0 | 0 | 0 | +a | 100° | 100° | 1024 | 1024 |
| negY2 | 0° | −90° | 0° | 0 | −1 | 0 | 0 | 0 | −a | 100° | 100° | 1024 | 1024 |

FIG. 17

| FILE NAME | AZIMUTH ANGLE | ELEVATION ANGLE | ROTATION ANGLE | VISUAL LINE VECTOR (X,Y,Z) | | | VIEWPOINT POSITION INFORMATION (X,Y,Z) | | | HORIZONTAL ANGLE OF FIELD | VERTICAL ANGLE OF FIELD | NUMBER OF HORIZONTAL PIXELS | NUMBER OF VERTICAL PIXELS |
|---|---|---|---|---|---|---|---|---|---|---|---|---|---|
| posZ2 | 0° | 0° | 0° | 0 | 0 | +1 | +a | −a | 0 | 100° | 100° | 1024 | 1024 |
| negZ2 | −180° | 0° | 0° | 0 | 0 | −1 | −a | +a | 0 | 100° | 100° | 1024 | 1024 |
| posX2 | +90° | 0° | 0° | +1 | 0 | 0 | 0 | +a | −a | 100° | 100° | 1024 | 1024 |
| negX2 | −90° | 0° | 0° | −1 | 0 | 0 | 0 | −a | +a | 100° | 100° | 1024 | 1024 |
| posY2 | 0° | +90° | 0° | 0 | +1 | 0 | −a | 0 | +a | 100° | 100° | 1024 | 1024 |
| negY2 | 0° | −90° | 0° | 0 | −1 | 0 | +a | 0 | −a | 100° | 100° | 1024 | 1024 |

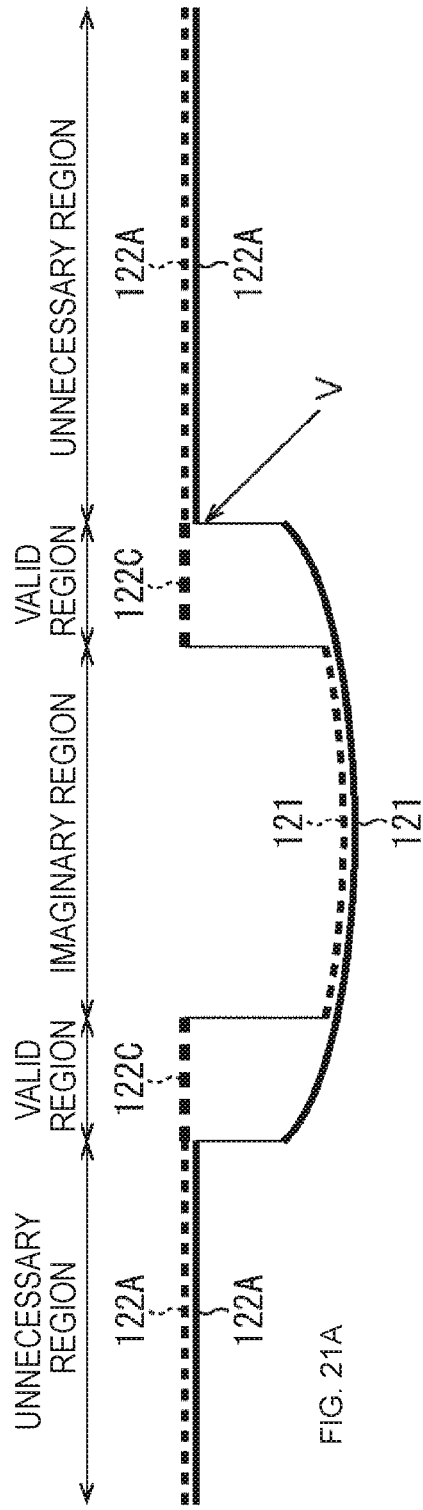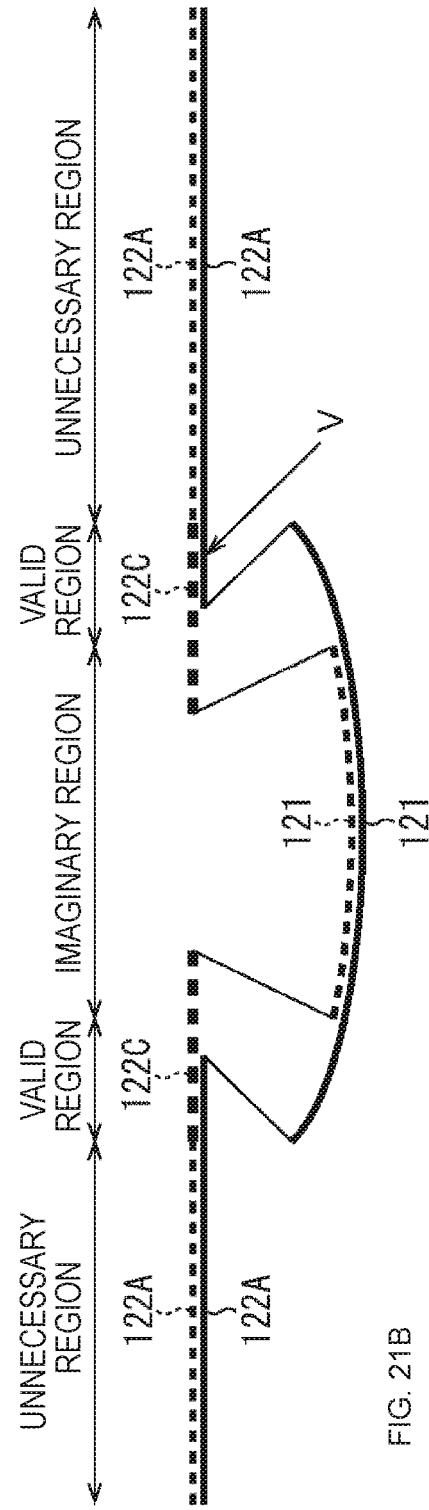

FIG. 40

| GROUP ID | CENTROID POSITION | REGION INFORMATION | GROUP TABLE ACQUISITION INFORMATION |
|---|---|---|---|
| 0 | (x0, y0, z0) | Region0 | URL0 |
| 1 | (x1, y1, z1) | Region1 | URL1 |
| 2 | (x2, y2, z2) | Region2 | URL2 |

FIG. 42

| GROUP ID | CENTROID POSITION | REGION INFORMATION | 3-DIMENSIONAL OBJECT POSITION | GROUP TABLE ACQUISITION INFORMATION |
|---|---|---|---|---|
| 0 | (x0, y0, z0) | Region0 | (xs0, ys0, zs0) | URL0 |
| 1 | (x1, y1, z1) | Region1 | (xs1, ys1, zs1) | URL1 |
| 2 | (x2, y2, z2) | Region2 | (xs2, ys2, zs2) | URL2 |

FIG. 44

| GROUP ID | CENTROID POSITION | REGION INFORMATION | 3-DIMENSIONAL SPACE DIVISION REGION POSITION | GROUP TABLE ACQUISITION INFORMATION |
|---|---|---|---|---|
| 0 | (x0, y0, z0) | Region0 | (xc0, yc0, zc0) | URL0 |
| 1 | (x1, y1, z1) | Region1 | (xc1, yc1, zc1) | URL1 |
| 2 | (x2, y2, z2) | Region2 | (xc2, yc2, zc2) | URL2 |

FIG. 45

| MULTI-CAMERA UNIT ID | SURFACE | INTERNAL PARAMETER | EXTERNAL PARAMETER | | TEXTURE IMAGE ACQUISITION INFORMATION | DEPTH IMAGE ACQUISITION INFORMATION |
|---|---|---|---|---|---|---|
| 1 | posZ | K10 | R10 | T10 | VIDEO URL10 | DEPTH URL10 |
| | negZ | K11 | R11 | T11 | VIDEO URL11 | DEPTH URL11 |
| | posX | K12 | R12 | T12 | VIDEO URL12 | DEPTH URL12 |
| | negX | K13 | R13 | T13 | VIDEO URL13 | DEPTH URL13 |
| | posY | K14 | R14 | T14 | VIDEO URL14 | DEPTH URL14 |
| | negY | K15 | R15 | T15 | VIDEO URL15 | DEPTH URL15 |
| 2 | posZ2 | K20 | R20 | T20 | VIDEO URL20 | DEPTH URL20 |
| | negZ2 | K21 | R21 | T21 | VIDEO URL21 | DEPTH URL21 |
| | posX2 | K22 | R22 | T22 | VIDEO URL22 | DEPTH URL22 |
| | negX2 | K23 | R23 | T23 | VIDEO URL23 | DEPTH URL23 |
| | posY2 | K24 | R24 | T24 | VIDEO URL24 | DEPTH URL24 |
| | negY2 | K25 | R25 | T25 | VIDEO URL25 | DEPTH URL25 |
| 3 | posZ3 | K30 | R30 | T30 | VIDEO URL30 | DEPTH URL30 |
| | negZ3 | K31 | R31 | T31 | VIDEO URL31 | DEPTH URL31 |
| | posX3 | K32 | R32 | T32 | VIDEO URL32 | DEPTH URL32 |
| | negX3 | K33 | R33 | T33 | VIDEO URL33 | DEPTH URL33 |
| | posY3 | K34 | R34 | T34 | VIDEO URL34 | DEPTH URL34 |
| | negY3 | K35 | R35 | T35 | VIDEO URL35 | DEPTH URL35 |

FIG. 51
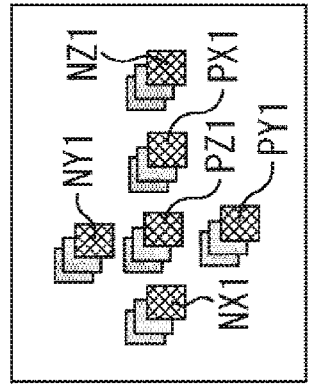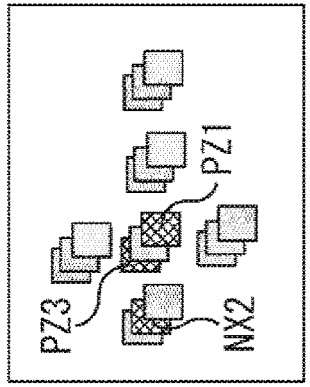
| MULTI-CAMERA UNIT ID | SURFACE | ENTIRE CELESTIAL SPHERE PRIORITY | ENCLOSURE PRIORITY |
|---|---|---|---|
| 1 | posZ1 | 2 | 2 |
| 1 | negZ1 | 2 | 0 |
| 1 | posX1 | 2 | 0 |
| 1 | negX1 | 2 | 0 |
| 1 | posY1 | 2 | 0 |
| 1 | negY1 | 2 | 0 |
| 2 | posZ2 | 0 | 0 |
| 2 | negZ2 | 0 | 0 |
| 2 | posX2 | 0 | 0 |
| 2 | negX2 | 0 | 1 |
| 2 | posY2 | 0 | 0 |
| 2 | negY2 | 0 | 0 |
| 3 | posZ3 | 0 | 2 |
| 3 | negZ3 | 0 | 0 |
| 3 | posX3 | 0 | 0 |
| 3 | negX3 | 0 | 0 |
| 3 | posY3 | 0 | 0 |
| 3 | negY3 | 0 | 0 | ly of multi-camera units that perform photographing in a plurality
IMAGE PROCESSING DEVICE AND IMAGE PROCESSING METHOD

CROSS REFERENCE TO RELATED APPLICATIONS

This application is a U.S. National Phase of International Patent Application No. PCT/JP2017/025724 filed on Jul. 14, 2017, which claims priority benefit of Japanese Patent Application No. JP2016-149883 filed in the Japan Patent Office on Jul. 29, 2016. Each of the above-referenced applications is hereby incorporated herein by reference in its entirety.

TECHNICAL FIELD

The present disclosure relates to an image processing device and an image processing method, and particularly, to an image processing device and an image processing method capable of generating a high-quality texture image of a predetermined viewpoint using an entire celestial sphere image.

BACKGROUND ART

There is a storage device that generates an entire celestial sphere image in which a captured image photographed at 360 degrees in the horizontal direction and 180 degrees in the vertical direction by a multi-camera unit is mapped to a 2D image (a planar image) and encodes and stores the entire celestial sphere image (for example, see Patent Literature 1).

In addition, there is a reproduction device that decodes an encoded stream of an entire celestial sphere image stored by a storage device and causes a texture image in a visual field range of a viewer to be displayed using the entire celestial sphere image obtained as a result. Such a reproduction device causes a texture image in a visual field range of a viewer at the time of viewing the surface of a 3D model in a visual line direction of the viewer from a viewpoint which is one point inside the 3D model in which an entire celestial sphere image is pasted to the surface of the 3D model such as a sphere or a cube to be displayed. Thus, an image photographed in a visual field range of a viewer from a predetermined viewpoint is reproduced.

CITATION LIST

Patent Literature

Patent Literature 1: JP2006-14174A

DISCLOSURE OF INVENTION

Technical Problem

However, there is a limit to display of an entire celestial sphere image formed using an image photographed by one multi-camera unit.

The present disclosure is devised in view of such circumstances and provides a technology capable of generating a high-quality texture image of various viewpoints by using a plurality of entire celestial sphere images photographed by a plurality of multi-camera units.

Solution to Problem

An image processing device according to a first aspect of the present disclosure is an image processing device including: a grouping unit configured to classify a plurality of cameras that acquire texture images necessary to generate 3-dimensional data of a subject into a plurality of groups; and a priority setting unit configured to set a priority of the plurality of cameras for each of the plurality of groups.

A group selection unit configured to receive a request for the texture images which are based on a viewing position and a visual line direction of a viewer, correspond to a visual field range of the viewer, and are necessary to generate the 3-dimensional data of the subject, and select the group of cameras that acquire the texture images including the subject within the visual field range of the viewer among the plurality of groups; and an image selection unit configured to select the texture images corresponding to the visual field range of the viewer in accordance with the priority of the cameras in the group selected by the group selection unit, and transmit the texture images can be further included.

An evaluation unit configured to calculate an evaluation value of disposition of the cameras with regard to the generation of the 3-dimensional data, on the basis of disposition of the cameras that photograph the texture images used to generate the 3-dimensional data of the subject, for each of the groups of the plurality of cameras that acquire the texture images including the subject and are classified into the plurality of groups can be further included. The priority setting unit can set the priority of the cameras on the basis of the evaluation value for each of the groups.

The texture images necessary to generate the 3-dimensional data of the subject can include an entire celestial sphere image and an enclosure image, and the priority setting unit can set an entire celestial sphere priority which is a priority of the plurality of cameras in a case of the entire celestial sphere image and set an enclosure priority which is a priority of the plurality of cameras in a case of the enclosure image for each of the groups on the basis of the evaluation value.

A request received by the reception unit can include information designating one of the entire celestial sphere image and the enclosure image, in a case in which the request includes the information designating the entire celestial sphere image, the image selection unit can select the texture images which are necessary to generate the entire celestial sphere image and correspond to the visual field range of the viewer in accordance with the entire celestial sphere priority of the cameras in the group selected by the group selection unit, and transmit the texture images, and in a case in which the request includes the information designating the enclosure image, the image selection unit can select the texture images which are necessary to generate the enclosure image and correspond to the visual field range of the viewer in accordance with the enclosure priority of the cameras in the group selected by the group selection unit, and transmit the texture images.

The plurality of cameras can be included in a plurality of multi-camera units that perform photographing in a plurality of directions, and the grouping unit can classify not only the plurality of cameras that acquire the texture images necessary to generate the 3-dimensional data of the subject but also the multi-camera units into the plurality of groups.

The priority setting unit can set the entire celestial sphere priority of the plurality of cameras in units of the multi-camera units for each of the plurality of groups on the basis of the evaluation value.

The grouping unit can classify the plurality of cameras into the plurality of groups on the basis of positions of the plurality of cameras.

A group information generation unit configured to generate group information regarding each of the plurality of groups can be further included. The group information can be information indicating a centroid position of a region including the cameras classified into the group.

The grouping unit can classify the cameras corresponding to the texture images into the groups for each 3-dimensional object corresponding to the 3-dimensional data generated using the texture images.

A group information generation unit configured to generate group information regarding each of the plurality of groups can be further included. The group information can be information indicating the 3-dimensional object corresponding to the group.

The grouping unit can classify the cameras corresponding to the texture images into the groups for each 3-dimensional space corresponding to the 3-dimensional data generated using the texture images.

A group information generation unit configured to generate group information regarding each of the plurality of groups can be further included. The group information can be information indicating the 3-dimensional space corresponding to the group.

An image processing method according to the first aspect of the present disclosure is an image processing method including steps of: classifying a plurality of cameras that acquire texture images necessary to generate 3-dimensional data of a subject into a plurality of groups; and setting a priority of the plurality of cameras for each of the plurality of groups.

According to the first aspect of the present disclosure, a plurality of cameras that acquire texture images necessary to generate 3-dimensional data of a subject are classified into a plurality of groups, and a priority of the plurality of cameras is set for each of the plurality of groups.

An image processing device according to a second aspect of the present disclosure is an image processing device including: a transmission unit configured to transmit a request for texture images which are based on a viewing position and a visual line direction of a viewer, correspond to a visual field range of the viewer, and are necessary to generate the 3-dimensional data of a subject; and a reproduction unit configured to reproduce the texture images selected and transmitted in accordance with a priority set in a plurality of cameras selected as a group corresponding to a visual field range of the viewer on the basis of the request and belonging to the group among a plurality of groups into which the plurality of cameras that acquire the texture images necessary to generate the 3-dimensional data of the subject are classified.

The request can include information designating one of the entire celestial sphere image and the enclosure image.

An image processing method according to the second aspect of the present disclosure is an image processing method including steps of: transmitting a request for texture images which are based on a viewing position and a visual line direction of a viewer, correspond to a visual field range of the viewer, and are necessary to generate 3-dimensional data of a subject; and reproducing the texture images selected and transmitted in accordance with a priority set in a plurality of cameras selected as a group corresponding to a visual field range of the viewer on the basis of the request and belonging to the group among a plurality of groups into which the plurality of cameras that acquire the texture images necessary to generate the 3-dimensional data of the subject are classified.

According to the second aspect of the present disclosure, a request for texture images which are based on a viewing position and a visual line direction of a viewer, correspond to a visual field range of the viewer, and are necessary to generate 3-dimensional data of a subject is transmitted, and the texture images selected and transmitted in accordance with a priority set in a plurality of cameras selected as a group corresponding to a visual field range of the viewer on the basis of the request and belonging to the group among a plurality of groups into which the plurality of cameras that acquire the texture images necessary to generate the 3-dimensional data of the subject are classified are reproduced.

Note that the advantageous effects described herein are not necessarily limiting and advantageous effects described in the present disclosure may also be obtained.

BRIEF DESCRIPTION OF DRAWINGS

FIG. 9 is a diagram illustrating a configuration example of a table of viewpoint position information and surface information of the first layer.

FIG. 10 is a diagram illustrating a position in a depth direction of a subject corresponding to a predetermined surface of the first layer.

FIG. 11 is a diagram illustrating a configuration example of texture images of the first layer and the second layer.

FIGS. 12A 12B, and 12C are explanatory diagrams illustrating examples of the texture images of the first layer and the second layer.

FIGS. 13A, 13B, and 13B are explanatory diagrams illustrating other examples of the texture images of the first layer and the second layer.

FIG. 15 is a diagram illustrating a first configuration example of a table of viewpoint position information and surface information of the second layer.

FIG. 17 is a diagram illustrating a second configuration example of a table of viewpoint position information and surface information of the second layer.

FIGS. 21A and 21B are explanatory diagrams illustrating an example of connection information.

FIG. 40 is a diagram illustrating a configuration example of a global table in the first classification method.

FIG. 42 is a diagram illustrating a configuration example of a global table in the second classification method.

FIG. 44 is a diagram illustrating a configuration example of a global table in the third classification method.

FIG. 45 is a diagram illustrating an example of a group table.

FIG. 51 is an explanatory diagram illustrating a priority table set by the priority determination unit in FIG. 46.

MODE(S) FOR CARRYING OUT THE INVENTION

Figure 60:
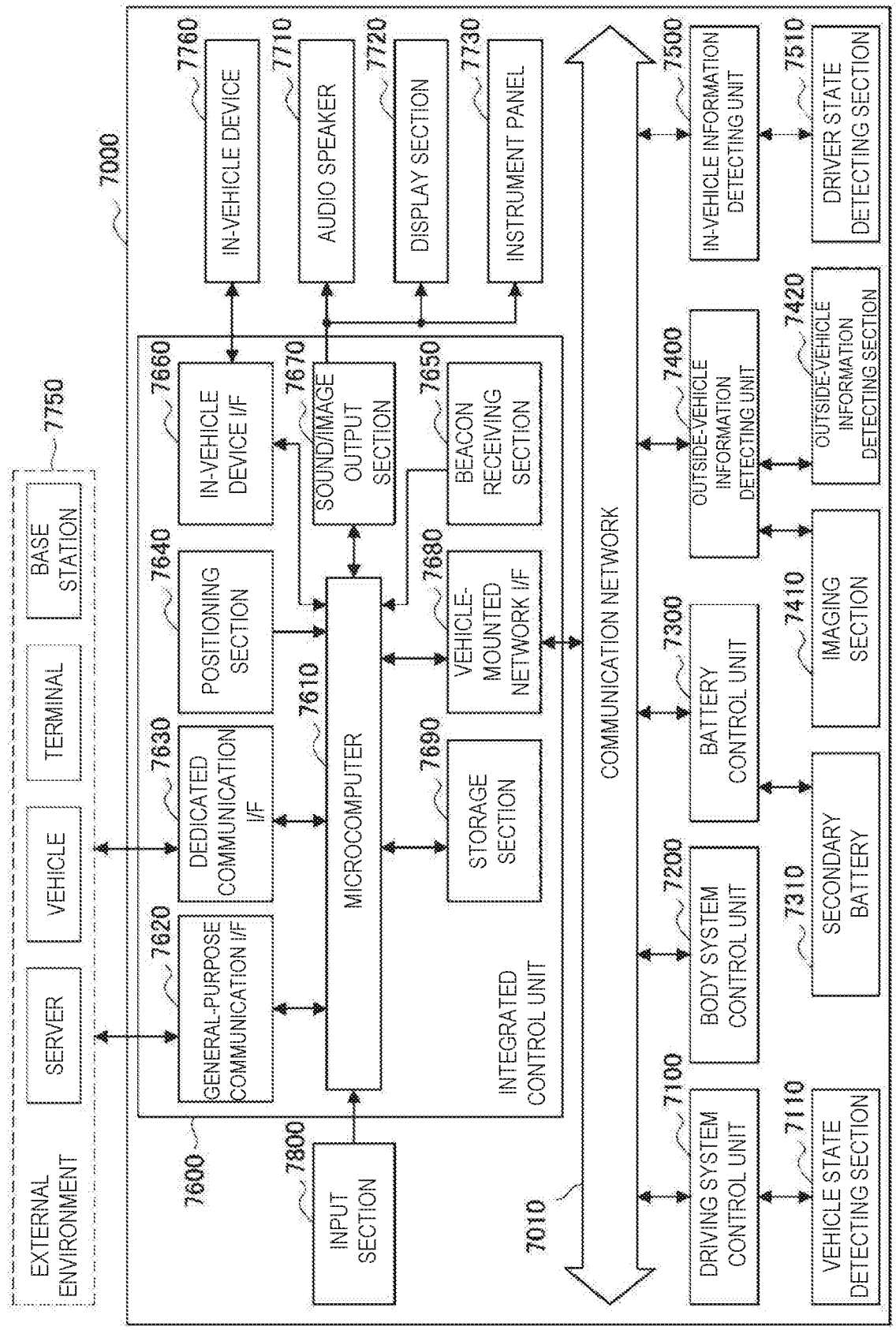
FIG. 60 is a block diagram depicting an example of a schematic configuration of a vehicle control system.
Figure 61:
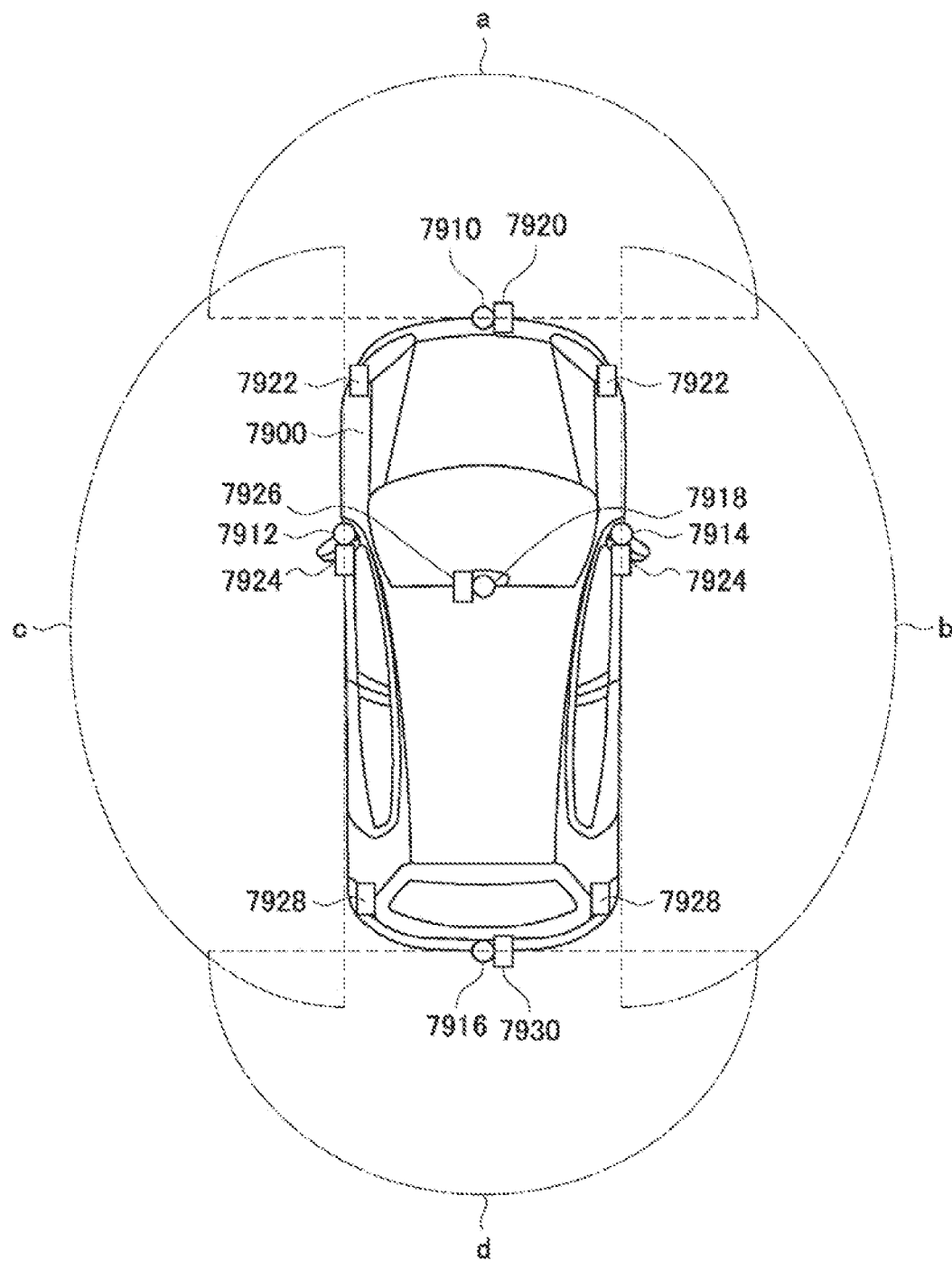
FIG. 61 is a diagram of assistance in explaining an example of installation positions of an outside-vehicle information detecting section and an imaging section.

Hereinafter, modes for carrying out the present disclosure (hereinafter referred to as embodiments) will be described. Note that the description will be made in the following order.
1. First embodiment: image display system (FIGS. 1, 2, 3, 4A, 4B, 5A, 5B, 6, 7, 8, 9, 10, 11, 12A, 12B, 12C, 13A, 13B, 13C, 14A, 14B, 15, 16A, 16B, 17, 18, 19, 20, 21A, 21B, 22, 23A, 23B, 24A, 24B, 25A, 25B, 26, 27, and 28)
2. Second embodiment: image display system (FIG. 29)
3. Other example of texture image (FIGS. 30A and 30B)
4. Third embodiment: image display system (FIGS. 31, 32, 33, 34, 35, 36, 37, 38, 39, 40, 41, 42, 43, 44, 45, 46, 47, 48A, 48B, 48C, 49A, 49B, 50, 51, 52, 53, 54, 55, 56, 57, and 58)
5. Fourth embodiment: computer (FIG. 59)
6. Application examples (FIGS. 60 and 61)

First Embodiment (Configuration Example of First Embodiment of Image Display System)

Figure 1:
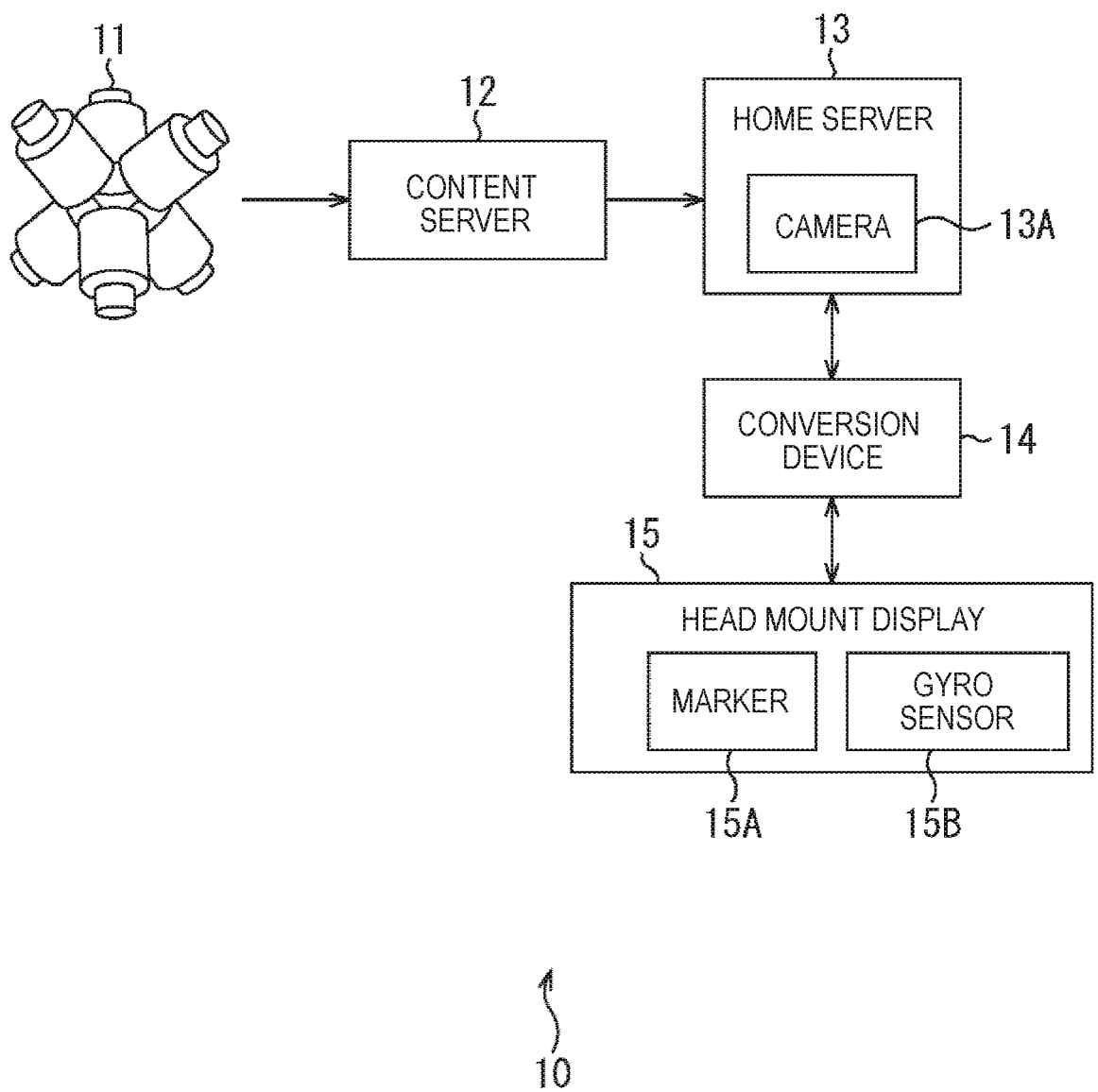
FIG. 1 is a block diagram illustrating a configuration example of a first embodiment of an image display system to which the present disclosure is applied.

FIG. 1 is a block diagram illustrating a configuration example of a first embodiment of an image display system to which the present disclosure is applied.

An image display system 10 in FIG. 1 includes a multi-camera unit 11, a content server 12, a home server 13, a conversion device 14, and a head mount display 15. The image display system 10 generates an entire celestial sphere image from photographed images which are YCbCr images (YUV images) photographed by the multi-camera unit 11 and displays an image in a visual field range of a viewer in the entire celestial sphere image.

Specifically, the multi-camera unit 11 of the image display system 10 includes a plurality of cameras (for example, six cameras in the example of FIG. 1) that have a photographing of range 360 degrees in the horizontal direction and 180 degrees in the vertical direction and are disposed to be oriented outward. Each camera performs photographing and generates a photographed image in units of frames. The multi-camera unit 11 supplies the photographed image of each camera to the content server 12.

The content server 12 (an image processing device) generates a texture image and a depth image of an entire celestial sphere image at a predetermined viewpoint from the photographed image of each camera supplied from the multi-camera unit 11. In the first embodiment, the depth image is an image in which a reciprocal 1/r of a distance r which is an 8-bit value indicating the distance r of a straight line from a predetermined viewpoint to a subject at each pixel is set as a pixel value.

The content server 12 lowers resolutions of the texture image and the depth image of the entire celestial sphere image to generate a low-resolution texture image and a low-resolution depth image. The content server 12 compresses and encodes the low-resolution texture image and the low-resolution depth image in accordance with an encoding scheme such as Advanced Video Coding (AVC) or High Efficiency Video Coding (HEVC)/H.265. The content server 12 stores an encoded stream of the low-resolution texture image (hereinafter referred to as a low-resolution texture stream) and an encoded stream of the low-resolution depth image (hereinafter referred to as a low-resolution depth stream) obtained as a result.

In addition, the content server 12 hierarchizes and generates texture images and depth images corresponding to six surfaces of a cube in which a viewpoint in the entire celestial sphere image is a center, using the photographed image of each camera. Specifically, the content server 12 generates texture images and depth images of a first layer and a second layer of the six surfaces. Note that the viewpoint in the entire celestial sphere image may be different from the center of the cube.

The content server 12 compresses and encodes a first layer image including the texture image and the depth image of the first layer of each surface and a second layer image including the texture image and the depth image of the second layer of each surface for each surface, each kind of image, and each layer in accordance with an encoding scheme such as AVC or HEVC. The content server 12 stores an encoded stream of the texture image of the first layer of each surface (hereinafter referred to as a first layer texture stream), an encoded stream of the depth image of the first layer (hereinafter referred to as a first layer depth stream), an encoded stream of the texture image of the second layer (hereinafter referred to as a second layer texture stream), and an encoded stream of the depth image of the second layer (hereinafter referred to as a second layer depth stream) obtained as a result. Note that the encoding scheme for the first layer image and the second layer image may be the Multiview Video Coding (MVC) scheme, the 3D-HEVC scheme, or the like.

In addition, the content server 12 generates information or the like regarding each surface of the first layer and the second layer as metadata and stores the metadata. The content server 12 transmits the stored low-resolution texture stream and low-resolution depth stream, the first layer texture stream, the first layer depth stream, the second layer texture stream, and the second layer depth stream of the six surfaces, and the metadata to the home server 13 via a network (not illustrated).

Note that the content server 12 can also reconfigure the first layer texture stream, the first layer depth stream, the second layer texture stream, and the second layer depth stream of the six surfaces (the details thereof will be described below). In this case, the content server 12 can also transmit the first layer texture stream, the first layer depth stream, the second layer texture stream, and the second layer depth stream after the reconfiguration and the metadata corresponding thereto to the home server 13. However, hereinafter, to facilitate the description, the first layer texture stream, the first layer depth stream, the second layer texture stream, and the second layer depth stream of the six surfaces before the reconfiguration are assumed to be transmitted to the content server 12 even in a case in which they are reconfigured.

The home server 13 (the image processing device) receives the low-resolution texture stream and the low-resolution depth stream, the first layer texture stream, the first layer depth stream, the second layer texture stream, and the second layer depth stream of the six surfaces, and the metadata transmitted from the content server 12.

In addition, the home server 13 contains a camera 13A and photographs a marker 15A attached to the head mount display 15 worn on the head of a viewer. Then, the home server 13 detects a viewing position on the basis of the captured image of the marker 15A. Further, the home server 13 receives a detection result of the gyro sensor 15B of the head mount display 15 from the head mount display 15 via the conversion device 14. The home server 13 decides a visual line direction of the viewer on the basis of a detection result of the gyro sensor 15B and decides a visual field range of the viewer on the basis of the viewing position and the visual line direction.

The home server 13 selects three surfaces corresponding to the visual line direction of the viewer from the six surfaces of the first layer. Then, the home server 13 decodes the first layer texture stream, the first layer depth stream, the second layer texture stream, and the second layer depth stream corresponding to the selected three surfaces. Thus, the home server 13 generates texture images and depth images of the first layer and the second layer corresponding to the selected three surfaces.

In addition, the home server 13 decodes the low-resolution texture stream and the low-resolution depth stream to generate a low-resolution texture image and a low-resolution depth image. The home server 13 generates an image in the visual field range of the viewer as a display image using the texture images and the depth images of the first layer and the second layer corresponding to the selected three surfaces and the low-resolution texture image and the low-resolution depth image. The home server 13 transmits the display image to the conversion device 14 via a High-Definition Multimedia Interface (HDMI: registered trademark) cable (not illustrated).

The conversion device 14 converts coordinates in the display image transmitted from the home server 13 into coordinates in the head mount display 15. The conversion device 14 supplies the display image after the conversion of the coordinates to the head mount display 15.

The head mount display 15 includes the marker 15A and the gyro sensor 15B and is worn on the head of the viewer. The head mount display 15 displays the display image supplied from the conversion device 14. In addition, the gyro sensor 15B contained in the head mount display 15 detects an inclination of the head mount display 15 and transmits a detection result to the home server 13 via the conversion device 14.

(Configuration Example of Content Server)

Figure 2:
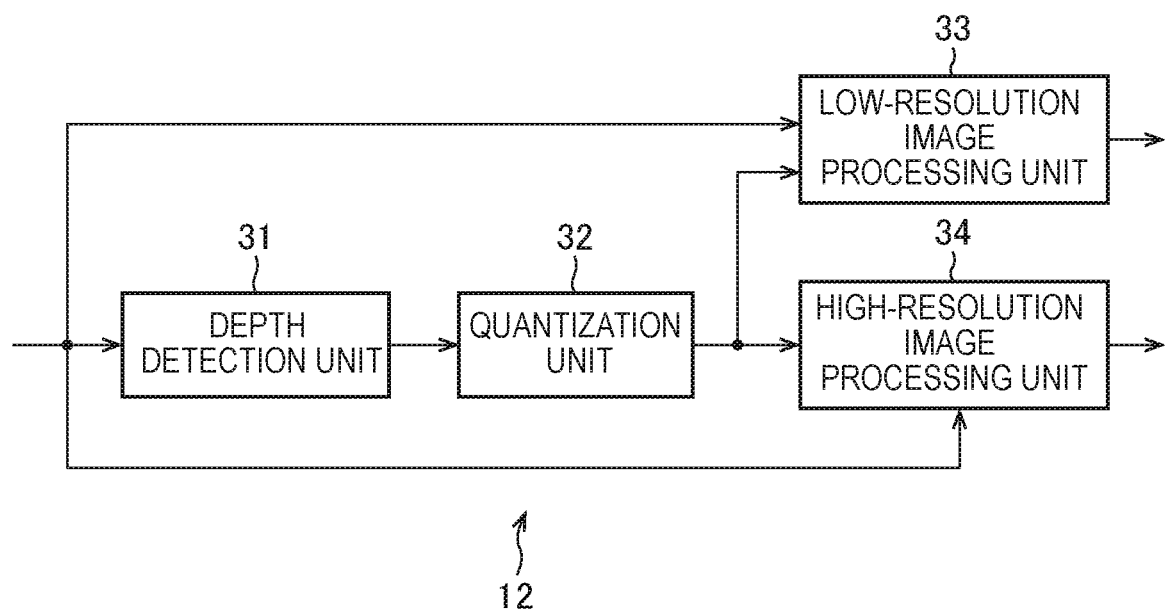
FIG. 2 is a block diagram illustrating a configuration example of a content server.

FIG. 2 is a block diagram illustrating a configuration example of the content server 12 in FIG. 1.

The content server 12 in FIG. 2 includes a depth detection unit 31, a quantization unit 32, a low-resolution image processing unit 33, and a high-resolution image processing unit 34.

The depth detection unit 31 of the content server 12 detects a reciprocal $1/z$ of a distance z in a depth direction between the camera and a depth plane perpendicular in the depth direction and including a subject in each pixel for each pixel of a photographed image of each camera supplied from the multi-camera unit 11 in FIG. 1. The depth detection unit 31 supplies the reciprocal 1/z of each pixel of the photographed image of each camera obtained as a result to the quantization unit 32.

The quantization unit 32 converts the reciprocal 1/z of each pixel of the photographed image of each camera supplied from the depth detection unit 31 into a reciprocal 1/r when a predetermined 3-dimensional position in a 3-dimensional coordinate system of the multi-camera unit 11 (hereinafter referred to as a camera coordinate system) considered to be a viewpoint in the entire celestial sphere image is set as a viewpoint. Then, the quantization unit 32 performs 8-bit quantization on the reciprocal 1/r in accordance with Expression (1) below.

[Math. 1]

$$I_d(r) = \text{round}\left[255\left(\frac{1}{r} - \frac{1}{r_{max}}\right) \bigg/ \left(\frac{1}{r_{min}} - \frac{1}{r_{max}}\right)\right] \quad (1)$$

Note that $I_d(r)$ is a value after the 8-bit quantization of the reciprocal 1/r of the distance r. Here, $r_{max}$ and $r_{min}$ are respectively a maximum value and a minimum value of the distance r in the photographed images of all the cameras.

The quantization unit 32 generates depth images of each camera by setting values after the 8-bit quantization of the reciprocal 1/r of each pixel of the photographed image of each camera as pixel values and supplies the depth images to the low-resolution image processing unit 33 and the high-resolution image processing unit 34.

The low-resolution image processing unit 33 generates a texture image of the entire celestial sphere image by mapping (performing perspective projection on) the photographed image of each camera supplied from the multi-camera unit 11 to a regular octahedron in which a viewpoint is a center, and setting a predetermined 3-dimensional position in the camera coordinate system as the viewpoint. In addition, the low-resolution image processing unit 33 generates a depth image of the entire celestial sphere image by mapping the depth image of each camera supplied from the quantization unit 32 to a regular octahedron as in the photographed image.

The low-resolution image processing unit 33 lowers resolutions of the texture image and the depth image of the entire celestial sphere image to generate a low-resolution texture image and a low-resolution depth image. The low-resolution image processing unit 33 compresses and encodes the low-resolution texture image and the low-resolution depth image and stores the low-resolution texture stream and the low-resolution depth stream obtained as a result. The low-resolution image processing unit 33 transmits the stored low-resolution texture stream and low-resolution depth stream to the home server 13 in FIG. 1.

The high-resolution image processing unit 34 generates texture images of the first layer and the second layer corresponding to six surfaces of a cube with a center identical to the center of the regular octahedron in the low-resolution image processing unit 33, using the photographed image of each camera supplied from the multi-camera unit 11. The high-resolution image processing unit 34 generates depth images of the first layer and the second layer corresponding to the six surfaces as in the photographed image, using the depth image of each camera supplied from the quantization unit 32.

The high-resolution image processing unit 34 compresses and decodes the texture images and the depth images of the first layer and the second layer of each surface for each surface, each kind of image, and each layer. The content server 12 stores the first layer texture stream, the first layer depth stream, the second layer texture stream, and the second layer depth stream obtained as a result.

In addition, the high-resolution image processing unit 34 generates and stores the metadata. The content server 12 transmits the stored first layer texture stream, first layer depth stream, second layer texture stream, and second layer depth stream of the six surfaces and the stored metadata to the home server 13 via a network (not illustrated).

(Configuration Example of High-Resolution Image Processing Unit)

Figure 3:
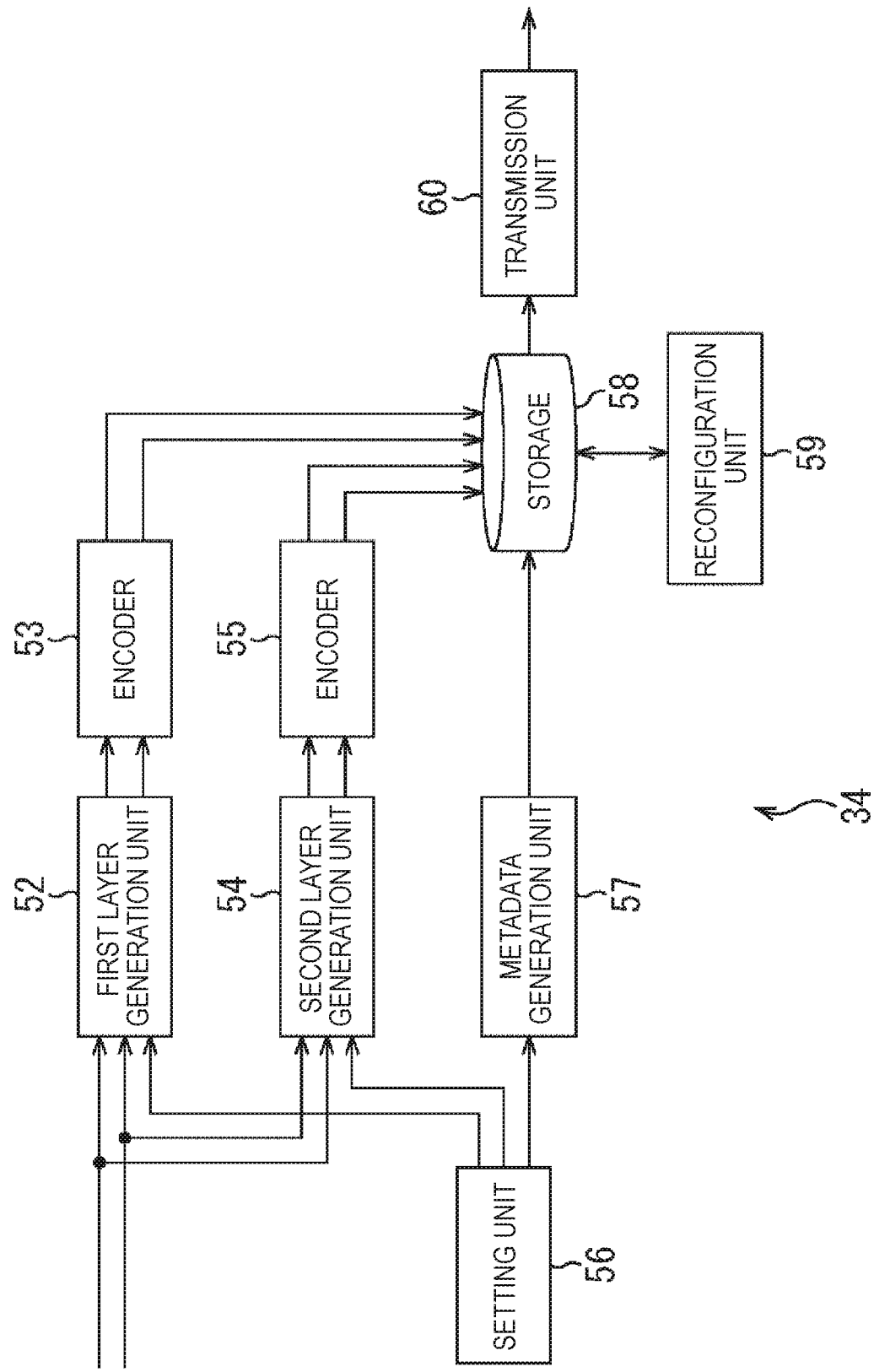
FIG. 3 is a block diagram illustrating a configuration example of a high-resolution image processing unit.

FIG. 3 is a block diagram illustrating a configuration example of the high-resolution image processing unit 34 in FIG. 2.

The high-resolution image processing unit 34 in FIG. 3 includes a first layer generation unit 52, an encoder 53, a second layer generation unit 54, an encoder 55, a setting unit 56, a metadata generation unit 57, a storage 58, a reconfiguration unit 59, and a transmission unit 60.

The setting unit 56 supplies the first layer generation unit 52 with viewpoint position information indicating the origin as a 3-dimensional position of a viewpoint of the first layer in a 3-dimensional coordinate system (hereinafter referred to as a 3D model coordinate system) in which a viewpoint of the entire celestial sphere image in the camera coordinate system is the origin. In addition, the first layer generation unit 52 is supplied with the 3-dimensional position in the 3D model coordinate system and surface information indicating a size with regard to each of the six surfaces including six surfaces of a cube in which the origin of the 3D model coordinate system is a center.

The first layer generation unit 52 sets the origin indicated by the viewpoint position information as a viewpoint of the first layer (a first viewpoint). The first layer generation unit 52 (an image generation unit) maps a photographed image supplied from the multi-camera unit 11 in FIG. 1 to each of the 3-dimensional position and the surface of the size indicated by six pieces of surface information from the viewpoint of the first layer by using the viewpoint of the entire celestial sphere image in the camera coordinate system as the origin. Thus, the first layer generation unit 52 generates texture images of the six surfaces of the first layer.

In addition, the first layer generation unit 52 (the image generation unit) maps the depth images supplied from the quantization unit 32 in FIG. 2 to each of the 3-dimensional position and the surface of the size indicated by six pieces of surface information from the viewpoint of the first layer by using the viewpoint of the entire celestial sphere image in the camera coordinate system as the origin. Thus, the first layer generation unit 52 generates depth images of the six surfaces of the first layer.

Since the viewpoints corresponding to the six surfaces of the first layer are the same, the texture images of the six surfaces of the first layer can be said to be images obtained by mapping the entire celestial sphere image mapped to a 3D model in which the viewpoint of the first layer is a center to six surfaces. Similarly, the depth images of the six surfaces of the first layer can be said to be images obtained by mapping the depth images of the entire celestial sphere image mapped to the 3D model in which the viewpoint of the first layer is the center to the six surfaces. The first layer generation unit 52 supplies the texture images and the depth images of the six surfaces of the first layer to the encoder 53.

The encoder 53 compresses and encodes the texture images and the depth images of the six surfaces of the first layer supplied from the first layer generation unit 52 for each surface and each kind of image to generate the first layer texture stream and the first layer depth stream. The encoder 53 supplies the first layer texture stream and the first layer depth stream to the storage 58.

The setting unit 56 supplies the second layer generation unit 54 with viewpoint position information regarding a viewpoint (a second viewpoint) different from the viewpoint of the first layer and surface information regarding each surface of the second layer corresponding to each surface of the first layer with regard to each surface of the second layer corresponding to each surface of the first layer. The second layer generation unit 54 sets a 3-dimensional position indicated by the viewpoint position information corresponding to each surface as the viewpoint of the second layer for each surface of the second layer.

The second layer generation unit 54 (the image generation unit) maps occlusion regions at the viewpoint of the first layer in the photographed image supplied from the multi-camera unit 11 to the surfaces of the second layer from the viewpoint of the second layer corresponding to each surface for each surface of the second layer. Thus, the second layer generation unit 54 generates the texture images of the six surfaces of the second layer.

In addition, the second layer generation unit 54 (the image generation unit) maps occlusion regions at the viewpoint of the first layer in the depth images supplied form the quantization unit 32 to the surfaces of the second layer from the viewpoint of the second layer corresponding to each surface for each surface of the second layer. Thus, the second layer generation unit 54 generates the depth images of the six surfaces of the second layer.

That is, there is a difference in the positions of the cameras of the multi-camera unit 11. Therefore, when one 3-dimensional position in the camera coordinate system is set as a viewpoint, an occlusion region at that viewpoint is included in the photographed image. However, since the texture images of the first layer are generated by mapping the entire celestial sphere image of one viewpoint, the texture images of the first layer do not include a photographed image of the occlusion region at that viewpoint. Consequently, the second layer generation unit 54 includes the photographed image of the occlusion region as a texture image of the second layer. The same applies to the depth image.

The encoder 55 compresses and encodes the texture images and the depth images of the second layer of the six surfaces supplied from the second layer generation unit 54 to generate the second layer texture stream and the second layer depth stream for each surface and each kind of image. The encoder 55 supplies the second layer texture stream and the second layer depth stream to the storage 58.

The setting unit 56 sets the origin in the 3D model coordinate system as the viewpoint of the first layer. The setting unit 56 sets six surfaces including six rectangular surfaces of a cube in which the viewpoint of the first layer is a center as the surfaces of the first layer. In addition, the setting unit 56 sets the viewpoint of the second layer and the rectangular surfaces for each surface of the first layer.

The setting unit 56 supplies one piece of viewpoint position information of the first layer and six pieces of surface information of the first layer to the first layer generation unit 52 and the metadata generation unit 57. In addition, the setting unit 56 supplies six pieces of viewpoint position information and six pieces of surface information of the second layer corresponding to the six surfaces of the first layer to the second layer generation unit 54 and the metadata generation unit 57.

The metadata generation unit 57 generates a table including the viewpoint position information and the surface information of the first layer and the viewpoint position information and the surface information of the second layer supplied from the setting unit 56 as metadata and supplies the table to the storage 58.

The storage 58 stores the first layer texture stream and the first layer depth stream supplied from the encoder 53 and the second layer texture stream and the second layer depth stream supplied from the encoder 55. In addition, the storage 58 stores the metadata supplied from the metadata generation unit 57.

In addition, the storage 58 stores the metadata and the first layer texture stream, the first layer depth stream, the second layer texture stream, and the second layer depth stream after the reconfiguration supplied from the reconfiguration unit 59.

The reconfiguration unit 59 reads and reconfigures the first layer texture stream, the first layer depth stream, the second layer texture stream, and the second layer depth stream of the six surfaces stored in the storage 58 as necessary.

Specifically, the reconfiguration unit 59 changes the number of surfaces or the angles of field of the surfaces corresponding to the first layer texture stream using the first layer texture stream before the reconfiguration and changes the number of surfaces and angles of field of the surfaces corresponding to the first layer depth stream using the first layer depth stream before the reconfiguration. For example, the reconfiguration unit 59 changes the surfaces of the first layer from six surfaces including the six surfaces that form the cube to eighteen surfaces obtained by adding the six surfaces and twelve surfaces which are lines of which normal lines passing through centers of the six surfaces pass through the center points and viewpoints of the twelve sides of the cube.

Alternatively, the reconfiguration unit 59 changes intervals of the surfaces (density) corresponding to the first layer texture stream using the first layer texture stream before the reconfiguration and changes intervals of the surfaces corresponding to the first layer depth stream using the first layer depth stream before the reconfiguration. For example, the reconfiguration unit 59 changes the surfaces of the first layer from six surfaces including the six surfaces that form the cube in which intervals of normal lines passing through the center are 90 degrees to eighteen surfaces in which intervals of normal lines passing through the center are 45 degrees.

When the intervals of the surfaces of the first layer are narrowed, the number of surfaces increases. Therefore, a total data capacity increases. In the home server 13, a display image can be generated using the texture images and the depth images corresponding to the surfaces of the first layer closer to the visual field ranges of the viewer. As a result, a high-resolution region generated using the texture images and the depth images of the first layer or the second layer in the display image increases, and thus quality of the display image is improved.

Note that the reconfiguration unit 59 may perform the reconfiguration by changing the positions of the surfaces of the first layer texture stream using the first layer texture stream before the reconfiguration and changing the positions of the surfaces of the first layer depth stream using the first layer depth stream before the reconfiguration. In this case, for example, when a main subject is in a boundary between the surfaces of the first layer, the reconfiguration unit 59 performs reconfiguration by rotating the cube corresponding to the six surfaces of the first layer so that the main subject is at a position (for example, a center) other than the boundary of the surfaces of the first layer.

In addition, the reconfiguration unit 59 may perform the reconfiguration by changing inclinations of the surfaces of the first layer texture stream using the first layer texture stream before the reconfiguration and changing inclinations of the surfaces of the first layer depth stream using the first layer depth stream before the reconfiguration. In this case, for example, when the main subject in the texture images of the first layer is inclined, the reconfiguration unit 59 performs the reconfiguration by rotating the cube corresponding to the six surfaces of the first layer so that the surfaces are not inclined.

The reconfiguration unit 59 sets the viewpoint and surfaces of the second layer after the reconfiguration with regard to each surface of the first layer changed in this way. Then, the reconfiguration unit 59 changes the viewpoint and surfaces corresponding to the second layer texture stream into the set viewpoint and surfaces of the second layer after the reconfiguration using the second layer texture stream before the reconfiguration. In addition, the reconfiguration unit 59 changes the viewpoint and surfaces corresponding to the second layer depth stream to the set viewpoint and surfaces of the second layer after the reconfiguration using the second layer depth stream before the reconfiguration.

The reconfiguration unit 59 supplies the first layer texture stream, the first layer depth stream, the second layer texture stream, and the second layer depth stream after the reconfiguration to the storage 58. In addition, the reconfiguration unit 59 generates a table including the viewpoint position information and the surface information of the first layer and the viewpoint position information and the surface information of the second layer after the reconfiguration as metadata and supplies the metadata to the storage 58.

The transmission unit 60 reads the first layer texture stream, the first layer depth stream, the second layer texture stream, and the second layer depth stream of the six surfaces and the metadata from the storage 58 and transmits them to the home server 13 in FIG. 1.

As described above, the high-resolution image processing unit 34 in FIG. 3 generates a first layer image and a second layer image by perspective projection. Accordingly, the home server 13 can perform a process for a normal image on the first layer image and the second layer image. In addition, the high-resolution image processing unit 34 can transmit the first layer texture stream, the first layer depth stream, the second layer texture stream, and the second layer depth stream in accordance with a method of transmitting an encoded stream of the normal image.

(Description of advantageous effect of depth image)

Figure 4B:
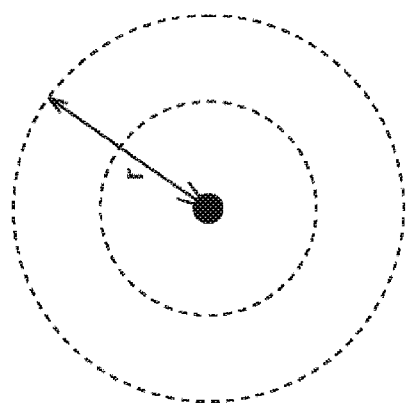
FIGS. 4A and 4B are explanatory diagrams illustrating a distance z and a distance r.
Figure 4A:
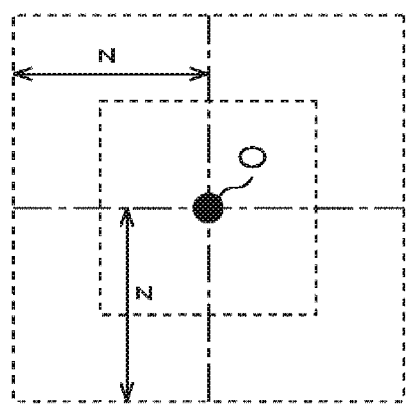
Figure 5B:
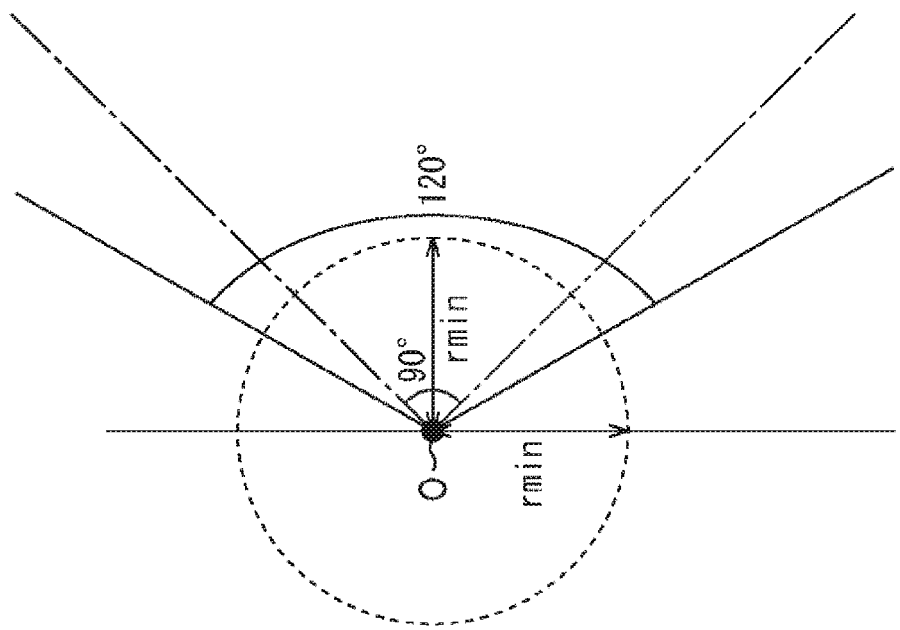
FIGS. 5A and 5B are explanatory diagrams illustrating a minimum value zmin and a minimum value rmin.
Figure 5A:
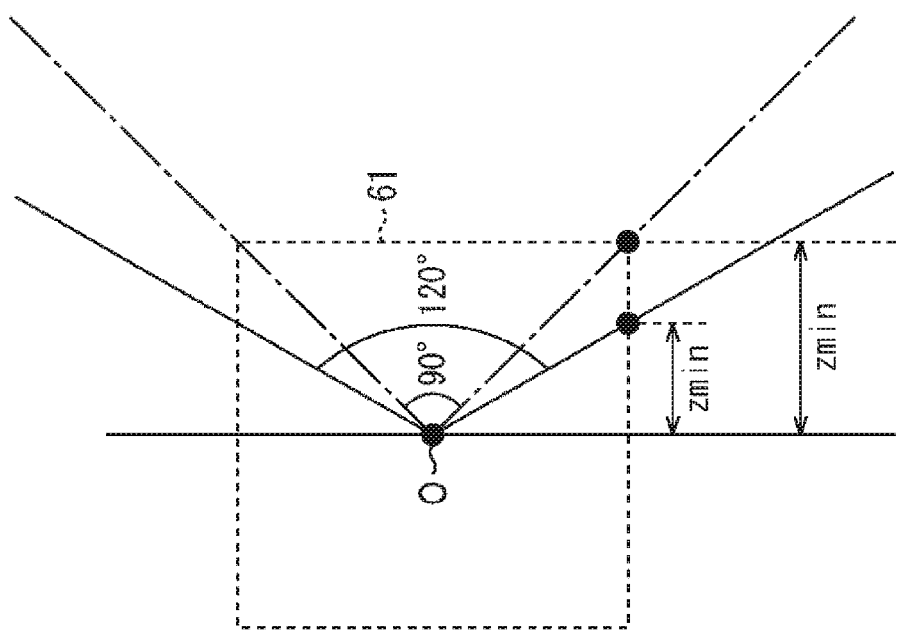

FIGS. 4A and 4B are explanatory diagrams illustrating the distance z and the distance r and FIGS. 5A and 5B are explanatory diagrams illustrating a minimum value zmin of the distance z and a minimum value rmin of the distance r.

Note that FIGS. 4A 4B, 5A, and 5B are diagrams illustrating a predetermined surface of a cube corresponding to the first layer when viewed from the upper side.

The distance z is a distance in the depth direction from the viewpoint to a depth plane perpendicular in the depth direction and including a subject at each pixel. In addition, the depth direction of each surface of the first layer is a direction perpendicular to each surface of the first layer. Accordingly, each surface of the first layer is parallel to the depth plane. Consequently, a shape of an equidistant z surface which is a depth plane from which the distance z on each surface of the first layer is the same is a cubic shape in which a viewpoint O of the first layer is a center. Accordingly, a shape of the equidistant z surface when viewed from a predetermined surface of the cube corresponding to the first layer is a square, as indicated by a dotted line in FIG. 4A.

Consequently, in a case in which the angle of view of each surface of the first layer is changed, as indicated in FIG. 5A, the minimum value zmin of the distance z on all the surfaces is changed. For example, as indicated in FIG. 5A, in a case in which the angle of view in the transverse direction (the upper and lower directions in FIGS. 5A and 5B) of each surface of the first layer is changed from 90 degrees to 120 degrees, the texture image of each surface after the change includes the texture images of two surfaces which are adjacent to each surface of the first layer in the transverse direction and of which the depth direction is different from that of this surface. Accordingly, the minimum value zmin in a case in which the angle of view in the transverse direction of each surface of the first layer is 120 degrees is a minimum value of the distance z in the depth direction between the viewpoint O and the depth plane corresponding to the two adjacent surfaces adjacent in the transverse direction and including the position of an equidistant z surface 61 of the minimum value zmin in a case in which the angle of view in the transverse direction of each surface of the first layer is 90 degrees. The maximum value zmax of the distance z is also similar to the maximum value zmin.

Figure 6:
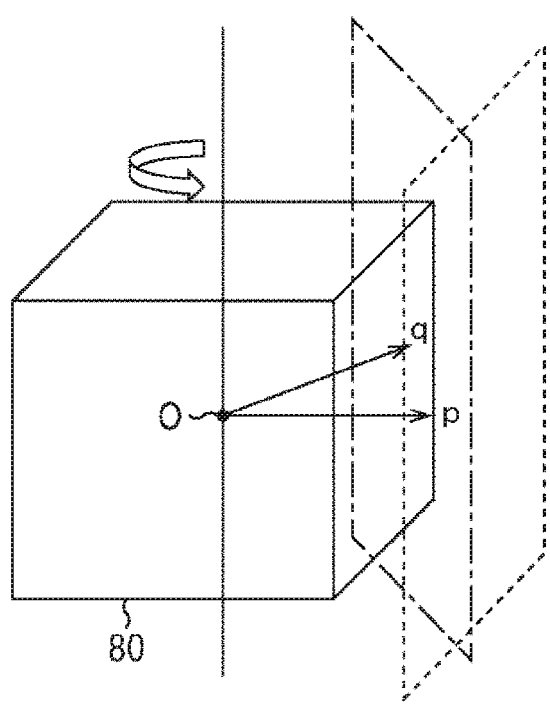
FIG. 6 is an explanatory diagram illustrating a change in a depth direction.

In addition, as illustrated in FIG. 6, in a case in which a cube 80 corresponding to the first layer is rotated using a line passing through the viewpoint O as an axis and the position of each surface of the first layer is changed, a depth direction p of the surface before the change is different from a depth direction q of the surface after the change. Accordingly, the minimum value zmin and the maximum value zmax of the distance z are changed. Note that in FIG. 6, a dotted line indicates the equidistant z surface of the surface before the change and a one-dot chain line indicates the equidistant z surface of the surface after the change.

In addition, although not illustrated, even in a case in which the number of surfaces or the intervals of the surfaces of the first layer is changed, the depth direction is changed as in the case in which the position of each surface of the first layer is changed. Therefore, the minimum value zmin and the maximum value zmax are changed.

As described above, in a case in which the angles of field, the positions, the number of surfaces or the intervals of the surfaces of the first layer are changed, the minimum value zmin and the maximum value zmax of the distance z are changed. Accordingly, when the reciprocal 1/z of the distance z is used as a y value (pixel value) of each pixel of the depth image of the first layer, it is necessary to perform 8-bit quantization of the depth image at the time of reconfiguration by the reconfiguration unit 59 again.

On the other hand, the distance r is a distance of a straight line from the viewpoint to the subject at each pixel. In addition, a direction of the straight line from the viewpoint O of each surface of the first layer to the subject is a radial direction of a circle in which the viewpoint O is a center regardless of the surfaces. Accordingly, the shape of the equidistant r surface from which the distance r on each surface of the first layer is the same is a spherical shape in which the viewpoint O of the first layer is a center. Consequently, a shape of the equidistant r surface when viewed from a predetermined surface of the cube corresponding to the first layer is circular shape, as indicated by a dotted line in FIG. 4B.

As described above, since the direction of the straight line from the viewpoint O of each surface of the first layer to the subject is the same regardless of the surfaces, the minimum value rmin of the distance r on all the surfaces is not changed, as illustrated in FIG. 5B even in a case in which the field angle of each surface of the first layer is changed.

For example, the direction of the straight light from the viewpoint O of each surface of the first layer to the subject on the surfaces before the change and two surfaces adjacent in the transverse direction (the upper and lower directions in FIGS. 5A and 5B) is the same. Accordingly, as illustrated in FIG. 5B, even in a case in which the field angle in the transverse direction of each surface of the first layer is changed from 90 degrees to 12 degrees and the texture images of the surfaces after the change include the texture images of the surfaces before the change and the two surfaces adjacent in the transverse direction, the minimum value rmin is not changed. The maximum value rmax of the distance r is also similar to the minimum value rmin.

In addition, although not illustrated, even in a case in which the positions of the surfaces, the number of surfaces, and or the intervals of the surfaces of the first layer are changed, the direction of the straight line from the viewpoint O of each surface of the first layer to the subject is not changed as in the case in which the field angle of each surface of the first layer is changed. Therefore, the minimum value rmin and the maximum value rmax are not changed.

Accordingly, the quantization unit 32 in FIG. 2 can reduce a process of performing the 8-bit quantization of the depth images again at the time of the reconfiguration by the reconfiguration unit 59 by using a quantized value of the reciprocal 1/r rather than the reciprocal 1/z as a y value of each pixel of the depth images of the first layer.

Note that in the above description, the low-resolution texture stream and the low-resolution depth stream are not reconfigured, but may be reconfigured. Even in this case, since the y value of each pixel of the low-resolution depth image is the quantized value of the reciprocal 1/r, the process of performing the 8-bit quantization of the low-resolution depth image again at the time of the reconfiguration can be reduced as in the time of the reconfiguration of the depth images of the first layer.

(Example of Position of Each Pixel of Depth Images on a Sphere in Six Surfaces of First Layer)

Figure 7:
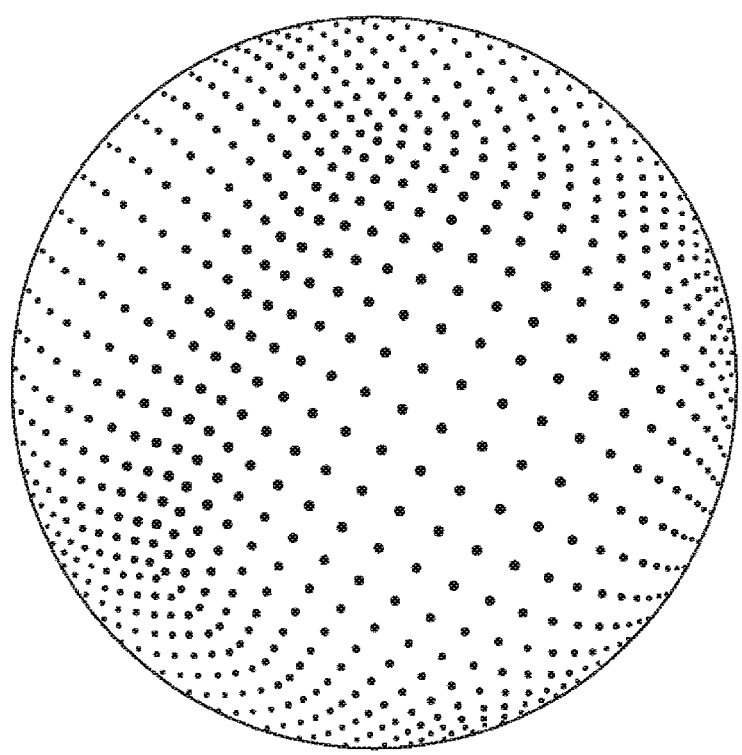
FIG. 7 is a diagram illustrating an example of a position of each pixel on a sphere when a depth image of six surfaces of a first layer is mapped to a sphere.

FIG. 7 is a diagram illustrating an example of a position of each pixel on a sphere when a depth image of six surfaces of a first layer is mapped to a sphere.

Note that in FIG. 7, the position of each pixel on the sphere at the time of mapping of the depth images of the six surfaces of the first layer to the sphere is indicated as a point.

The intervals of the positions of the pixels of the depth image of each surface of the first layer on the depth image are equidistant. However, as illustrated in FIG. 7, the intervals of the positions of the pixels on the sphere at the time of mapping the depth images of the six surfaces of the first layer to the sphere are not equidistant. That is, the density of the positions of the pixels on the sphere at the time of mapping of the depth images of the six surfaces of the first layer to the sphere is not constant.

(Example of surfaces of first layer)

Figure 8B:
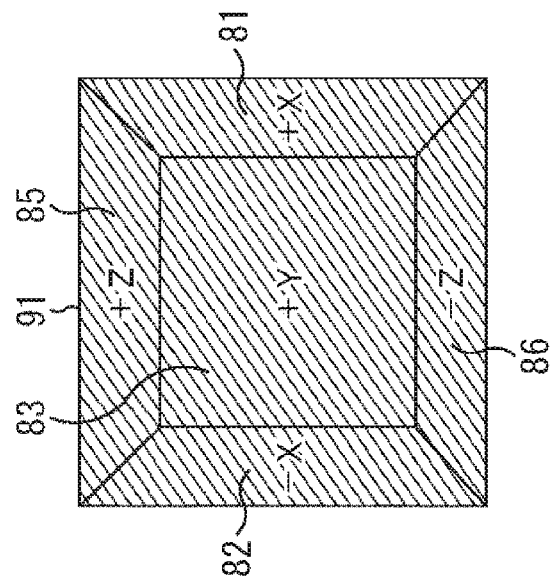
FIGS. 8A and 8B are diagrams illustrating an example of a surface of the first layer.
Figure 8A:
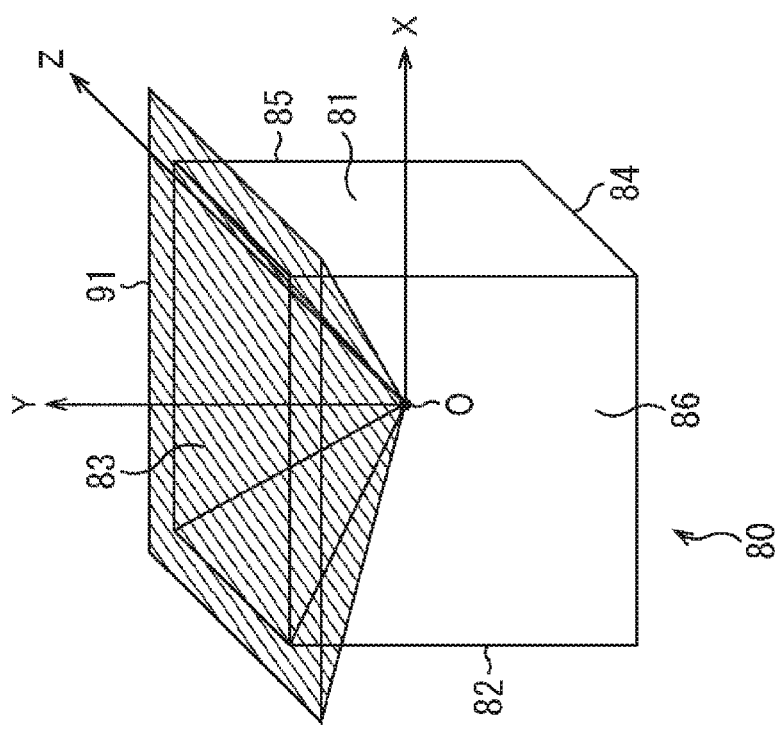

FIGS. 8A and 8B are diagrams illustrating an example of a surface of the first layer.

Note that, hereinafter, of six axes passing through the viewpoint O of the first layer and centers of six surfaces 81 to 86 that forms the cube 80 corresponding to the first layer, three axes perpendicular to each other are referred to as X, Y, and Z axes. In addition, when R is a distance between the viewpoint O and each of the six surfaces 81 to 86, the surface 81 in which X=R is appropriately referred to as a +X surface 81 and the surface 82 in which X=−R is also appropriately referred to as a −X surface 82. Similarly, a surface 83 in which Y=R, a surface 84 in which Y=−r, a surface 85 in which Z=R, a surface 86 in which Z=−R are also appropriately referred to as a +Y surface 83, a −Y surface 84, a +Z surface 85, and a −Z surface 86, respectively.

In addition, FIG. 8A is a perspective view illustrating the cube 80 of the first layer and FIG. 8B is a diagram illustrating the cube 80 of the first layer in the negative direction of the Y axis.

As illustrated in FIG. 8A, one surface 91 of the first layer is a surface including the +Y surface 83 among the six surfaces 81 to 86 that forms the cube 80 in which the viewpoint O is the center. More specifically, the surface 91 is a surface which is set at the same position as the +Y surface 83 and has the field angle in the transverse direction and the longitudinal direction and is greater than 90 degrees which is a field angle of the +Y surface 83 and less than 180 degrees.

Accordingly, as illustrated in FIG. 8B, the texture image of the surface 91 includes not only a texture image mapped to the +Y surface 83 but also some of the texture images mapped to the +X surface 81, the −X surface 82, the +Z surface 85, and the −Z surface 86 adjacent to the +Y surface 83. The depth image of the surface 91 is similar to the texture image.

In FIGS. 8A and 8B, although only one surface 91 of the first layer is illustrated, the other five surfaces are surfaces which are set at the same position as the +X surface 81, the −X surface 82, the −Y surface 84, the +Z surface 85, and the −Z surface 86 and have the field angle in the transverse direction and the longitudinal direction which is greater than 90 degrees and less than 180 degrees as in the surface 91.

As described above, since the six surfaces of the first layer include the six surfaces 81 to 86 that form the cube, the entire celestial sphere image is necessarily mapped to one of the six surfaces of the first layer. Accordingly, when three adjacent surfaces of the six surfaces of the first layer are used at most, the home server 13 can generate a display image in any direction at 360 degrees around in the horizontal direction and 180 degrees around in the vertical direction from the viewpoint O which is a viewing position.

(Configuration Example of Table of Viewpoint Position Information and Surface Information of First Layer)

FIG. 9 is a diagram illustrating a configuration example of the table of the viewpoint position information and the surface information of the first layer in the metadata generated by the metadata generation unit 57 in FIG. 3.

In the example of FIG. 9, of the surface information, information indicating a 3-dimensional position of a surface in the 3D model coordinate system is an azimuth angle, an elevation angle, a rotation angle, and a visual line vector and information indicating a size is a horizontal field angle and a vertical field angle.

The azimuth angle is an angle formed in the XZ plane direction between the Z axis and a line connecting the viewpoint to the center of each surface and the elevation angle is an angle formed between the XZ plane and the line connecting the viewpoint to the center of each surface. Herein, clockwise rotation of the azimuth angle is assumed to be a positive direction and counterclockwise rotation of the elevation angle is assumed to be a negative direction. A line obtained by horizontally rotating a line extending from the viewpoint in the Z axis direction by the azimuth angle on the XZ plane and subsequently vertically rotating the line in the Y axis direction by the elevation angle is a normal line passing through the center of the surface.

The rotation angle is an angle of each surface in a rotation direction when the line connecting the viewpoint to the center of each surface is set as an axis. Herein, clockwise rotation of the rotation angle is assumed to a positive direction. The visual line vector is a vector of which a length oriented to the center of each surface is 1 when the viewpoint is a starting point, that is, a normal line vector passing through the center of each surface. The horizontal field angle is an angle formed by lines connecting the viewpoint to two ends of each surface in the transverse direction and the vertical field angle is an angle formed by lines connecting the viewpoint to two ends of each surface in the longitudinal direction.

As illustrated in FIG. 9, the table of the viewpoint position information and the surface information of the first layer is registered in common portions of file names of files in which the first layer texture stream and the first layer depth stream of each surface are stored in the storage 58 in FIG. 3.

Specifically, in the example of FIG. 9, file names of the first layer texture stream of the surfaces including the +Z surface 85, the −Z surface 86, the +X surface 81, the −X surface 82, the +Y surface 83, and the −Y surface 84 are posZ_texture, negZ_texture, posX_texture, negX_texture, posY_texture, and negY_texture, respectively. In addition, file names of the first depth stream of the surfaces including the +Z surface 85, the −Z surface 86, the +X surface 81, the −X surface 82, the +Y surface 83, and the −Y surface 84 are posZ_depth, negZ_depth, posX_depth, negX_depth, posY_depth, and negY_depth, respectively. Accordingly, in the table of FIG. 9, posZ, negZ, posX, negX, posY, and negY are registered as common portions of the file names of the surfaces of the first layer.

In addition, in the table of the viewpoint position information and the surface information of the first layer, the surface information, the viewpoint position information, and the number of horizontal pixels and the number of vertical pixels of the texture images and the depth images of the surfaces corresponding to the common portions of the file names are registered in association with the common portions of the file names.

Specifically, angles formed in the XZ plane direction between the Z axis and the lines connecting the viewpoint O to the centers of the surfaces of the first layer including the +Z surface 85, the −Z surface 86, the +X surface 81, the −X surface 82, the +Y surface 83, and the −Y surface 84 are respectively 0 degrees, −180 degrees, 90 degrees, −90 degrees, 0 degrees, and 0 degrees, and the angles formed between the XZ plane and the lines are 0 degrees, 0 degrees, 0 degrees, 0 degrees, 90 degrees, and −90 degrees. Accordingly, azimuth angles "0 degrees," "−180 degrees," "90 degrees," "−90 degrees," "0 degrees," and "0 degrees" are registered and the elevation angles "0 degrees," "0 degrees," "0 degrees," "0 degrees," "90 degrees," and "−90 degrees" are registered respectively in association with the common portions "posZ," "negZ," "posX," "negX," "posY," and "negY" of the file names.

In addition, in the example of FIG. 9, a rotation angle of all the surfaces of the first layer is 0 degrees. Accordingly, a rotation angle "0 degrees" is registered in association with the common portions "posZ," "negZ," "posX," "negX," "posY," and "negY" of the file names. Further, coordinates (0, 0, 0) of the origin is registered as the viewpoint position information in association with the common portions "posZ," "negZ," "posX," "negX," "posY," and "negY" of the file names.

In addition, visual line vectors of the surfaces of the first layer including the +Z surface 85, the −Z surface 86, the +X surface 81, the −X surface 82, the +Y surface 83, and the −Y surface 84 from the viewpoint O are (0, 0, 1), (0, 0, −1), (1, 0, 0), (−1, 0, 0), (0, 1, 0), and (0, −1, 0), respectively. Accordingly, the visual line vectors (0, 0, 1), (0, 0, −1), (1, 0, 0), (−1, 0, 0), (0, 1, 0), and (0, −1, 0) are registered respectively in association with the common portions "posZ," "negZ," "posX," "negX," "posY," and "negY" of the file names.

Further, in the example of FIG. 9, the horizontal field angle and the vertical field angle of all the surfaces of the first layer are 100 degrees greater than 90 degrees, and the number of horizontal pixels which is the number of pixels in the transverse direction and the number of vertical pixels which is the number of pixels in the longitudinal direction of the texture images and the depth images are 1024. Accordingly, the horizontal field angle of "100 degrees," the vertical field angle of "100 degrees," the number of horizontal pixels of "1024," and the number of vertical pixels of "1024" are registered respectively in association with the common portions "posZ," "negZ," "posX," "negX," "posY," and "negY" of the file names.

(Description of Hierarchization)

FIG. 10 is a diagram illustrating a position in a depth direction of a subject corresponding to a predetermined surface of the first layer. FIG. 11 is a diagram illustrating a configuration example of texture images of the first layer and the second layer of the subject in FIG. 10 in a case in which the viewpoints of the first layer and the second layer are the same.

In addition, FIG. 10 is a diagram illustrating the viewpoint O of the first layer and the subject when viewed from the upper side. The upper and lower directions of FIG. 10 are a depth direction of a predetermined surface of the first layer on which the subject is included in the field angle. In addition, in FIG. 11, the right and left directions and the upper and lower directions indicate a transverse direction and a depth direction of the texture image, respectively. The downward direction of FIGS. 10 and 11 is a front side and the upward direction thereof is a rear side.

In the examples of FIGS. 10 and 11, a subject included in the field angle of a predetermined surface of the first layer is a foreground 111 in the middle and a background 112 on the rear of the foreground. In this case, as illustrated in FIG. 11, the texture image of the predetermined surface of the first layer includes a photographed image 121 of the foreground 111 and a photographed image 122A of the region 112A not hidden by the foreground 111 in the background 112.

On the other hand, the texture image of the surface of the second layer corresponding to the predetermined surface of the first layer includes photographed images 122C of photographed occlusion regions 112C photographed by the multi-camera unit 11 in an occlusion region 112B shielded by the foreground 111 in the background 112 as valid regions, as illustrated in FIG. 11.

Anything may be disposed in a region other than the valid regions in the texture image of the surface of the second layer. When a special value such as an invalid value is disposed, the special value is changed by compression encoding and it is difficult to decompress the special value by decoding in the home server 13.

Accordingly, a region other than the valid regions of the texture image of the surface of the second layer is divided into an unnecessary region (the background region) corresponding to the region 112A and an imaginary region corresponding to the region other than the photographed occlusion regions 112C in the occlusion region 112B.

Then, in the unnecessary region corresponding to the region 112A in which there is no occlusion region, the photographed image 122A is disposed as in the first layer or a flat image of which an edge portion is not sharp is disposed. In a case in which the photographed image 122A is disposed in the unnecessary region, the texture images of the first layer and the second layer in the unnecessary region are the same. Therefore, in a case in which the texture image of the first layer is compressed and encoded in accordance with an MVC scheme, a 3D-HEVC scheme, or the like with reference to the texture image of the second layer, a compression ratio can be improved. In addition, in a case in which a flat image is disposed in the unnecessary region, a compression ratio of the image of the second layer can be improved further than in a case in which an image with a sharp edge portion is disposed. Note that the photographed image 122A is disposed in a part of the unnecessary region and a flat image is disposed in another portion.

In addition, an imaginary region is a region which has an occlusion region and corresponds to a region other than the photographed occlusion region 112C in the occlusion region 112B which is not photographed by the multi-camera unit 11. Accordingly, in the imaginary region, an inpainting image inferred (inpainted) using the photographed images 122C of the photographed occlusion regions 112C is disposed or the photographed image 121 is disposed as in the first layer.

Note that a previous photographed image may be used in the inpainting. When the content server 12 performs the inpainting, the home server 13 can treat the imaginary region equally to a valid region. In addition, when the content server 12 performs the inpainting before reproduction, inpainting with a large processing load in which it takes much time can also be performed.

In addition, in a case in which the photographed image 121 is disposed in the imaginary region, the imaginary region can easily be generated even when the imaginary region is dotted or the inpainting is difficult. An inpainting image may be disposed in a part of the imaginary region and the photographed image 121 may be disposed in another portion.

Note that configurations of the depth images of the first layer and the second layer are similar to the configurations of the texture images of the first layer and the second layer except that a photographed image is substituted with the depth image, and thus the description thereof will be omitted. In addition, a case in which a similar photographed image or depth image to the first layer is disposed in the unnecessary region and the imaginary region of the second layer will be described below.

(Description of viewpoints of first layer and second layer)

FIGS. 12A, 12B, and 12C are explanatory diagrams illustrating examples of the texture images of the first layer and the second layer corresponding to a predetermined surface of the first layer in a case in which the viewpoints of the first layer and the second layer are the same. FIGS. 13A, 13B, and 13C are explanatory diagrams illustrating the texture images of the first layer and the second layer corresponding to the predetermined surface of the first layer in a case in which the viewpoints of the first layer and the second layer are different.

FIG. 12A and FIG. 13A are diagrams illustrating the viewpoint O of the first layer and the subject when viewed from the upper side. The upper and lower directions in FIG. 12A and FIG. 13A are a depth direction of the predetermined surface of the first layer in which the subject is included in the field angle.

As illustrated in FIG. 12A, in a case in which the viewpoint of the second layer is the viewpoint O of the first layer, a rod-like subject 141 extending to the viewpoint O within a field angle of a predetermined surface 131 of the first layer is a point in both a texture image 151 of the first layer and a texture image 152 of the second layer.

That is, since directions oriented from the viewpoint O to the surface 131 in the first layer and the second layer are the same, the subject 141 may be degenerated to one point in both the texture image 151 of the first layer and the texture image 152 of the second layer. Accordingly, in the texture image 151 and the texture image 152, a length of the subject 141 in the direction extending to the viewpoint O may not be expressed.

In contrast, in a case in which the viewpoint of the second layer is a different viewpoint O' from the viewpoint O of the first layer, the subject 141 included in the angles of field of the surface 131 of the first layer and a surface 161 of the second layer is a straight line in a texture image 172 of the second layer.

That is, a direction oriented from the viewpoint O of the first layer to the surface 131 is different from a direction oriented from the viewpoint O' of the second layer to the surface 161. Accordingly, even when the subject 141 in the texture image 151 of the first layer is degenerated to one point, the subject 141 in the texture image 172 of the second layer is not degenerated to one point. Consequently, in the texture image 172, a length of the subject 141 in the direction extending to the viewpoint O can be expressed.

As described above, in the content server 12, the viewpoints of the first layer and the second layer are set to be different.

(First example of viewpoint of second layer)

Figure 14B:
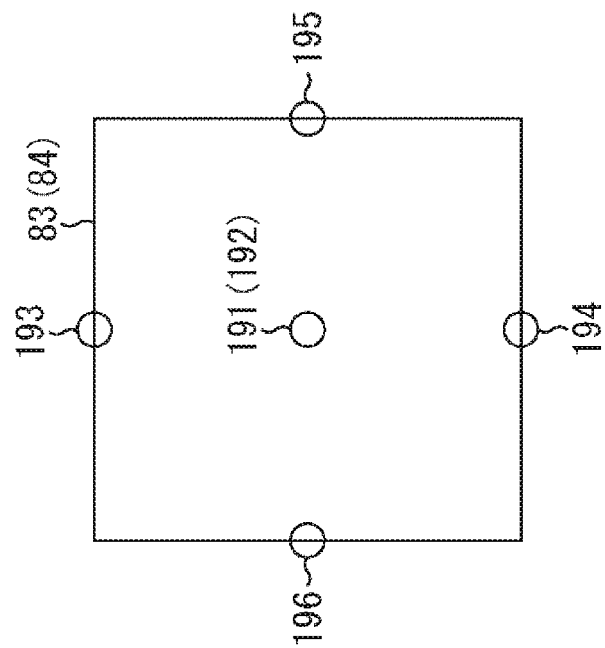
FIGS. 14A and 14B are diagrams illustrating a first example of a viewpoint of the second layer.
Figure 14A:
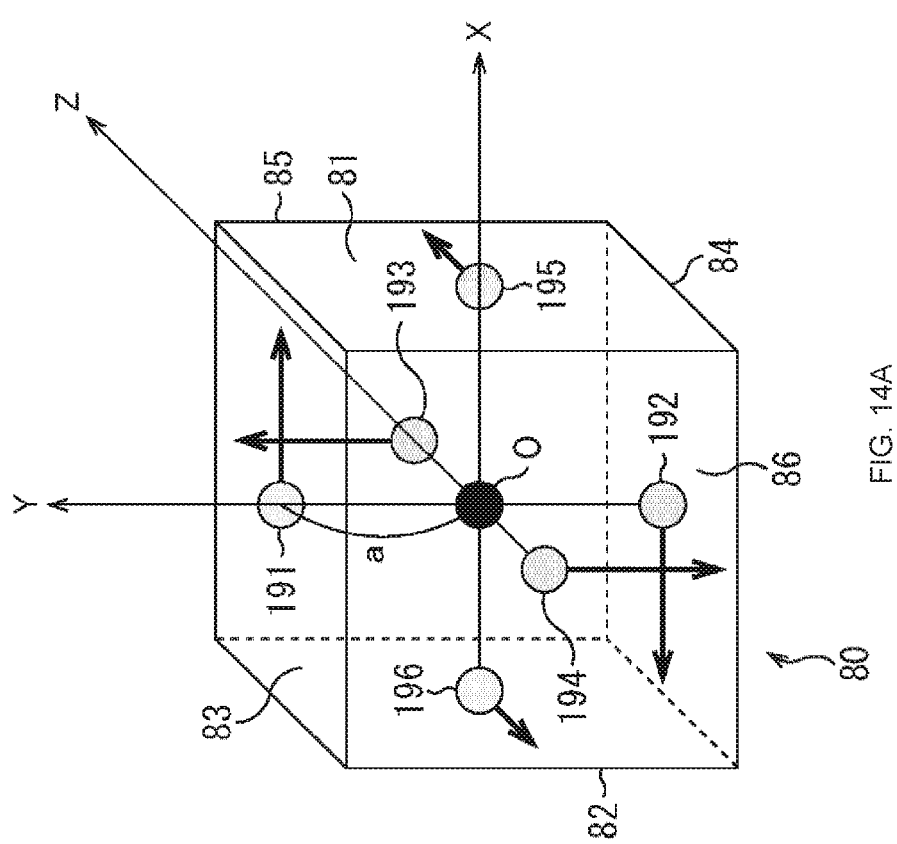

FIGS. 14A and 14B are diagrams illustrating a first example of the viewpoint of the second layer.

FIG. 14A is a perspective view illustrating the cube 80 of the first layer. FIG. 14B is a view illustrating the cube 80 when viewed in the negative direction of the Y axis. The same also applies to FIGS. 16A and 16B.

In the example of FIGS. 14A and 14B, a viewpoint 191 of the surface of the second layer corresponding to the surface including the +X surface 81 of the first layer is set from the viewpoint O of the first layer to a position moved by a length a of the half of each side of the cube 80 in the positive direction of the Y axis. As indicated by an arrow affixed to the viewpoint 191 in FIGS. 14A and 14B, a visual line vector of the surface of the second layer corresponding to the surface including the +X surface 81 of the first layer is (1, 0, 0) similarly to the first layer.

A viewpoint 192 of the surface of the second layer corresponding to the surface including the −X surface 82 of the first layer is set at a position moved from the viewpoint O by the length a in the negative direction of the Y axis. As indicated by an arrow affixed to the viewpoint 192 in FIGS. 14A and 14B, a visual line vector of the surface of the second layer corresponding to the surface including the −X surface 82 of the first layer is (−1, 0, 0) similarly to the first layer.

In addition, a viewpoint 193 of the surface of the second layer corresponding to the surface 91 including the +Y surface 83 of the first layer and a viewpoint 194 of the surface of the second layer corresponding to the surface including the −Y surface 84 are set at positions moved from the viewpoint O by the length a in the positive direction and the negative direction of the Z axis. As indicated by arrows affixed to the viewpoint 193 and the viewpoint 194 in FIGS. 14A and 14B, a visual line vector of the surface of the second layer corresponding to the surface 91 of the first layer and a visual line vector of the surface of the second layer corresponding to the surface including the —Y surface 84 are (0, 1, 0) and (0, -1, 0) similarly to the first layer.

In addition, a viewpoint 195 of the surface of the second layer corresponding to the surface including the +Z surface 85 of the first layer and a viewpoint 196 of the surface of the second layer corresponding to the surface including the −Z surface 86 are set at positions moved from the viewpoint O of the first layer by the length a in the positive direction and the negative direction of the X axis. As indicated by arrows affixed to the viewpoint 195 and the viewpoint 196 in FIGS. 14A and 14B, a visual line vector of the surface of the second layer corresponding to the surface including the +Z surface 85 of the first layer and a visual line vector of the surface of the second layer corresponding to the surface including the —Z surface 86 are (0, 0, 1) and (0, 0, -1) similarly to the first layer.

As described above, in the example of FIGS. 14A and 14B, the viewpoints 191 to 196 of the surfaces of the second layer are set at the positions moved from the viewpoint O of the first layer by the length a in one direction perpendicular to the visual line vectors. In addition, the visual line vectors of the surfaces of the second layer are the same as the visual line vectors of the corresponding surfaces of the first layer. Further, directions in which the viewpoints 191 to 196 of the surfaces of the second layer are shifted from the viewpoint O are different for each surface.

Note that the distance between the viewpoints 191 to 196 of the surfaces of the second layer and the viewpoint O in the X axis direction, the Y axis direction, or the Z axis direction is not limited to the length a of the half of each side of the cube 80.

(First configuration example of table of viewpoint position information and surface information of second layer)

FIG. 15 is a diagram illustrating a configuration example of the table of the viewpoint position information and the surface information of the second layer in the metadata generated by the metadata generation unit 57 in FIG. 3 in a case in which the viewpoints 191 to 196 in FIGS. 14A and 14B are set as the viewpoints of the surfaces of the second layer.

The table in FIG. 15 is the same as the table in FIG. 9 except for the common portions of the file names and the viewpoint position information.

Specifically, in the example of FIG. 15, file names of the texture images of the surfaces of the second layer corresponding to the surfaces of the first layer including the +Z surface 85, the −Z surface 86, the +X surface 81, the −X surface 82, the +Y surface 83, and the −Y surface 84 are posZ2_texture, negZ2_texture, posX2_texture, negX2_texture, posY2_texture, and negY2_texture, respectively. In addition, file names of the depth images of the surfaces of the second layer corresponding to the surfaces of the first layer including the +Z surface 85, the −Z surface 86, the +X surface 81, the −X surface 82, the +Y surface 83, and the −Y surface 84 are posZ2_depth, negZ2_depth, posX2_depth, negX2_depth, posY2_depth, and negY2_depth, respectively. Accordingly, in the table of FIG. 15, posZ2, negZ2, posX2, negX2, posY2, and negY2 are registered as common portions of the file names of the surfaces of the second layer.

In addition, the coordinates (a, 0, 0), (−a, 0, 0), (0, a, 0), (0, −a, 0), (0, 0, a), and (0, 0, −a) of the viewpoints 191 to 196 when the viewpoint O is the origin are registered respectively in association with the common portions "posZ2," "negZ2," "posX2," "negX2," "posY2," and "negY2" of the file names.

(Second example of viewpoint of second layer)

Figure 16B:
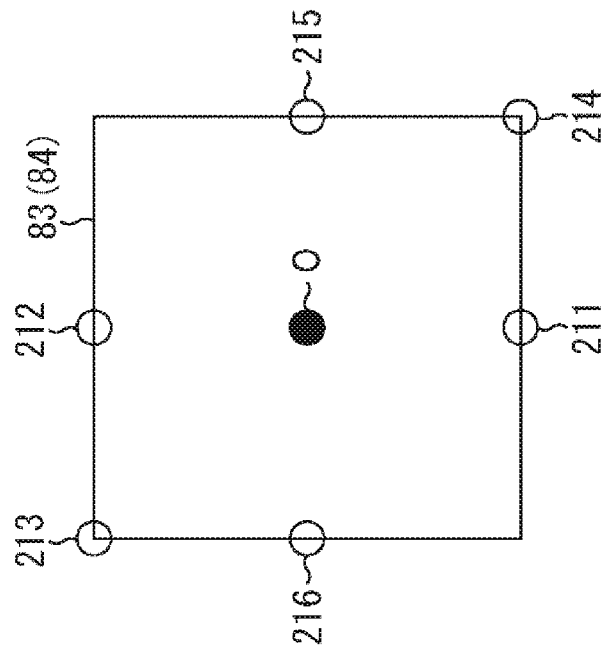
FIGS. 16A and 16B are diagrams illustrating a second example of a viewpoint of the second layer.
Figure 16A:
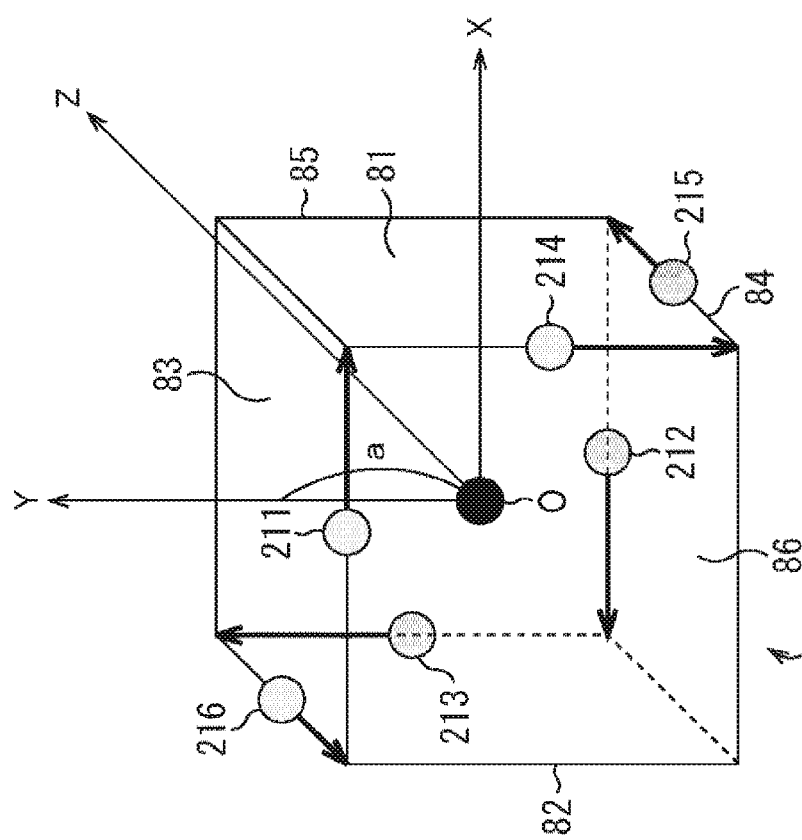

FIGS. 16A and 16B are diagrams illustrating a second example of the viewpoint of the second layer.

In the example of FIGS. 16A and 16B, a viewpoint 211 of the surface of the second layer corresponding to the surface including the +X surface 81 of the first layer and a viewpoint 212 of the surface of the second layer corresponding to the surface including the −X surface 82 are set at positions moved from the viewpoint O of the first layer by the length a in the positive direction of the Y axis and the negative direction of the Z axis, and the negative direction of the Y axis and the positive direction of the Z axis. As indicated by arrows affixed to the viewpoint 211 and the viewpoint 212 in FIGS. 16A and 16B, a visual line vector of the surface of the second layer corresponding to the surface including the +X surface 81 of the first layer and a visual line vector of the surface of the second layer corresponding to the surface including the −X surface 82 of the first layer are (1, 0, 0) and (−1, 0, 0) similarly to the first layer.

In addition, a viewpoint 213 of the surface of the second layer corresponding to the surface 91 including the +Y surface 83 of the first layer and a viewpoint 214 of the surface of the second layer corresponding to the surface including the −Y surface 84 are set at positions moved from the viewpoint O by the length a in the negative direction of the X axis and the positive direction of the Z axis, and the positive direction of the X axis and the negative direction of the Z axis. As indicated by arrows affixed to the viewpoint 213 and the viewpoint 214 in FIGS. 16A and 16B, a visual line vector of the surface of the second layer corresponding to the surface 91 of the first layer and a visual line vector of the surface of the second layer corresponding to the surface including the —Y surface 84 are (0, 1, 0) and (0, -1, 0) similarly to the first layer.

In addition, a viewpoint 215 of the surface of the second layer corresponding to the surface including the +Z surface 85 of the first layer and a viewpoint 216 of the surface of the second layer corresponding to the surface including the −Z surface 86 are set at positions moved from the viewpoint O by the length a in the positive direction of the X axis and the negative direction of the Y axis and in the negative direction of the X axis and the positive direction of the Y axis. As indicated by arrows affixed to the viewpoint 215 and the viewpoint 216 in FIGS. 16A and 16B, a visual line vector of the surface of the second layer corresponding to the surface including the +Z surface 85 of the first layer and a visual line vector of the surface of the second layer corresponding to the surface including the −Z surface 86 are (0, 0, 1) and (0, 0, -1) similarly to the first layer.

As described above, in the example of FIGS. 16A and 16B, the viewpoints 211 to 216 of the surfaces of the second layer are set at the positions moved from the viewpoint O of the first layer by the length a in two directions perpendicular to the visual line vectors. In addition, the visual line vectors of the surfaces of the second layer are the same as the visual line vectors of the corresponding surfaces of the first layer. Further, directions in which the viewpoints 211 to 216 of the surfaces of the second layer are shifted from the viewpoint O are different for each surface. In addition, the viewpoints 211 to 216 are symmetric to each other with respect to the viewpoint O.

Note that the distance between the viewpoints 191 to 196 of the surfaces of the second layer and the viewpoint O in two directions of the X axis direction, the Y axis direction, and the Z axis direction is not limited to the length a of the half of each side of the cube 80.

(Second configuration example of table of viewpoint position information and surface information of second layer)

FIG. 17 is a diagram illustrating a configuration example of the table of the viewpoint position information and the surface information of the second layer in the metadata generated by the metadata generation unit 57 in FIG. 3 in a case in which the viewpoints 211 to 216 in FIGS. 16A and 16B are set as the viewpoints of the surfaces of the second layer.

The table in FIG. 17 is the same as the table in FIG. 15 except for the viewpoint position information.

Specifically, in the table in FIG. 17, coordinates (a, −a, 0), (−a, a, 0), (0, a, −a), (0, −a, a), (−a, 0, a), and (a, 0, −a) of the viewpoints 211 to 216 when the viewpoint O is the origin are registered respectively in association with the common portions "posZ2," "negZ2," "posX2," "negX2," "posY2," and "negY2" of the file names.

(Description of Process of Content Server)

Figure 18:
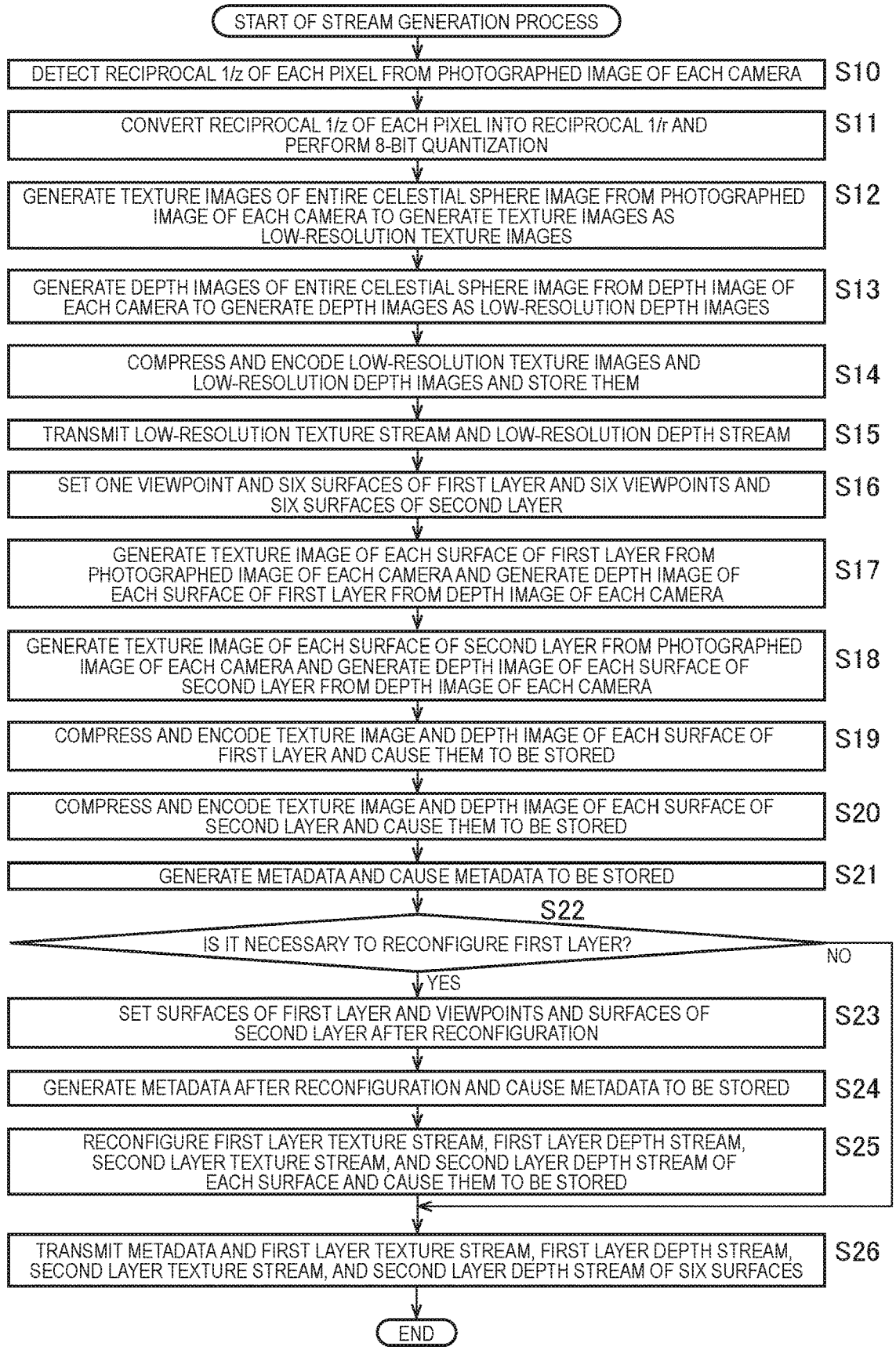
FIG. 18 is an explanatory flowchart illustrating a stream generation process.

FIG. 18 is an explanatory flowchart illustrating a stream generation process of the content server 12 in FIG. 2. The stream generation process starts when a photographed image of each camera is supplied in units of frames from the multi-camera unit 11 in FIG. 1.

In step S10 of FIG. 18, the depth detection unit 31 of the content server 12 detects the reciprocal 1/z of each pixel of the photographed image of each camera from the photographed image of each camera supplied from the multi-camera unit 11 and supplies the reciprocal 1/z to the quantization unit 32.

In step S11, the quantization unit 32 converts the reciprocal 1/z of each pixel of the photographed image of each camera into the reciprocal 1/r when a predetermined 3-dimensional position in the camera coordinate system considered as a viewpoint in an entire celestial sphere image is set as a viewpoint, and performs the 8-bit quantization on the reciprocal 1/r. The quantization unit 32 generates depth images of each camera by setting a value after the 8-bit quantization of the reciprocal 1/r of each pixel of the photographed image of each camera as a pixel value and supplies the depth images to the low-resolution image processing unit 33 and the high-resolution image processing unit 34.

In step S12, the low-resolution image processing unit 33 generates the texture images of the entire celestial sphere image from the photographed image of each camera supplied from the multi-camera unit 11 using the predetermined 3-dimensional position in the camera coordinate system as the viewpoint and lowers resolutions of the texture images.

In step S13, the low-resolution image processing unit 33 generates the depth images of the entire celestial sphere image from the depth images of each camera supplied from the quantization unit 32 as in the texture images of the entire celestial sphere image and lowers resolutions of the texture images.

In step S14, the low-resolution image processing unit 33 compresses and encodes the low-resolution texture images generated through the process of step S12 and the low-resolution depth images generated through the process of step S13 and stores the low-resolution texture images and the low-resolution depth images.

In step S15, the low-resolution image processing unit 33 transmits the stored low-resolution texture stream and low-resolution depth stream to the home server 13 in FIG. 1.

In step S16, the setting unit 56 (see FIG. 3) of the high-resolution image processing unit 34 sets the origin in the 3D model coordinate system as one common viewpoint of the first layer and sets six surfaces including six surface of the cube in which the viewpoint of the first layer is set as a center as the surfaces of the first layer. In addition, the setting unit 56 sets six viewpoints and six surfaces of the second layer corresponding to the surfaces of the first layer. The setting unit 56 supplies one piece of viewpoint position information of the first layer and the surface information of the six surfaces to the first layer generation unit 52 and the metadata generation unit 57. In addition, the setting unit 56 supplies the six pieces of viewpoint position information and the six pieces of surface information of the second layer to the second layer generation unit 54 and the metadata generation unit 57.

In step S17, the first layer generation unit 52 sets the viewpoint of the entire celestial sphere image in the camera coordinate system as the origin and generates the texture image of each surface corresponding to each piece of surface information of the first layer from the photographed image of each camera using the origin indicated by the viewpoint position information of the first layer as the viewpoint. In addition, the first layer generation unit 52 generates the depth image of each surface corresponding to each piece of surface information of the first layer from the depth image of each camera as in the texture image.

In step S18, the second layer generation unit 54 sets the viewpoint of the entire celestial sphere image in the camera coordinate system as the origin for each surface corresponding to the surface information of the second layer and generates the texture image from the photographed image of each camera using the 3-dimensional position indicated by the viewpoint position information of the second layer as the viewpoint. In addition, the second layer generation unit 54 generates the depth image of the second layer from the depth image of each camera as in the texture image for each surface corresponding to the surface information of the second layer.

In step S19, the encoder 53 compresses and encodes the texture image and the depth image of each surface of the first layer supplied from the first layer generation unit 52 for each surface and each kind of image and supplies the texture image and the depth image to the storage 58 to cause the storage 58 to store the texture image and the depth image.

In step S20, the encoder 55 compresses and encodes the texture image and the depth image of each surface of the second layer supplied from the second layer generation unit 54 for each surface and each kind of image and supplies the texture image and the depth image to the storage 58 to cause the storage 58 to store the texture image and the depth image.

In step S21, the metadata generation unit 57 generates a table including the viewpoint position information and the surface information of the first layer and the viewpoint position information and the surface information of the second layer supplied from the setting unit 56 as metadata and supplies the table to the storage 58 to cause the storage 58 to store the table.

In step S22, the reconfiguration unit 59 determines whether or not it is necessary to reconfigure the texture images and the depth images of the first layer. For example, the reconfiguration unit 59 determines that it is necessary to reconfigure the texture images and the depth images of the first layer in a case in which an instruction to change the number of surfaces, the angles of field, or the intervals, the positions, or the inclination of the surfaces of the first layer is given from the user.

In step S22, in a case in which it is determined that it is necessary to reconfigure the texture images and the depth images of the first layer, the process proceeds to step S23. In step S23, the reconfiguration unit 59 sets the surfaces of the first layer after the reconfiguration and the viewpoints and the surfaces of the second layer corresponding to the surfaces of the first layer after the reconfiguration.

In step S24, the reconfiguration unit 59 generates a table including the viewpoint position information and the surface information of the first layer and the viewpoint position information and the surface information of the second layer after the reconfiguration as metadata and supplies the metadata to the storage 58.

In step S25, the reconfiguration unit 59 reconfigures the first layer texture stream of each surface stored in the storage 58 to a texture stream of the surfaces of the first layer after the reconfiguration set in step S23 and supplies the texture stream to the storage 58 to cause the storage 58 to store the texture stream. In addition, the reconfiguration unit 59 reconfigures the first layer depth stream stored in the storage 58 to the first layer depth stream of the surfaces of the first layer after the reconfiguration set in step S23 and supplies the first layer depth stream to the storage 58 to cause the storage 58 to store the first layer depth stream.

In addition, the reconfiguration unit 59 reconfigures the second layer texture stream of each surface stored in the storage 58 to the second layer texture stream of the viewpoints and the surfaces of the second layer after the reconfiguration set in step S23 and supplies the second layer texture stream to the storage 58 to cause the storage 58 to store the second layer texture stream. The reconfiguration unit 59 reconfigures the second layer depth stream stored in the storage 58 to the second layer depth stream of the viewpoints and the surfaces of the second layer after the reconfiguration set in step S23 and supplies the second layer depth stream to the storage 58 to cause the storage 58 to store the second layer depth stream. Then, the process proceeds to step S26.

Conversely, in a case in which it is determined in step S22 that it is not necessary to reconfigure the texture images and the depth images of the first layer, the process proceeds to step S26.

In step S26, the transmission unit 60 reads the metadata and the first layer texture stream, the first layer depth stream, the second layer texture stream, and the second layer depth stream of six surfaces before the reconfiguration from the storage 58 and transmits the metadata and the first layer texture stream, the first layer depth stream, the second layer texture stream, and the second layer depth stream to the home server 13.

As described above, the content server 12 generates the texture images and the depth images of the occlusion region at the viewpoints of the first layer as the texture images and the depth images of the second layer. Consequently, the home server 13 can generate the occlusion region of the viewpoint O included in the display image by using the texture images and the depth images of the second layer in a case in which a viewing position is different from the viewpoint O. Consequently, the home server 13 can generate a high-quality display image.

In addition, the content server 12 sets the viewpoints of the second layer at 3-dimensional positions different from the viewpoint O of the first layer. Accordingly, in the second layer, the length of the subject extending to the viewpoint O in the direction in which the subject extends to the viewpoint O can be expressed.

Further, the content server 12 sets the y value of each pixel of the depth image as a value obtained by performing the 8-bit quantization on the reciprocal 1/r. Accordingly, it is not necessary for the content server 12 to perform the 8-bit quantization of the depth images at the time of the reconfiguration again.

(Configuration Example of Home Server)

Figure 19:
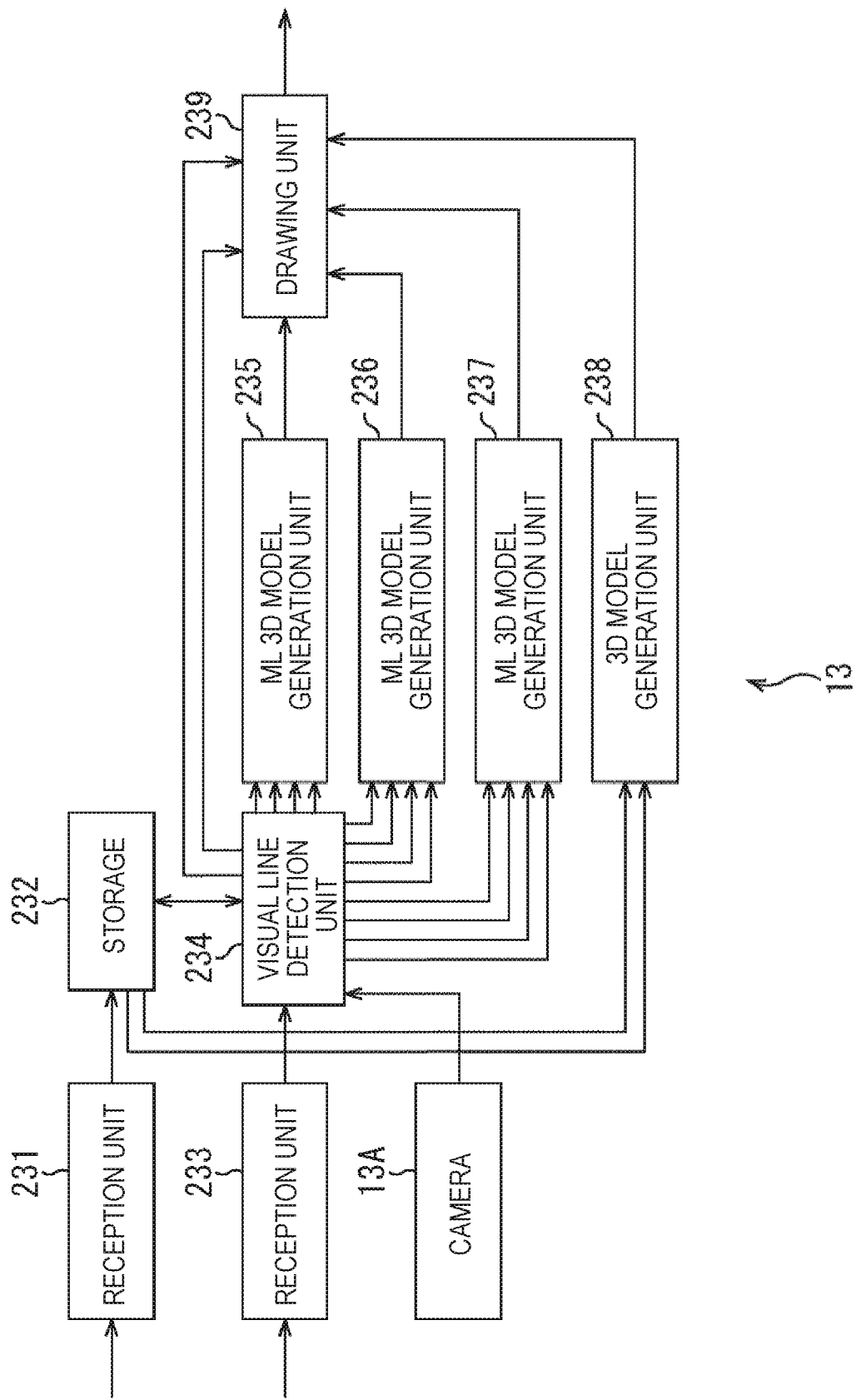
FIG. 19 is a block diagram illustrating a configuration example of a home server.

FIG. 19 is a block diagram illustrating a configuration example of the home server 13 in FIG. 1.

The home server 13 in FIG. 19 includes a camera 13A, a reception unit 231, a storage 232, a reception unit 233, a visual line detection unit 234, an ML 3D model generation unit 235, an ML 3D model generation unit 236, an ML 3D model generation unit 237, a 3D model generation unit 238, and a drawing unit 239.

The reception unit 231 of the home server 13 receives the low-resolution texture stream and the low-resolution depth stream, the first layer texture stream, the first layer depth stream, the second layer texture stream, and the second layer depth stream of the six surfaces, and the metadata transmitted from the content server 12 and supplies the low-resolution texture stream and the low-resolution depth stream, the first layer texture stream, the first layer depth stream, the second layer texture stream, and the second layer depth stream of the six surfaces, and the metadata to the storage 232.

The storage 232 stores the low-resolution texture stream and the low-resolution depth stream, the first layer texture stream, the first layer depth stream, the second layer texture stream, and the second layer depth stream of the six surfaces, and the metadata supplied from the reception unit 231.

The reception unit 233 receives a detection result of the gyro sensor 15B in FIG. 1 from the head mount display 15 and supplies the detection result to the visual line detection unit 234.

The visual line detection unit 234 decides a visual line direction of a viewer in the 3D model coordinate system on the basis of a detection result of the gyro sensor 15B supplied from the reception unit 233. In addition, the visual line detection unit 234 acquires a photographed image of the marker 15A from the camera 13A and detects a viewing position in the 3D model coordinate system on the basis of the photographed image.

The visual line detection unit 234 reads the table of the first layer in the metadata from the storage 232. The visual line detection unit 234 decides three surfaces corresponding to visual line vectors closest to the visual line extending from the viewing position in the visual line direction as selection surfaces among the six surfaces on the basis of the viewing position and the visual line direction in the 3D model coordinate system and the table of the first layer. Specifically, the visual line detection unit 234 decides a surface including one of the +X surface 81 and the −X surface 82, a surface including one of the +Y surface 83 and the −Y surface 84, and a surface including one of the +Z surface 85 and the −Z surface 86 as selection surfaces.

When the selection surfaces are decided in this way, a ratio of a high-resolution region in the display image generated using the texture images and the depth images of the first layer and the second layer corresponding to the selection surfaces by the drawing unit 239 to be described below becomes highest. In addition, when the three selection surfaces are decided, the ratio of the high-resolution region in the display image in a case in which the visual line is oriented to the vicinity of a vertex of the cube 80 can be caused to increase, compared to a case in which one selection surface is selected.

The visual line detection unit 234 reads the first layer texture stream, the first layer depth stream, the second layer texture stream, and the second layer depth stream corresponding to the three selection surfaces from the storage 232. The visual line detection unit 234 supplies the read first layer texture stream, first layer depth stream, second layer texture stream, and second layer depth stream to the ML 3D model generation units 235 to 237 for each surface. In addition, the visual line detection unit 234 reads the low-resolution texture stream and the low-resolution depth stream from the storage 232 and supplies the low-resolution texture stream and the low-resolution depth stream to the 3D model generation unit 238.

The visual line detection unit 234 decides a visual field range of the viewer in the 3D model coordinate system on the basis of the viewing position and the visual line direction in the 3D model coordinate system. The visual line detection unit 234 supplies the visual field range and the viewing position of the viewer to the drawing unit 239. The visual line detection unit 234 supplies the three selection surfaces and the viewpoint position information and the surface information of three surfaces of the second layer corresponding to the three selection surfaces to the drawing unit 239.

The ML 3D model generation units 235 to 237 each generate a 3-dimensional position (u, v, z) and connection information in a texture image coordinate system of a sampling point corresponding to each pixel of the texture images of the first layer and 3-dimensional data with RGB values which are color information, using the first layer texture stream and the first layer depth stream. Note that the connection information of each sampling point is information indicating connection between the sampling point (vertex) and another sampling point. The texture image coordinate system is a coordinate system that has the transverse direction of the texture image as a u axis, has the longitudinal direction as a v axis, and has the depth direction as a z axis.

In addition, the ML 3D model generation units 235 to 237 each generate 3-dimensional data of the sampling point corresponding to each pixel of the texture images of the second layer using the second layer texture stream and the second layer depth stream supplied from the visual line detection unit 234. The ML 3D model generation units 235 to 237 supply the 3-dimensional data of the first layer and the second layer to the drawing unit 239.

The 3D model generation unit 238 decodes the low-resolution texture stream and the low-resolution depth stream supplied from the visual line detection unit 234 to generate a low-resolution texture image and a low-resolution depth image. The 3D model generation unit 238 converts YCbCr values which are pixel values of the pixels of the low-resolution texture image into RGB values to set the RGB values of the sampling points corresponding to the pixels. In addition, the 3D model generation unit 238 performs 8-bit inverse quantization on the pixel values of the pixels of the low-resolution depth image to obtain the reciprocal 1/r. Then, the 3D model generation unit 238 obtains a 3-dimensional position (u, v, z) of each pixel as a 3-dimensional position (u, v, z) of the sampling point corresponding to each pixel on the basis of the reciprocal 1/r of each pixel of the low-resolution depth image.

In addition, the 3D model generation unit 238 generates connection information of each sampling point so that three adjacent sampling points are connected on the basis of the 3-dimensional position (u, v, z) of each sampling point. The 3D model generation unit 238 supplies the 3-dimensional position (u, v, z) of each sampling point, the connection information, and the RGB values as the 3-dimensional data of the low-resolution texture image to the drawing unit 239.

The drawing unit 239 performs triangular patch drawing (point group drawing) of the low-resolution texture image in the 3D model coordinate system on the basis of the 3-dimensional data of the low-resolution texture image supplied from the 3D model generation unit 238. Thereafter, the drawing unit 239 performs the triangular patch drawing of the texture images of the first layer and the second layer in the 3D model coordinate system on the basis of the 3-dimensional data of the first layer and the second layer supplied from each of the ML 3D model generation units 235 to 237 and the viewpoint position information and the surface information supplied from the visual line detection unit 234.

That is, a viewpoint of the low-resolution texture image is the origin in the 3D model coordinate system and the position and the size of each surface of a regular octahedron which is a 3D model are decided in advance. Accordingly, the drawing unit 239 can obtain internal parameters and external parameters of each camera corresponding to each surface of the regular octahedron. Consequently, the drawing unit 239 can recognize a position (u, v) of each sampling point on a screen and a 3-dimensional position (X, Y, Z) in the 3D model coordinate system from a 3-dimensional position (u, v, z) of each sampling point of the low-resolution texture image using the internal parameters and external parameters. As a result, the drawing unit 239 can perform the triangular patch drawing using the position (u, v) of each sampling point on the screen and the 3-dimensional position (X, Y, Z) in the low-resolution texture image, the connection information, and the RGB values.

In addition, the drawing unit 239 can obtain the internal parameters and the external parameters of each camera corresponding to each surface of the first layer and the second layer on the basis of the viewpoint position information and the surface information of the first layer and the second layer. Accordingly, the drawing unit 239 can recognize a position (u, v) of each sampling point on a screen and a 3-dimensional position (X, Y, Z) from a 3-dimensional position (u, v, z) of each sampling point of the first layer and the second layer using the internal parameters and external parameters. As a result, the drawing unit 239 can perform the triangular patch drawing using the position (u, v) of each sampling point on the screen and the 3-dimensional position (X, Y, Z) in the first layer and the second layer, the connection information, and the RGB values.

The drawing unit 239 (an image generation unit) generates a display image by performing perspective projection (mapping) on a triangular patch drawn in the 3D model coordinate system to a visual field range using the viewing position supplied from the visual line detection unit 234 as a viewpoint. The drawing unit 239 transmits the display image to the conversion device 14 in FIG. 1.

(Configuration Example of ML 3D Model Generation Unit)

Figure 20:
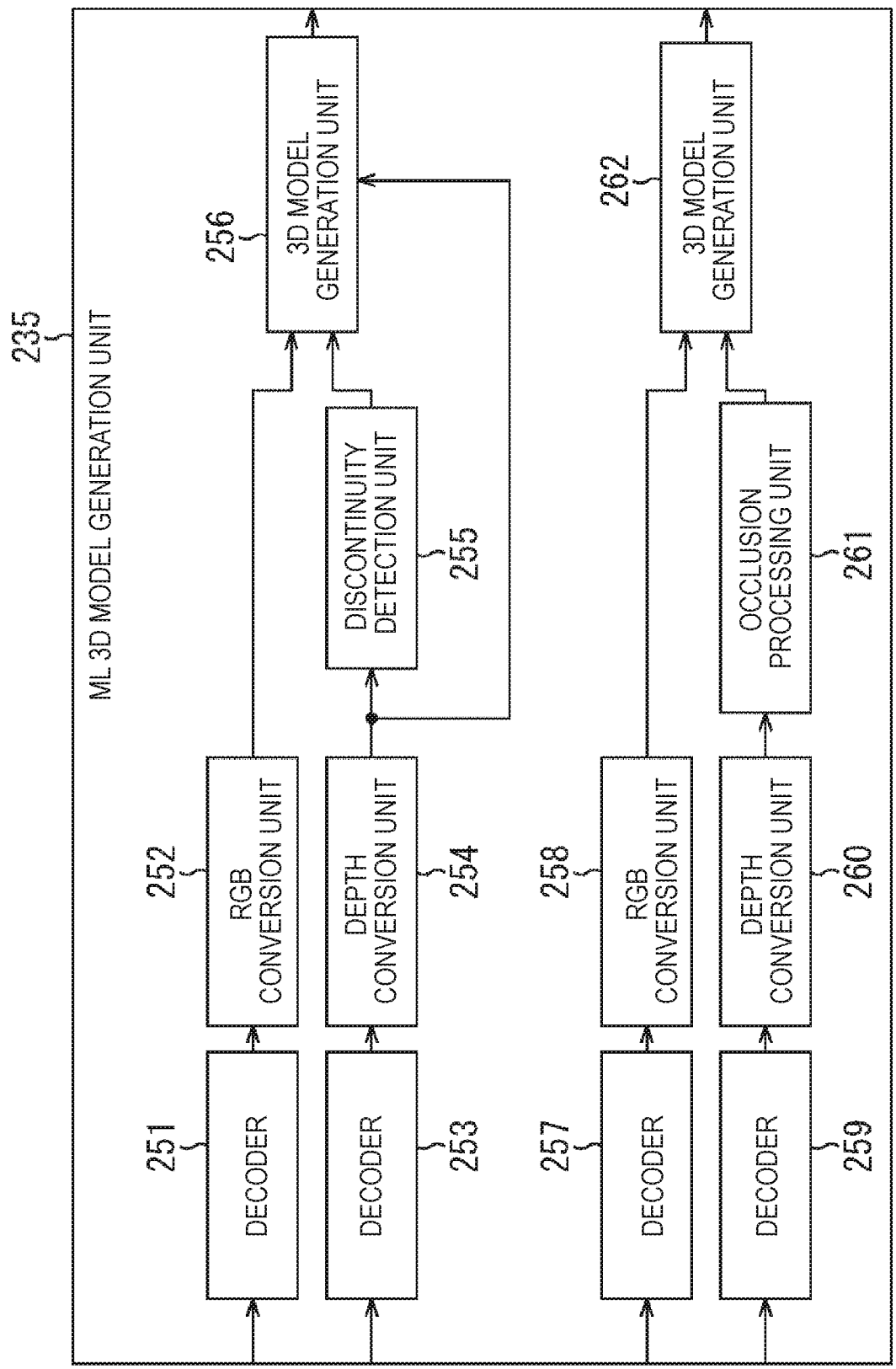
FIG. 20 is a block diagram illustrating a configuration example of an ML 3D model generation unit.

FIG. 20 is a block diagram illustrating a configuration example of the ML 3D model generation unit 235 in FIG. 19.

The ML 3D model generation unit 235 in FIG. 20 includes a decoder 251, an RGB conversion unit 252, a decoder 253, a depth conversion unit 254, a discontinuity detection unit 255, a 3D model generation unit 256, a decoder 257, an RGB conversion unit 258, a decoder 259, a depth conversion unit 260, an occlusion processing unit 261, and a 3D model generation unit 262.

The decoder 251 of the ML 3D model generation unit 235 decodes the first layer texture stream supplied from the visual line detection unit 234 in FIG. 19 to generate the texture images of the first layer. The decoder 251 supplies the texture images of the first layer to the RGB conversion unit 252.

The RGB conversion unit 252 converts YCbCr values which are pixel values of the pixels of the texture images of the first layer into RGB values to set the RGB values of the sampling points corresponding to the pixels. Then, the RGB conversion unit 252 supplies the RGB value of each sampling point to the 3D model generation unit 256.

The decoder 253 decodes the first layer depth stream supplied from the visual line detection unit 234 to generate the depth images of the first layer. The decoder 253 supplies the depth images of the first layer to the depth conversion unit 254.

The depth conversion unit 254 performs the 8-bit inverse quantization on the pixel value of each pixel of the depth images of the first layer supplied from the decoder 253 to obtain the reciprocal 1/r. Then, the depth conversion unit 254 obtains a 3-dimensional position (u, v, z) of each pixel as a 3-dimensional position (u, v, z) of a sampling point corresponding to each pixel on the basis of the reciprocal 1/r of each pixel of the depth images of the first layer. The depth conversion unit 254 supplies the 3-dimensional position (u, v, z) of each sampling point to the discontinuity detection unit 255 and the 3D model generation unit 256.

The discontinuity detection unit 255 detects a discontinuous pixel which is a pixel corresponding to the sampling point in which a difference of the z coordinate from the adjacent sampling point is equal to or greater than a threshold among the pixels of the depth images of the first layer on the basis of the 3-dimensional position (u, v, z) of each sampling point supplied from the depth conversion unit 254. The discontinuity detection unit 255 supplies the 3-dimensional position (u, v, z) of the sampling point corresponding to the discontinuous pixel to the 3D model generation unit 256.

The 3D model generation unit 256 (a connection information generation unit) generates connection information of each sampling point so that three adjacent sampling points among the sampling points are connected on the basis of the 3-dimensional position (u, v, z) of each sampling point supplied from the depth conversion unit 254. That is, the 3D model generation unit 256 generates the connection information indicating connection among three vertexes of the triangular patch that has the sampling points as vertexes for each sampling point. Then, the 3D model generation unit 256 deletes connection information indicating connection with the sampling point corresponding to the discontinuous pixel in the generated connection information of each sampling point on the basis of the 3-dimensional position (u, v, z) of the sampling point corresponding to the discontinuous pixel supplied from the discontinuity detection unit 255.

The 3D model generation unit 256 generates a 3-dimensional position (u, v, z) of each sampling point of the first layer, the RGB value, and the connection information after the deletion as 3-dimensional data of the first layer and supplies the 3-dimensional data to the drawing unit 239 in FIG. 19.

Since processes of the decoder 257, the RGB conversion unit 258, the decoder 259, and the depth conversion unit 260 are the same as the decoder 251, the RGB conversion unit 252, the decoder 253, and the depth conversion unit 254 except that the first layer is substituted with the second layer as a processing target layer, the description thereof will be omitted.

The occlusion processing unit 261 detects a discontinuous pixel among the pixels of the depth images of the second layer on the basis of the 3-dimensional position (u, v, z) of each sampling point supplied from the depth conversion unit 260. The occlusion processing unit 261 performs an occlusion process of correcting the 3-dimensional position (u, v, z) of the sampling point corresponding to the discontinuous pixel on the basis of the 3-dimensional position (u, v, z) of each sampling point of the second layer.

Specifically, for example, the occlusion processing unit 261 corrects a 2-dimensional position (u, v) of the sampling point corresponding to the discontinuous pixel to a 2-dimensional position (u, v) of the sampling point in the vicinity and front of this sampling point. The occlusion processing unit 261 supplies the 3-dimensional position (u, v, z) after the occlusion process of each sampling point of the second layer to the 3D model generation unit 262.

For each sampling point, the 3D model generation unit 262 generates connection information indicating connection between the sampling point and two adjacent sampling points on the basis of the 3-dimensional position (u, v, z) of each sampling point supplied from the occlusion processing unit 261. The 3D model generation unit 262 generates the 3-dimensional position (u, v, z) of each sampling point, the connection information, and the RGB value supplied from the RGB conversion unit 258 as 3-dimensional data of the second layer. The 3D model generation unit 256 supplies the 3-dimensional data of the second layer to the drawing unit 239 in FIG. 19.

Note that although not illustrated, the ML 3D model generation unit 236 and the ML 3D model generation unit 237 have the same configuration as the ML 3D model generation unit 235 in FIG. 20.

(Description of advantageous effects of occlusion process and deletion of connection information)

Figure 22:
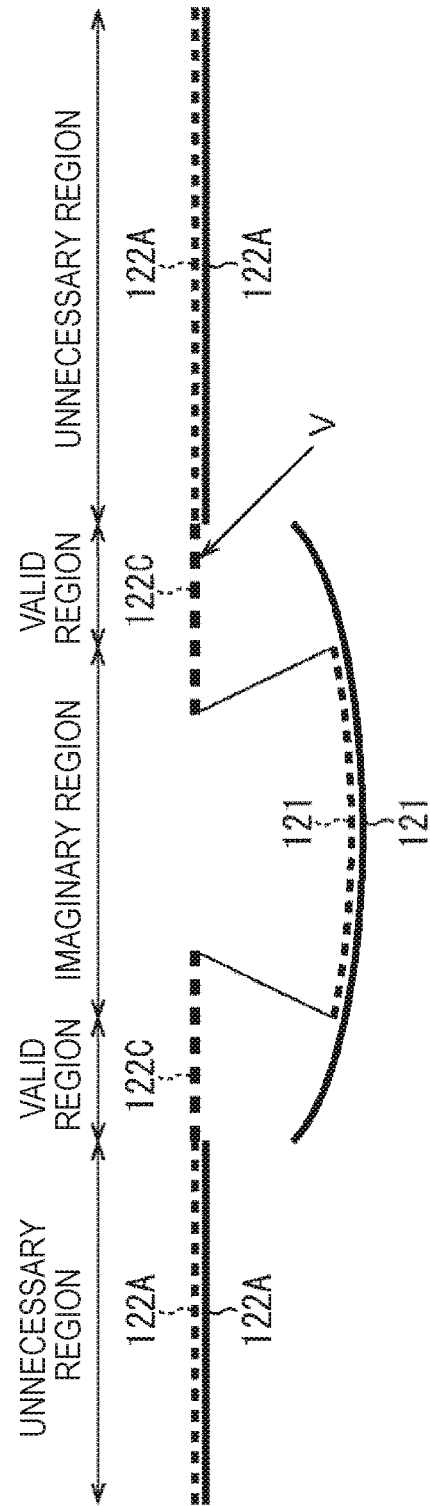
FIG. 22 is an explanatory diagram illustrating another example of connection information.

FIGS. 21A and 21B are explanatory diagrams illustrating connection information in a case in which connection information indicating connection with the sampling point corresponding to the discontinuous pixel is not deleted in the connection information of the first layer. FIG. 22 is an explanatory diagram illustrating the connection information in the case of the deletion.

In FIGS. 21A 21B and 22, the right and left directions indicate the transverse direction of a texture image and the upper and lower directions indicate a depth direction of the texture image. The upper direction of FIGS. 21A 21B and 22 is a front side and the lower direction is a rear side. In addition, in FIGS. 21A 21B and 22, a solid line indicates a 3-dimensional position (u, v, z) of each sampling point of the first layer and a dotted line indicates a 3-dimensional position (u, v, z) of each sampling point of the second layer. In addition, in the examples of FIGS. 21A 21B and 22, a subject is the foreground 111 and a background 112 in FIG. 10.

In a case in which the occlusion process is not performed on both the first layer and the second layer, as illustrated in FIG. 21A, a 3-dimensional position of the sampling point corresponding to the discontinuous pixel in a boundary between the photographed image 121 of the foreground 111 of the first layer and the photographed image 122A of the region 112A of the background 112 is not changed.

In addition, in a case in which the connection information indicating the connection with the sampling point corresponding to the discontinuous pixel in both the first layer and the second layer is not deleted, as illustrated in FIG. 21A, the sampling points corresponding to the discontinuous pixels of the first layer and the second layer are connected to two adjacent sampling points.

Accordingly, a triangular patch that has the sampling point corresponding to the discontinuous pixel of the first layer and two adjacent sampling points as vertexes is generated and painting of the photographed image 122C of a valid region is crushed due to the triangular patch. Consequently, in a case in which a display image including the photographed occlusion region 112C corresponding to a visual line V oriented from the lower right side to the upper left of the drawing is generated, a valid region of the second layer in which the photographed image 122C of the photographed occlusion region 112C is disposed may not be used.

In addition, the connection information indicating the connection with the sampling points corresponding to the discontinuous pixels in both the first layer and the second layer is not deleted. However, in a case in which the occlusion process is performed, as illustrated in FIG. 21B, 2-dimensional positions of the sampling points corresponding to the discontinuous pixels of the first layer and the second layer are corrected to 2-dimensional positions of the sampling points in the vicinity and front of the sampling points.

Accordingly, in a case in which the display image corresponding to the visual line V is generated, the photographed image 122A of the region 112A of the first layer can be used as the display image of the photographed occlusion region 112C. As a result, quality of the display image is improved.

However, the sampling point corresponding to the discontinuous pixel of the first layer after the occlusion process is connected to two adjacent sampling points to generate a triangular patch. Accordingly, in a case in which the display image corresponding to the visual line V is generated as in the case of FIG. 21A, the valid region of the second layer in which the photographed image 122C of the photographed occlusion region 112C is disposed may not be used.

On the other hand, the 3D model generation unit 256 deletes the connection information indicating the connection with the discontinuous pixel of the first layer, as illustrated in FIG. 22. Accordingly, the triangular patch that has the sampling point corresponding to the discontinuous pixel of the first layer as a vertex is not generated. Consequently, in a case in which the display image corresponding to the visual line V is generated, the valid region of the second layer in which the photographed image 122C of the photographed occlusion region 112C is disposed can be used. Since the connection information in the second layer is not deleted, the triangular patch of the second layer is necessarily in the region in which there is no triangular patch of the first layer.

In addition, the occlusion processing unit 261 performs the occlusion process on the second layer. Accordingly, as illustrated in FIG. 22, the 2-dimensional position of the sampling point on the rear side among the sampling points corresponding to the continuous pixels in the boundary between the valid region and the imaginary region of the second layer is corrected to the 2-dimensional position of the sampling point in the vicinity and front of the sampling point. Accordingly, the occlusion region in the second layer is deleted. Consequently, quality of the second layer used to generate the display image corresponding to the visual line V is improved. As a result, the quality of the display image is improved.

(Description of advantageous effect of field angle of surfaces of first layer)

FIGS. 23A, 23B, 24A, and 24B are explanatory diagrams illustrating examples of sampling points in a case in which the field angle of each surface of the first layer is 90 degrees and 100 degrees, respectively.

In the examples of FIGS. 23A, 23B, 24A, and 24B, to facilitate the description, resolutions of the texture image and the depth image of the first layer in a case in which the field angle of each surface of the first layer is 90 degrees and 100 degrees are assumed to be 4×4 pixels and 6×6 pixels, respectively.

Figure 23B:
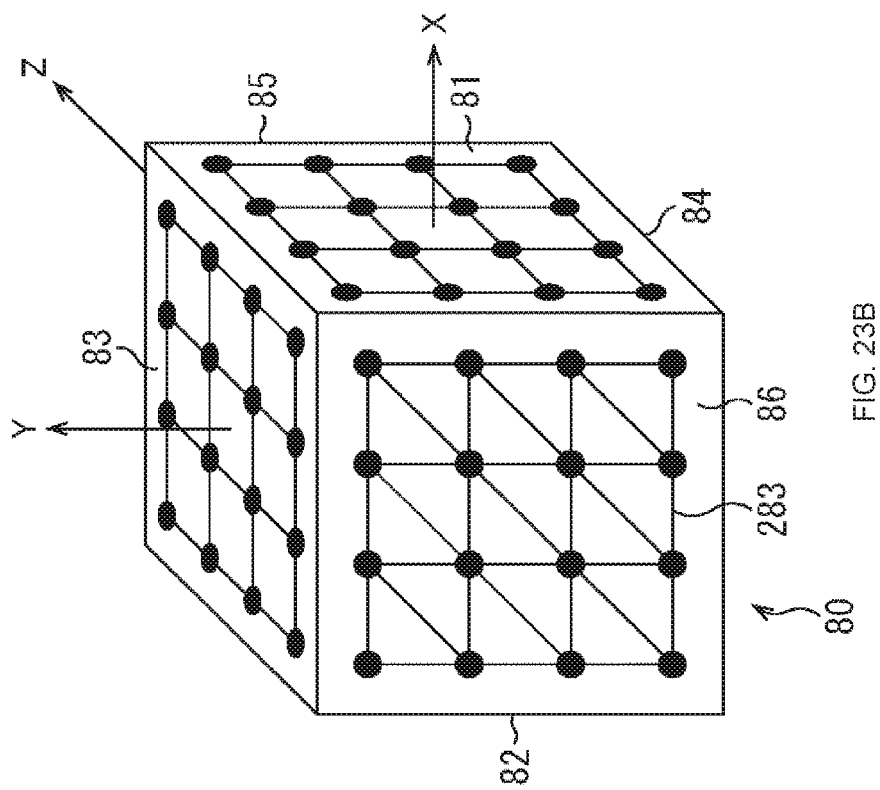
FIGS. 23A and 23B are explanatory diagrams illustrating an example of sampling points.

As illustrated in FIG. 23B, in a case in which the field angle of each surface of the first layer is 90 degrees, six surfaces of the first layer are the six surfaces 81 to 86 that form the cube 80.

Figure 23A:
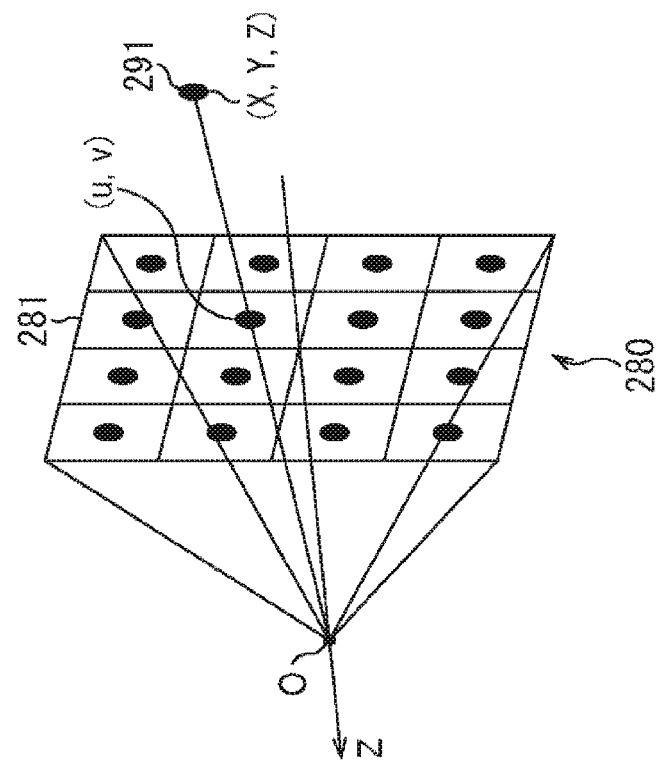

However, as illustrated in FIG. 23A, a position (u, v) of a sampling point 291 on a texture image 280 of the −Z surface 86 of the first layer, that is, a position at which a line oriented from the viewpoint O in the 3D model coordinate system to the sampling point 291 intersects the −Z surface 86 is a center of each pixel 281. In addition, the positions (u, v) of the sampling points of the other surfaces 81 to 85 are also centers of the pixels similarly to the −Z surface 86.

Accordingly, as illustrated in FIG. 23B, sizes of all the triangular patches formed by connecting three adjacent sampling points to each other among the sampling points indicated by black circles in the drawing in a u direction and a v direction of the region 283 on each of the surfaces 81 to 86 are less than each of the surfaces 81 to 86 by a half size of the pixel. Consequently, the triangular patches corresponding to the boundaries of the surfaces 81 to 86 are not generated. As a result, it is difficult to generate the display image with high quality of a visual line passing through the boundaries of the surfaces 81 to 86.

Figure 24B:
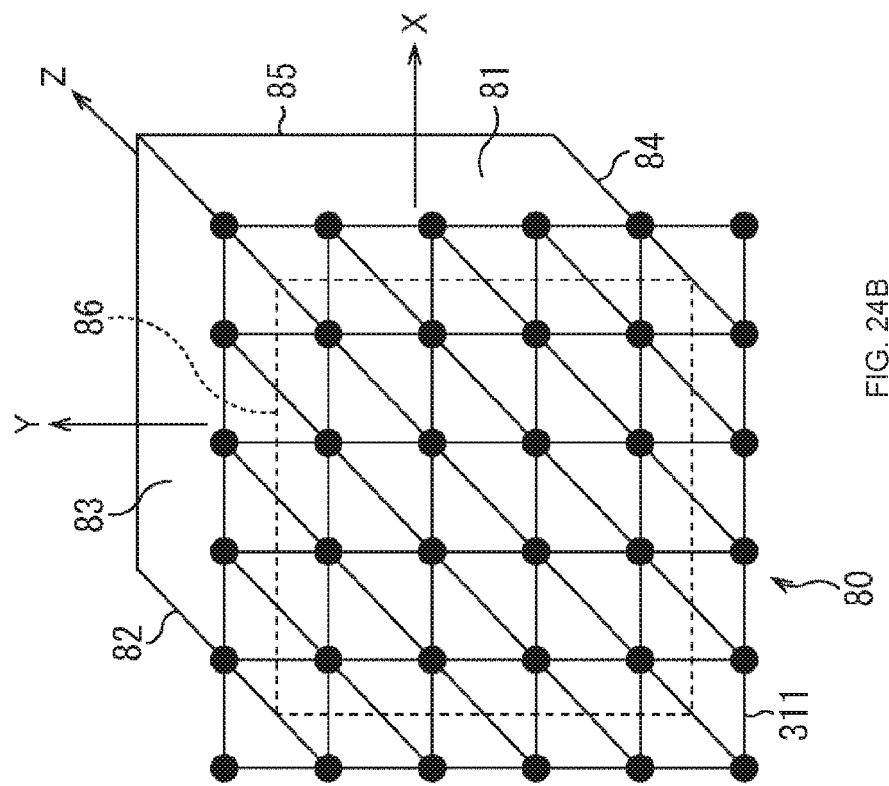
FIGS. 24A and 24B are explanatory diagrams illustrating another example of sampling points.
Figure 24A:
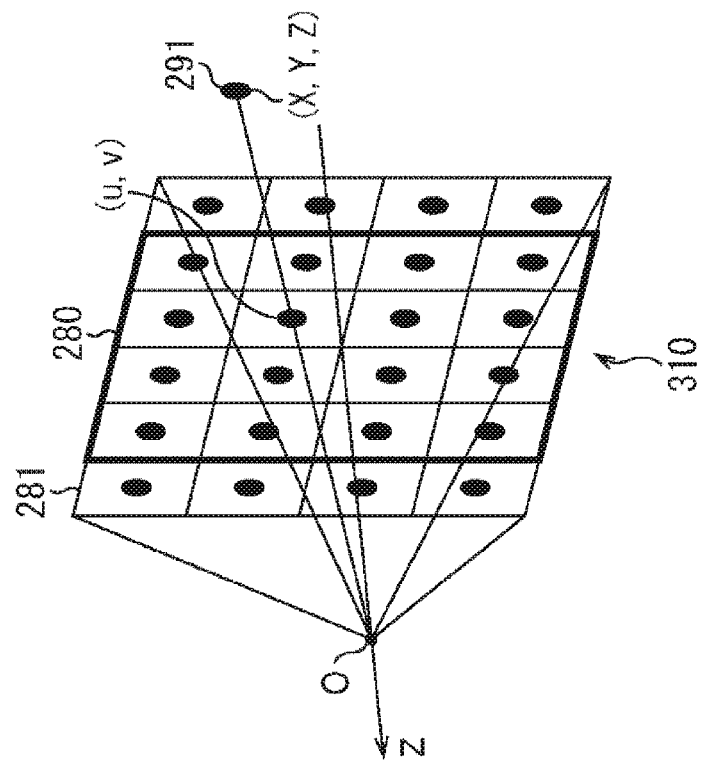

In contrast, in a case in which a field angle of each surface of the first layer is 100 degrees, as illustrated in FIG. 24A, the size of a texture image 310 of a surface of the first layer including the −Z surface 86 is 6×6 pixels greater than the size of the texture image 280 in FIGS. 23A and 23B. The size of the texture image of each surface of the first layer including the other surfaces 81 to 85 is also similarly 6×6 pixels.

Accordingly, as illustrated in FIG. 24B, sizes of all the triangular patches formed by connecting three adjacent sampling points to each other among the sampling points indicated by black circles in the drawing in a u direction and a v direction of a region 311 on the −Z surface 86 are greater than each of the −Z surface 86 by a half size of the pixel. Although not illustrated, the size of the region of the triangular patch of each surface of the first layer including the other surfaces 81 to 85 in the u direction and the v direction is also greater than each of the surfaces 81 to 85 by the half size of the pixel as in the region 311. Accordingly, the triangular patches corresponding to the boundaries of the surfaces 81 to 86 are generated. As a result, it is possible to generate a display image with high quality of any visual line including the visual line passing through the boundaries of the surfaces 81 to 86.

In FIGS. 23A, 23B, 24A, and 24B, the advantageous effect in the case in which the field angle of each surface of the first layer is 100 degrees has been described. However, when the field angle of each surface of the first layer is greater than 90 degrees, a similar advantageous effect is obtained even in a case in which the field angle is not 100 degrees.

(Description of advantageous effect of field angle of surface of second layer)

Figure 25B:
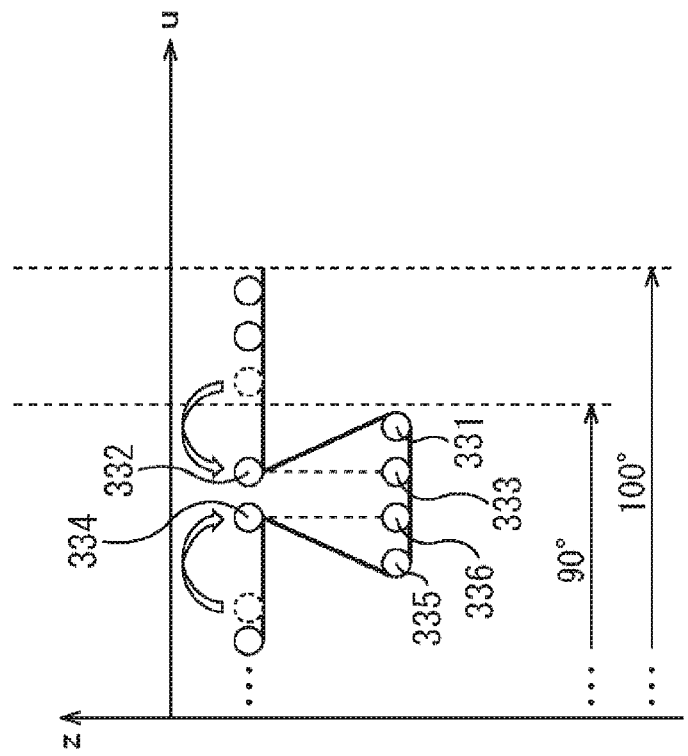
FIGS. 25A and 25B are explanatory diagrams illustrating an occlusion process.
Figure 25A:
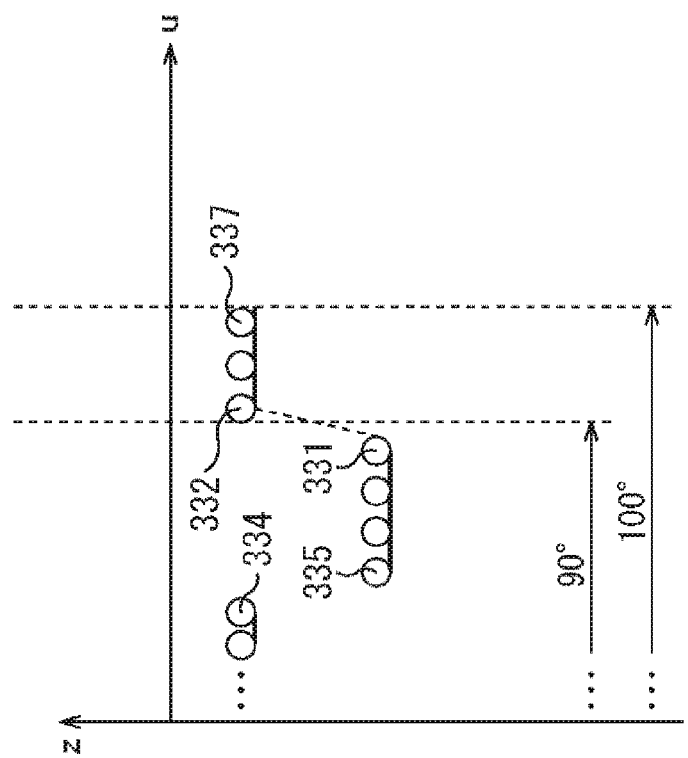

FIGS. 25A and 25B are explanatory diagrams illustrating an occlusion process in a case in which the field angle of each surface of the second layer is 90 degrees and 100 degrees.

In FIGS. 25A and 25B, the horizontal axis indicates the u axis and the vertical axis indicates the z axis. In addition, a circle indicates a sampling point. Further, in the example of FIGS. 25A and 25B, the z coordinate is larger as a position in the depth direction is on the rear side.

In a case in which the field angle of each surface of the second layer is 90 degrees, the sampling point is mapped to only any one surface of the second layer. Accordingly, as illustrated in FIG. 25A, a sampling point 332 adjacent to a sampling point 331 mapped to an end of a processing target surface in the u direction is not mapped to the processing target surface and the position of the sampling point 332 on the z axis at the time of the occlusion process of the processing target surface is not known.

Consequently, even in a case in which a difference of the z coordinates of the sampling point 331 and the sampling point 332 is equal to or greater than a threshold, a pixel corresponding to the sampling point 331 is not detected as a discontinuous pixel. Similarly, even in a case in which a surface to which the sampling point 332 is mapped is considered to a processing target surface, a pixel corresponding to the sampling point 332 is not detected as a discontinuous pixel. Accordingly, the occlusion process may not be performed on the sampling point 331 and the sampling point 332. That is, since the occlusion process is performed on the sampling point 331 and the sampling point 332, it is necessary to use the depth image of a surface adjacent to the processing target surface in addition to the depth image of the processing target surface.

In contrast, in a case in which the field angle of each surface of the second layer is 100 degrees, a sampling point mapped to a region other than an end of a surface adjacent to the surface are mapped to overlap the end of each surface as an overlap width. For example, the sampling point 332 mapped to the region other than the end of the surface adjacent to the processing target surface is mapped to the end of the processing target surface to which the sampling point 331 is mapped.

Accordingly, in a case in which the difference of the z coordinates of the sampling point 331 and the sampling point 332 is equal to or greater than the threshold, pixels corresponding to the sampling point 331 and the sampling point 332 are detected as discontinuous pixels. Consequently, as illustrated in FIG. 25B, the occlusion process can be performed on the sampling point 331 and the sampling point 332. As a result, the u coordinate of the sampling point 332 corresponding to the discontinuous pixel is corrected to a u coordinate of a sampling point 333 in front of the sampling point 332 (of which the z coordinate is less) and near the sampling point 332.

Note that in the example of FIGS. 25A and 25B, since a difference between the z coordinates of a sampling point 334 and a sampling point 335 mapped to a region other than the end of the processing target surface is equal to or greater than the threshold, pixels corresponding to the sampling point 334 and the sampling point 335 are detected as discontinuous pixels. As a result, as illustrated in FIG. 25B, the u coordinate of the sampling point 334 is corrected to a u coordinate of a sampling point 336 in front of the sampling point 334 and near the sampling point 334.

In addition, a sampling point 337 at the end of the processing target surface is the largest is mapped to a region other than an end of a surface adjacent to the processing target surface. Accordingly, in a case in which this surface is considered to be the processing target surface, it is determined whether or not a pixel corresponding to the sampling point 337 is a discontinuous pixel. In a case in which the pixel is determined to be the discontinuous pixel, the occlusion process can be performed on the sampling point 337.

As described above, in a case in which the field angle of each surface of the second layer is 100 degrees, the occlusion process can also be performed on the sampling point 331 mapped to the end of the region other than the end of each surface using only the sampling point of each surface. As a result, an occlusion region of the second layer is reduced and it is possible to improve quality of the display image.

In FIGS. 25A and 25B, the advantageous effect in the case in which the field angle of each surface of the second layer is 100 degrees has been described. However, when the field angle of each surface of the second layer is greater than 90 degrees, a similar advantageous effect is obtained even in a case in which the field angle is not 100 degrees.

Note that the ML 3D model generation units 235 to 237 may perform image processing such as a filter process performed using peripheral pixels on the texture image or the depth image obtained as a result of the decoding. In this case, it is possible to obtain the advantageous effect of also performing image processing on the end of the region other than the end of each surface as in the occlusion process since the field angle of each surface of the first layer and the second layer is greater than 90 degrees.

(Description of Process of Home Server)

Figure 26:
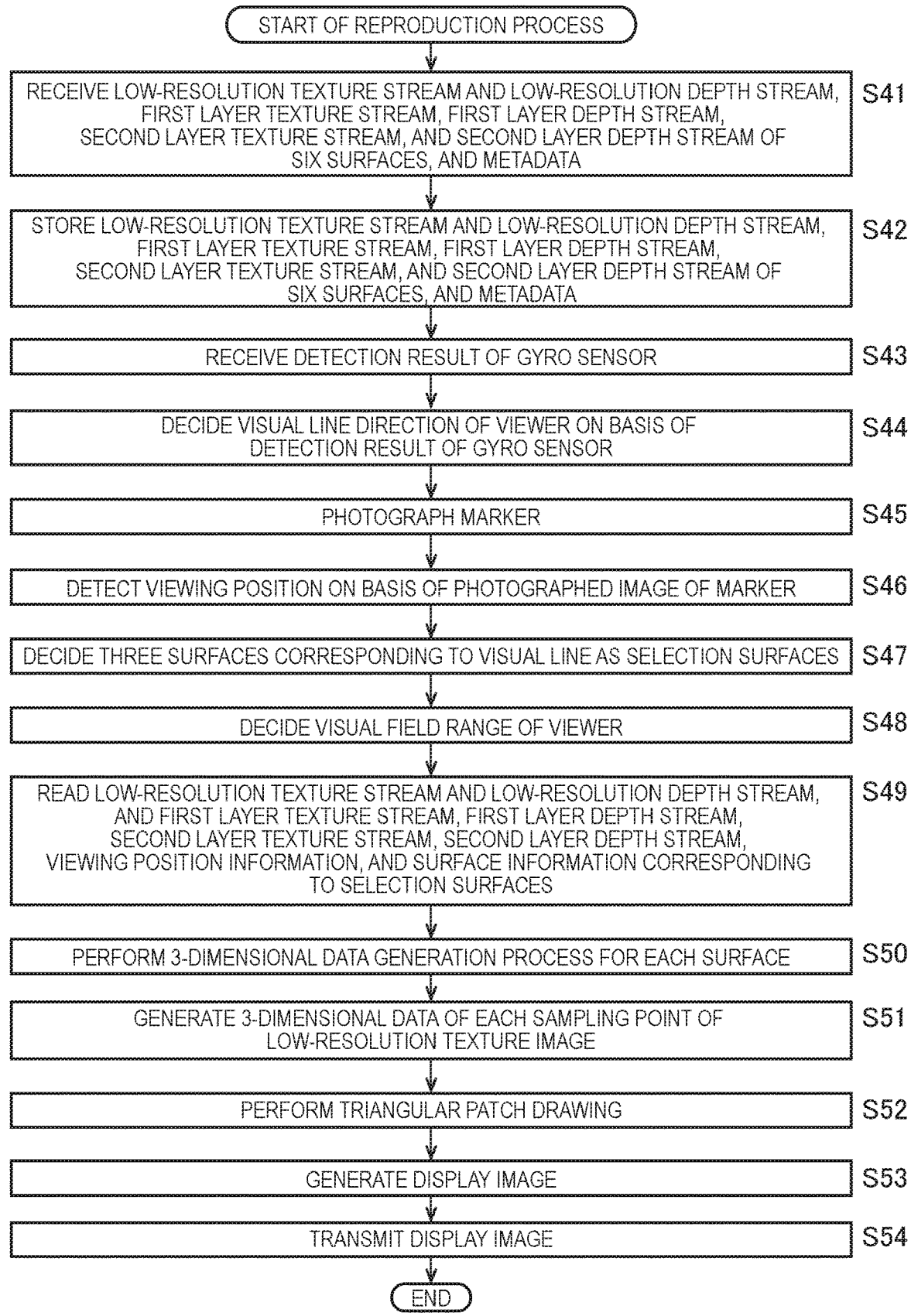
FIG. 26 is an explanatory flowchart illustrating a reproduction process.

FIG. 26 is an explanatory flowchart illustrating a reproduction process of the home server 13 in FIG. 19. The reproduction process starts, for example, when the low-resolution texture stream and the low-resolution depth stream, the first layer texture stream, the first layer depth stream, the second layer texture stream, and the second layer depth stream of the six surfaces, and the metadata transmitted from the content server 12 are transmitted.

In step S41 of FIG. 26, the reception unit 231 of the home server 13 receives, from the content server 12, the low-resolution texture stream and the low-resolution depth stream, the first layer texture stream, the first layer depth stream, the second layer texture stream, and the second layer depth stream of the six surfaces, and the metadata and supplies the low-resolution texture stream and the low-resolution depth stream, the first layer texture stream, the first layer depth stream, the second layer texture stream, and the second layer depth stream of the six surfaces, and the metadata to the storage 232.

In step S42, the storage 232 stores the low-resolution texture stream and the low-resolution depth stream, the first layer texture stream, the first layer depth stream, the second layer texture stream, and the second layer depth stream of the six surfaces, and the metadata.

In step S43, the reception unit 233 receives a detection result of the gyro sensor 15B in FIG. 1 from the head mount display 15 and supplies the detection result to the visual line detection unit 234.

In step S44, the visual line detection unit 234 decides a visual line direction of a viewer in the 3D model coordinate system on the basis of a detection result of the gyro sensor 15B supplied from the reception unit 233. In step S45, the camera 13A photographs the marker 15A attached to the head mount display 15 and supplies a photographed image obtained as a result to the visual line detection unit 234.

In step S46, the visual line detection unit 234 detects a viewing position in the 3D model coordinate system on the basis of the photographed image of the marker 15A supplied from the camera 13A and supplies the viewing position to the drawing unit 239.

In step S47, the visual line detection unit 234 decides three surfaces corresponding to visual line vectors closest to a visual line as selection surfaces among the six surfaces on the basis of the table of the first layer and the viewing position and the visual line direction in the 3D model coordinate system in the metadata stored in the storage 232.

In step S48, the visual line detection unit 234 decides a visual field range of the viewer in the 3D model coordinate system on the basis of the viewing position and the visual line direction in the 3D model coordinate system and supplies the visual field range to the drawing unit 239.

In step S49, the visual line detection unit 234 reads the low-resolution texture stream and the low-resolution depth stream from the storage 232 and supplies the low-resolution texture stream and the low-resolution depth stream to the 3D model generation unit 238. In addition, the visual line detection unit 234 reads the first layer texture stream, the first layer depth stream, the second layer texture stream, and the second layer depth stream corresponding to the three selection surfaces from the storage 232. The visual line detection unit 234 supplies the read first layer texture stream, first layer depth stream, second layer texture stream, and second layer depth stream to the ML 3D model generation units 235 to 237 for each surface. In addition, the visual line detection unit 234 reads the viewpoint position information and the surface information corresponding to the three selection surfaces from the storage 232 and supplies the viewpoint position information and the surface information to the drawing unit 239.

In step S50, the ML 3D model generation units 235 to 237 perform the 3-dimensional data generation process of generating 3-dimensional data of each sampling point of the first layer and the second layer for each surface. The details of the 3-dimensional data generation process will be described below with reference to FIG. 27.

In step S51, the 3D model generation unit 238 generates 3-dimensional data of each sampling point of the low-resolution texture image from the low-resolution texture stream and the low-resolution depth stream supplied from the visual line detection unit 234 and supplies the 3-dimensional data to the drawing unit 239.

In step S52, the drawing unit 239 performs triangular patch drawing of the low-resolution texture image in the 3D model coordinate system on the basis of the 3-dimensional data of the low-resolution texture image supplied from the 3D model generation unit 238. Thereafter, the drawing unit 239 performs the triangular patch drawing of the texture images of the first layer and the second layer in the 3D model coordinate system on the basis of the 3-dimensional data of the first layer and the second layer supplied from each of the ML 3D model generation units 235 to 237 and the viewpoint position information and the surface information supplied from the visual line detection unit 234.

In step S53, the drawing unit 239 generates a display image by performing perspective projection of a triangular patch drawn in the 3D model coordinate system within the visual field range using the viewing position supplied from the visual line detection unit 234 as a viewpoint. In step S54, the drawing unit 239 transmits the display image to the conversion device 14 in FIG. 1.

Figure 27:
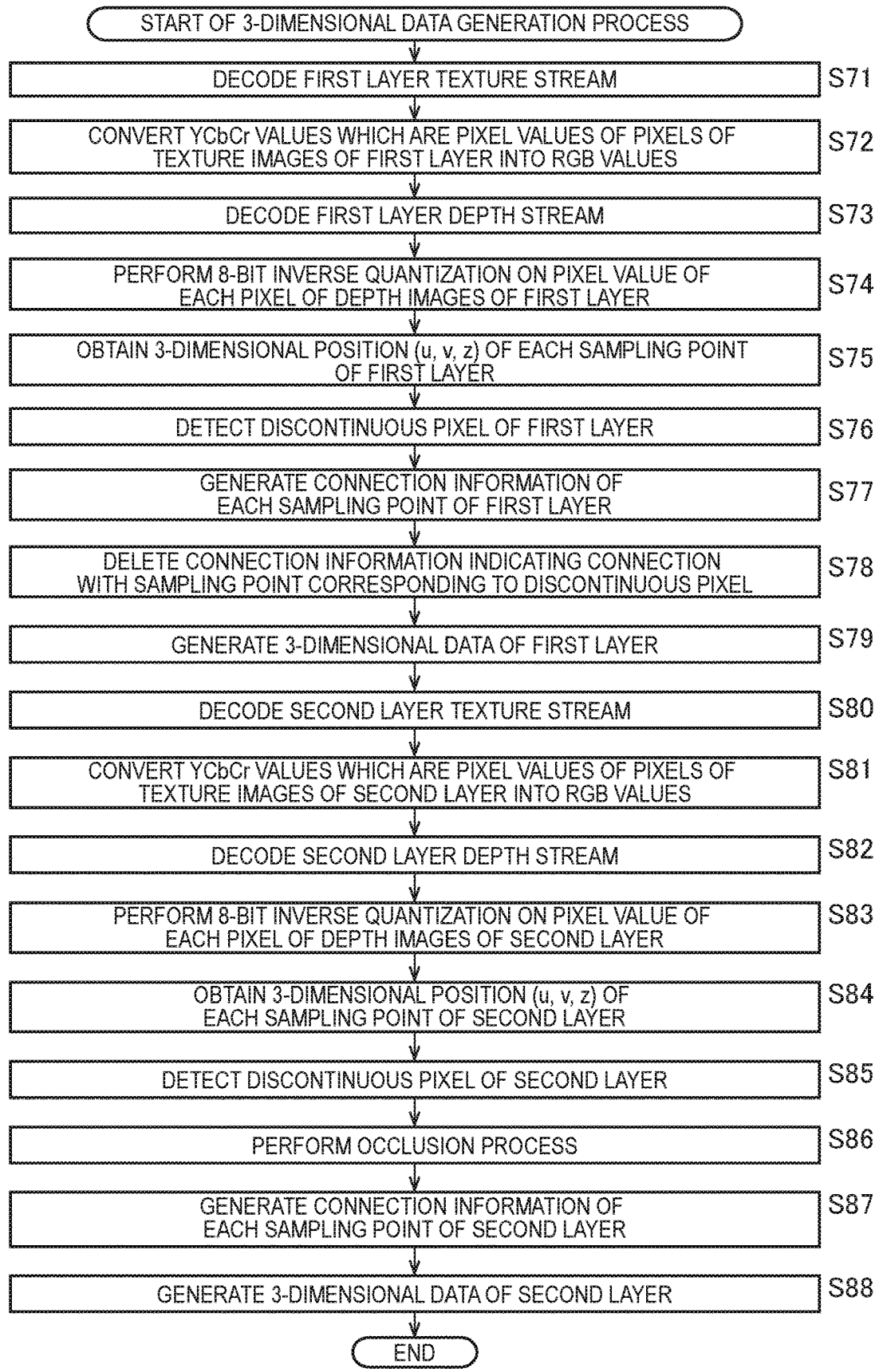
FIG. 27 is an explanatory flowchart illustrating details of a 3-dimensional data generation process.

FIG. 27 is an explanatory chart illustrating the details of the 3-dimensional data generation process performed by the ML 3D model generation unit 235 in step S50 of FIG. 26.

In step S71 of FIG. 27, the decoder 251 (FIG. 20) of the ML 3D model generation unit 235 decodes the first layer texture stream supplied from the visual line detection unit 234 in FIG. 19 to generate the texture images of the first layer. The decoder 251 supplies the texture images of the first layer to the RGB conversion unit 252.

In step S72, the RGB conversion unit 252 converts YCbCr values which are pixel values of the pixels of the texture images of the first layer into RGB values to set the RGB values of the sampling points corresponding to the pixels. Then, the RGB conversion unit 252 supplies the RGB value of each sampling point to the 3D model generation unit 256.

In step S73, the decoder 253 decodes the first layer depth stream supplied from the visual line detection unit 234 to generate the depth images of the first layer. The decoder 253 supplies the depth images of the first layer to the depth conversion unit 254.

In step S74, the depth conversion unit 254 performs the 8-bit inverse quantization on the pixel value of each pixel of the depth images of the first layer supplied from the decoder 253 to obtain the reciprocal $1/r$ of each pixel of the depth image of the first layer.

In step S75, the depth conversion unit 254 obtains a 3-dimensional position (u, v, z) of each pixel of the depth images of the first layer as a 3-dimensional position (u, v, z) of the sampling point corresponding to each pixel on the basis of the reciprocal $1/r$ of each pixel of the depth images of the first layer. The depth conversion unit 254 supplies the 3-dimensional position (u, v, z) of each sampling point to the discontinuity detection unit 255 and the 3D model generation unit 256.

In step S76, the discontinuity detection unit 255 detects a discontinuous pixel among the pixels of the depth images of the first layer on the basis of the 3-dimensional position (u, v, z) of each sampling point supplied from the depth conversion unit 254. The discontinuity detection unit 255 supplies the 3-dimensional position (u, v, z) of the sampling point corresponding to the discontinuous pixel to the 3D model generation unit 256.

In step S77, the 3D model generation unit 256 generates connection information of each sampling point of the first layer so that three adjacent sampling points are connected among the sampling points on the basis of the 3-dimensional position (u, v, z) of each sampling point supplied from the depth conversion units 254.

In step S78, the 3D model generation unit 256 deletes the connection information indicating the connection with the sampling point corresponding to the discontinuous pixel in the connection information of each sampling point generated in step S77 on the basis of the 3-dimensional position (u, v, z) of the sampling point corresponding to the discontinuous pixel supplied from the discontinuity detection unit 255.

In step S79, the 3D model generation unit 256 generates the 3-dimensional position (u, v, z) of each sampling point of the first layer, the RGB values, and the connection information after the deletion in the process of step S78 as 3-dimensional data of the first layer. The 3D model generation unit 256 supplies the 3-dimensional data of the first layer to the drawing unit 239 in FIG. 19.

In step S80, the decoder 257 decodes the second layer texture stream supplied from the visual line detection unit 234 to generate the texture images of the second layer. The decoder 257 supplies the texture images of the second layer to the RGB conversion unit 258.

In step S81, the RGB conversion unit 258 converts YCbCr values which are pixel values of the pixels of the texture images of the second layer into RGB values to set the RGB values of the sampling points corresponding to the pixels. Then, the RGB conversion unit 258 supplies the RGB value of each sampling point to the 3D model generation unit 262.

In step S82, the decoder 259 decodes the second layer depth stream supplied from the visual line detection unit 234 to generate the depth images of the second layer. The decoder 259 supplies the depth images of the second layer to the depth conversion unit 260.

In step S83, the depth conversion unit 260 performs the 8-bit inverse quantization on the pixel value of each pixel of the depth images of the second layer supplied from the decoder 259 to obtain the reciprocal 1/r of each pixel of the depth image of the second layer.

In step S84, the depth conversion unit 260 obtains a 3-dimensional position (u, v, z) of each pixel of the depth images of the second layer as a 3-dimensional position (u, v, z) of the sampling point corresponding to each pixel on the basis of the reciprocal 1/r of each pixel of the depth images of the second layer. The depth conversion unit 260 supplies the 3-dimensional position (u, v, z) of each sampling point to the occlusion processing unit 261 and the 3D model generation unit 262.

In step S85, the occlusion processing unit 261 detects a discontinuous pixel among the pixels of the depth images of the second layer on the basis of the 3-dimensional position (u, v, z) of each sampling point supplied from the depth conversion unit 260.

In step S86, the occlusion processing unit 261 performs the occlusion process of correcting the 3-dimensional position (u, v, z) of the sampling point corresponding to the discontinuous pixel on the basis of the 3-dimensional position (u, v, z) of each sampling point of the second layer. The occlusion processing unit 261 supplies the 3-dimensional position (u, v, z) after the occlusion process of each sampling point of the second layer to the 3D model generation unit 262.

In step S87, the 3D model generation unit 262 generates connection information of each sampling point of the second layer so that three adjacent sampling points are connected among the sampling points on the basis of the 3-dimensional position (u, v, z) of each sampling point supplied from the occlusion processing unit 261.

In step S88, the 3D model generation unit 262 generates the 3-dimensional position (u, v, z) of each sampling point, the connection information and the RGB values supplied from the RGB conversion unit 258 as 3-dimensional data of the second layer. The 3D model generation unit 256 supplies the 3-dimensional data of the second layer to the drawing unit 239 in FIG. 19.

Note that the 3-dimensional data generation process performed by the ML 3D model generation unit 236 and the ML 3D model generation unit 237 is performed as in the 3-dimensional data processing of FIG. 27.

As described above, the home server 13 generates the display image using the first layer and the second layer. Accordingly, in a case in which the viewing position is different from the viewpoint O, an occlusion region of the viewpoint O included in the display image can be generated by using the second layer. Accordingly, it is possible to generate a high-quality display image.

In addition, the home server 13 generates the display image using not only the texture images but also the depth images. Accordingly, by mapping the texture images to the triangular patch with the 3-dimensional shape in accordance with a subject through the triangular patch drawing, it is possible to generate the display image using the triangular patch. Consequently, compared to a case in which a display image is generated by mapping the texture images to a predetermined surface using only the texture images, it is possible to generate a high-quality display image.

Further, the texture images and the depth images of the first layer are the texture images and the depth images obtained by mapping the texture images and the depth images of the entire celestial sphere image to a predetermined surface. Accordingly, the texture images and the depth images of the first layer can be reproduced in a reproduction device that reproduces only texture images and depth images obtained by mapping the texture images and the depth images of an entire celestial sphere image to a predetermined surface.

That is, formats of the texture images and the depth images of the first layer and the second layer generated by the content server 12 are compatible with formats of the texture images and the depth images obtained by mapping the texture images and the depth images of the entire celestial sphere image to the predetermined surface. In addition, a reproduction method by the home server 13 is compatible with a reproduction method of the reproduction device that reproduces only texture images and depth images obtained by mapping the texture images and the depth images of an entire celestial sphere image to a predetermined surface.

In addition, the home server 13 may generate a display image using only the texture images and the depth images of the first layer. In this case, the occlusion process is performed instead of deleting the connection information with regard to the first layer.

In addition, in the above description, the 3D model generation unit 256 has deleted the connection information indicating the connection with the sampling point corresponding to the discontinuous pixel detected by the discontinuity detection unit 255, but may delete the connection information on the basis of triangular path validity or invalidity information (the details of which will be described below) transmitted from the content server 12. In this case, the discontinuity detection unit 255 is not provided.

(Description of Triangular Patch Validity or Invalidity Information)

Figure 28:
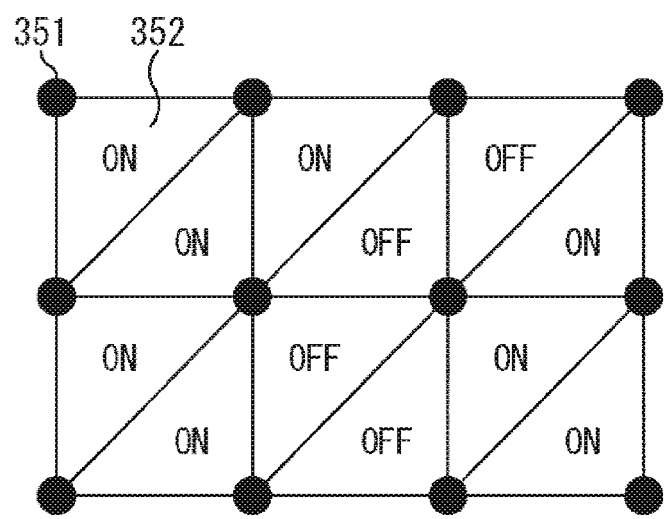
FIG. 28 is an explanatory diagram illustrating triangle patch valid and invalid information.

FIG. 28 is an explanatory diagram illustrating the triangular path validity or invalidity information transmitted from the content server 12 in this case.

In the example of FIG. 28, the number of sampling points 351 of the first layer is 12. Accordingly, the number of triangular patches 352 that have three adjacent sampling points 351 as vertexes is 12.

In this case, the content server 12 detects the discontinuous pixel as in the discontinuity detection unit 255. Then, the content server 12 sets the triangular patches 352 that have the sampling points corresponding to the discontinuous pixels as vertexes to invalidity (OFF) and sets the triangular patches 352 that do not include the sampling points corresponding to the discontinuous pixels to validity (ON).

The content server 12 (a generation unit) generates the triangular patch validity or invalidity information indicating validity or invalidity of each triangular patch 352 and includes the triangular patch validity or invalidity information in the metadata.

The 3D model generation unit 256 of the home server 13 deletes the connection information indicating the connection among the sampling points that are the vertexes of an invalid triangular patch on the basis of the triangular patch validity or invalidity information. As a result, the triangular patch for which the triangular patch validity or invalidity information indicates invalidity is not drawn.

Note that two triangular patches are generated for each sampling point excluding the sampling points at the right end and the lower end. In addition, the triangular patch validity or invalidity information is 1-bit information indicating validity or invalidity of the triangular patch. Accordingly, the number of bits of the triangular patch validity or invalidity information of all the triangular patches is (width−1)*(height−1)*2 bits when the number of pixels in the horizontal direction of a texture image of the first layer is width and the number of pixels in the vertical direction is height.

The triangular patch validity or invalidity information is transmitted from the content server 12 to the home server 13 by lossless compression or non-compression. Note that the triangular patch validity or invalidity information may be disposed as Cb and Cr values of a depth image.

Second Embodiment (Configuration Example of Second Embodiment of Image Display System)

Figure 29:
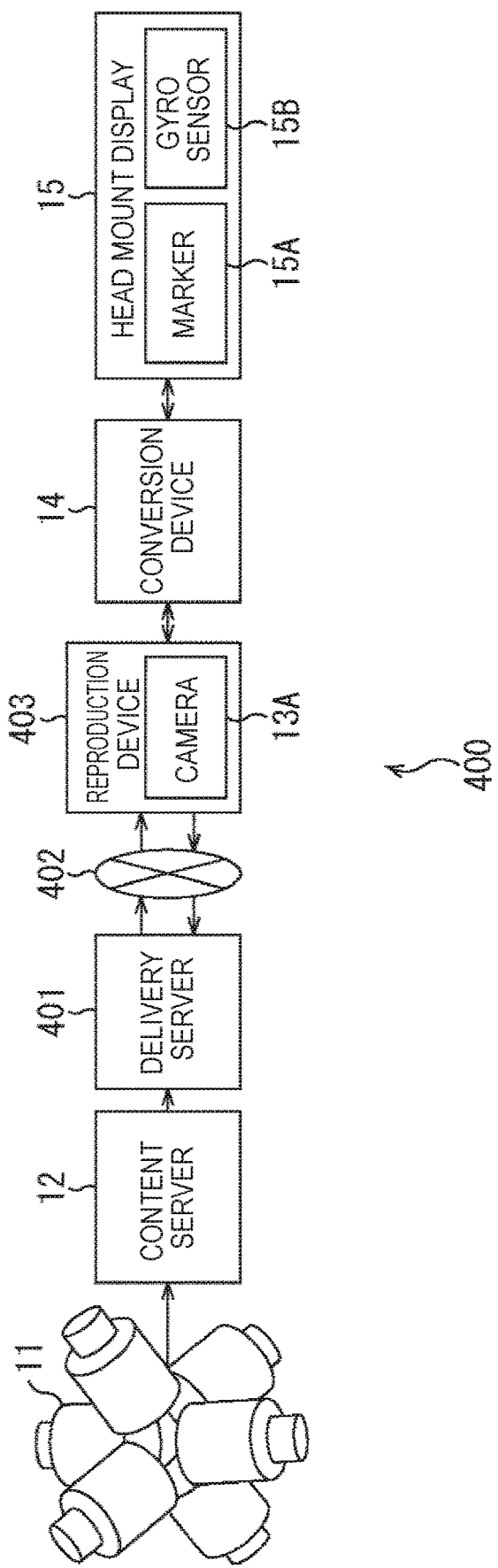
FIG. 29 is a block diagram illustrating a configuration example of a second embodiment of the image display system to which the present disclosure is applied.

FIG. 29 is a block diagram illustrating a configuration example of a second embodiment of an image display system to which the present disclosure is applied.

In configurations illustrated in FIG. 29, the same reference numerals are given to the same configurations as the configurations in FIG. 1. The repeated description will be appropriately omitted.

An image display system 400 in FIG. 29 includes a multi-camera unit 11, a content server 12, a conversion device 14, a head mount display 15, a delivery server 401, a network 402, and a reproduction device 403. In the image display system 400, only a first layer texture stream, a first layer depth stream, a second layer texture stream, and a second layer depth stream of one surface corresponding to a visual line among six surfaces are delivered to the reproduction device 403 to be reproduced.

Specifically, the delivery server 401 of the image display system 400 receives and stores a low-resolution texture stream and a low-resolution depth stream, first layer texture streams, first layer depth streams, second layer texture stream, and second layer depth streams of six surfaces, and metadata transmitted from the content server 12.

In addition, the delivery server 401 is connected to the reproduction device 403 via the network 402. The delivery server 401 transmits the stored low-resolution texture stream and the low-resolution depth stream, the stored first layer texture stream, first layer depth stream, second layer texture stream, and second layer depth stream of one surface, and the stored metadata to the reproduction device 403 via the network 402 in response to a request from the reproduction device 403.

The reproduction device 403 (an image processing device) requests the delivery server 401 to transmit the low-resolution texture stream, the low-resolution depth stream, and the metadata via the network 402 and receives the low-resolution texture stream, the low-resolution depth stream, and the metadata transmitted in response to the request.

In addition, the reproduction device 403 contains a camera 13A. The reproduction device 403 detects a viewing position in a 3D model coordinate system and decides a visual line direction and a visual field range of a viewer in the 3D model coordinate system as in the home server 13.

Then, the reproduction device 403 decides one surface corresponding to a visual line vector closest to the visual line as a selection surface among the six surfaces of the first layer on the basis of the viewing position and the visual line direction in the 3D model coordinate system and a table of the first layer included in the metadata. The reproduction device 403 requests the first layer texture stream, the first layer depth stream, the second layer texture stream, and the second layer depth stream corresponding to one selection surface via the network 402. The reproduction device 403 receives the first layer texture stream, the first layer depth stream, the second layer texture stream, and the second layer depth stream corresponding to the one selection surface transmitted in response to the request.

The reproduction device 403 generates a display image using the low-resolution texture stream and the low-resolution depth stream and the first layer texture stream, the first layer depth stream, the second layer texture stream, and the second layer depth stream corresponding to the one selection surface. Since the display image generation process by the reproduction device 403 is the same as the process by the home server 13 except that the number of selection surfaces is 1, the description thereof will be omitted. The reproduction device 403 transmits the display image to the conversion device 14 via an HDMI cable (not illustrated).

<Other example of texture images>

Figure 30A:
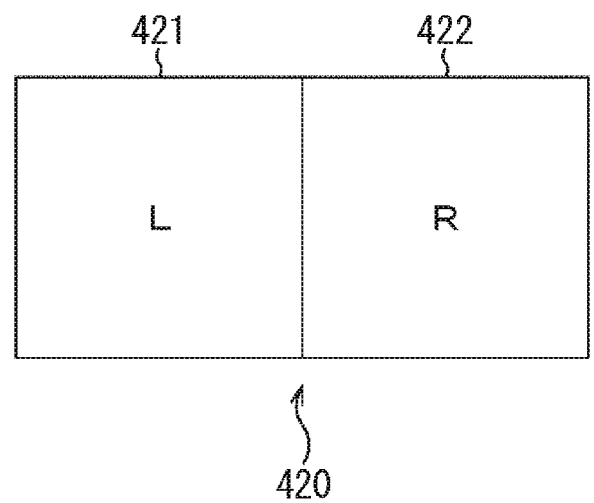
FIGS. 30A and 30B are diagrams illustrating another example of texture images of a first layer.
Figure 30B:
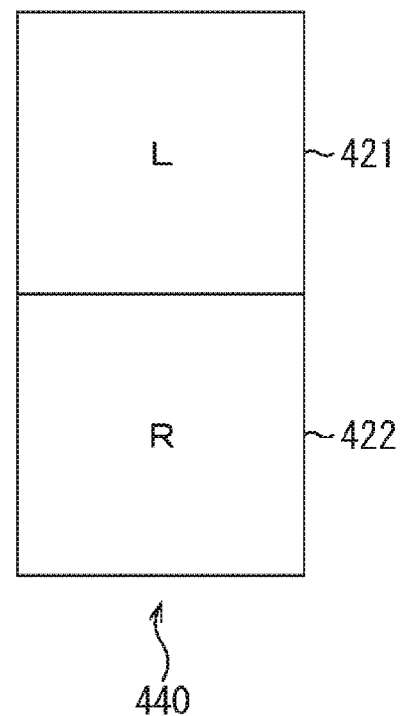

FIGS. 30A and 30B are diagrams illustrating another example of the texture images of the first layer.

In the above description, the texture image of each surface of the first layer is the texture image of one viewpoint O, but may be a combined image of texture images of a right-eye viewpoint and a left-eye viewpoint corresponding to the viewpoint O.

Specifically, as illustrated in FIG. 30A, the texture image of each surface of the first layer may be, for example, a packing image 420 in which a texture image 421 of each surface of the first layer of the left-eye viewpoint and a texture image 422 of each surface of the first layer of the right-eye viewpoint corresponding to the viewpoint O are packed in the transverse direction (the horizontal direction).

In addition, as illustrated in FIG. 30B, the texture image of each surface of the first layer may be, for example, a packing image 440 in which the texture image 421 and the texture image 422 are packed in the longitudinal direction (the vertical direction).

Similarly, a texture image of each surface of the second layer may be a packing image in which a texture image of the second layer of a left-eye viewpoint and a texture image of the second layer of a right-eye viewpoint corresponding to a viewpoint of the second layer of the one surface are packed in the transverse direction or the longitudinal direction.

As described above, in a case in which the texture image of each surface of the first layer and the second layer is a texture image in which images of the right-eye viewpoint and the left-eye viewpoint are packed, the texture image obtained as a decoding result is separated into the texture image of the right-eye viewpoint and the texture image of the left-eye viewpoint. Then, right-eye 3-dimensional data and left-eye 3-dimensional data are generated for the first layer and the second layer.

Then, a left-eye display image is generated from the left-eye 3-dimensional data on the basis of a viewing direction and a viewing position of the left eye corresponding to a viewing direction and a viewing position of a viewer. In addition, a right-eye display image is generated from the right-eye 3-dimensional data on the basis of a viewing direction and a viewing position of the right eye corresponding to the viewing direction and the viewing position of a viewer. Then, in a case in which the head mount display 15 can perform 3D display, the head mount display 15 displays the display image as a 3D image by displaying the right-eye display image as the right-eye image and displaying the left-eye display image as the left-eye image.

Note that in the first and second embodiments, a photographed image is mapped to a regular octahedron to generate an entire celestial sphere image, but the 3D model to which a photographed image is mapped can be a sphere, a cube, or the like other than a regular octahedron. In a case in which a photographed image is mapped to a sphere, the entire celestial sphere image is, for example, an image that conforms to an equidistant cylindrical projection of a sphere to which a photographed image is mapped.

In addition, the low-resolution texture stream and the low-resolution depth stream may not be generated. The depth images of the first layer and the second layer may not be generated. In addition, the texture images and the depth images of the second layer may be generated only for some of the surfaces to which a photographed image of a main subject is mapped.

Further, the low-resolution texture image and the low-resolution depth image may be hierarchized and generated as in the high-resolution texture image and the depth images.

Third Embodiment (Example of Reproduction in which Images Photographed by Plurality of Multi-Camera Units are Used)

The example in which the entire celestial sphere image is reproduced using images photographed by one multi-camera unit 11 has been described above. However, an entire celestial sphere image may be able to be displayed at various viewpoint positions or images of various viewpoints may be able to be displayed so that the same subject is surrounded by different cameras by using texture images and depth images photographed by the plurality of multi-camera units 11 or texture images and depth images rendered from the texture images and the depth images photographed by the plurality of multi-camera units 11 using the formats of the texture images, the depth images, and the metadata described above.

Figure 31:
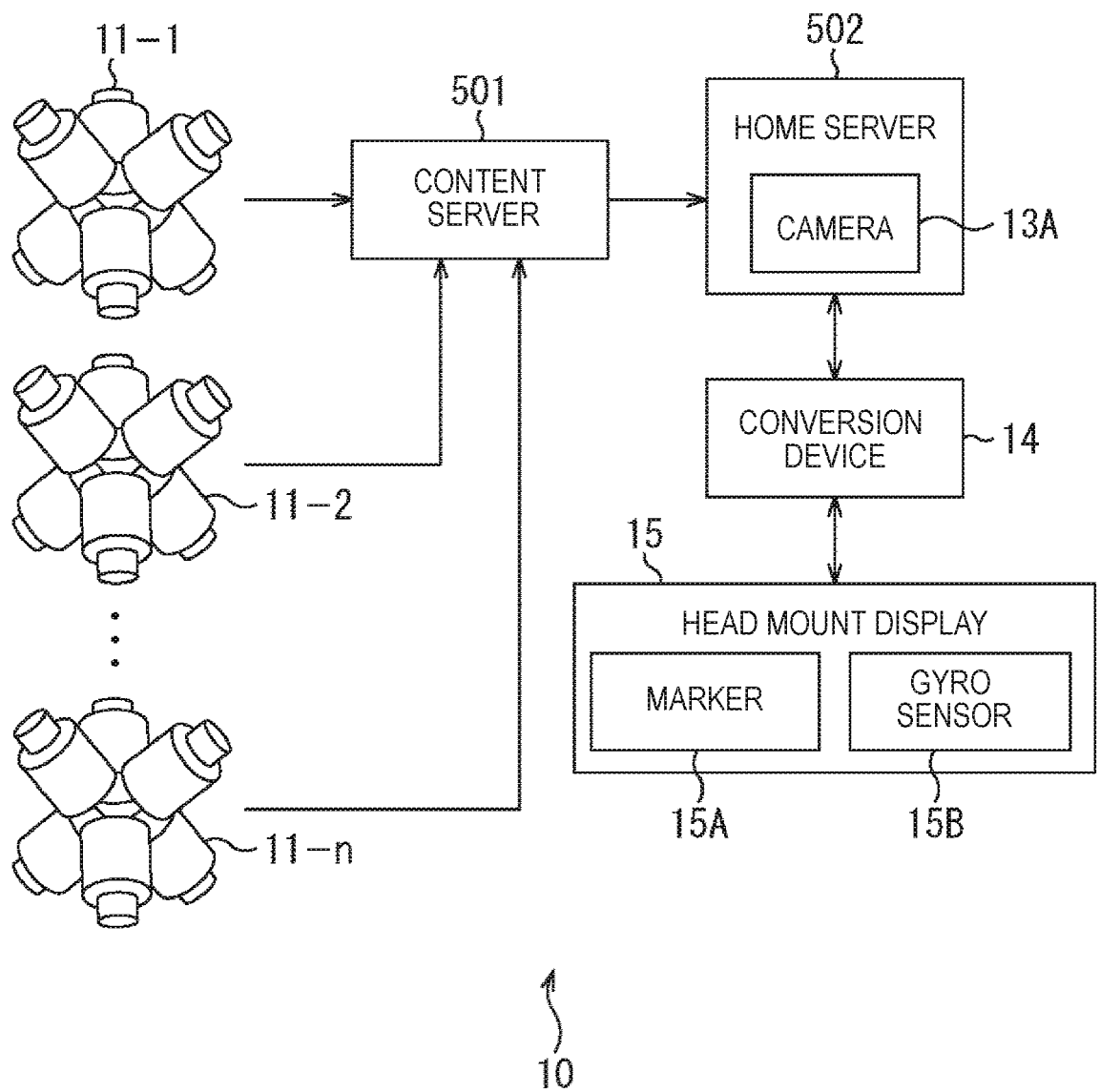
FIG. 31 is a block diagram illustrating a configuration example of a third embodiment of the image display system to which the present disclosure is applied.

FIG. 31 is a block diagram illustrating a configuration example of a third embodiment of the image display system in which an entire celestial sphere image or an enclosure image is displayed at various viewpoints using the plurality of multi-camera units 11. Note that in FIG. 31, the same reference numerals are given to configurations that have the same functions as those of FIG. 1 and the description thereof will be appropriately omitted.

That is, in the image display system 10 in FIG. 31, the plurality of multi-camera units 11 are provided as the multi-camera units 11-1 and 11-n are illustrated. A content server 501 and a home server 502 are newly provided instead of the content server 12 and the home server 13.

A basic function of the content server 501 is similar to that of the content server 12, but the texture images and the depth images of the first layer and the second layer that form an entire celestial sphere image of each predetermined viewpoint are generated from photographed images of cameras supplied from the plurality of multi-camera units 11-1 and 11-n. Further, the content server 501 generates images based on a request on the basis of the texture images and the depth images of the entire celestial sphere image of each predetermined viewpoint of each multi-camera unit 11 in response to the request for the texture images and the depth images associated with viewpoint information formed by a viewpoint position and a visual line direction from the home server 502 and supplies the images to the home server 502. Note that in a case in which it is not particularly necessary to distinguish the multi-camera units 11-1 and 11-n from each other, the multi-camera units 11-1 and 11-n are also simply referred to as the multi-camera units 11 and the same also applies to the other configurations.

A basic function of the home server 502 is similar to that of the home server 13, but the home server 502 requests the content server 501 to transmit the texture images and the depth images specified from a visual field range of a viewer based on a viewing position and a visual line direction corresponding to a viewing position and a visual line direction of the head mount display 15 supplied from the head mount display 15, acquires the texture images and the depth images, and causes the head mount display 15 to display the texture images and the depth images via the conversion device 14.

(Overview of Reproduction Method)

Next, an overview of a reproduction method using the texture images and the depth images supplied from the plurality of multi-camera units 11-1 to 11-n by the content server 501 in FIG. 31 will be described with reference to FIG. 32.

The texture images and the depth images supplied from each multi-camera unit 11 are managed as texture images of six surfaces including the +X surface 81, the −X surface 82, the +Y surface 83, the −Y surface 84, the +Z surface 85, and the −Z surface 86, as described with reference to FIGS. 8A and 8B, in a case in which only the first layer is considered.

When images photographed by the plurality of multi-camera units 11 are transmitted, the content server 501 stores surface information of six surfaces for each multi-camera unit.

Then, in response to a request from the home server 502, the content server 501 causes the images photographed for each multi-camera unit to be reproduced using image data including a plurality of layers which are camera layers when the images are caused to be reproduced using the images photographed by the plurality of multi-camera units 11.

For example, when the texture images and the depth images of six surfaces are transmitted from the multi-camera units 11-1 and 11-2, the content server 501 stores the texture images and the depth images for each multi-camera unit 11 and reproduces the images using the images in response to a request from the home server 502.

More specifically, in a case in which images of six surfaces of each of the multi-camera units 11-1 and 11-2 are used, the content server 501 merely has used six images photographed by one multi-camera unit 11 to display an entire celestial sphere image when the number of multi-camera units 11 is 1. However, when images of the plurality of multi-camera units 11 are used, for example, as illustrated in FIG. 32, a plurality of images of each multi-camera unit 11 are supplied by a plurality of camera layers to the home server 502 with regard to each of the six images and any of the images of the plurality of camera layers is displayed selectively or an image is caused to be displayed in conformity with a scheme of mixing the images of the plurality of layers.

Figure 32:
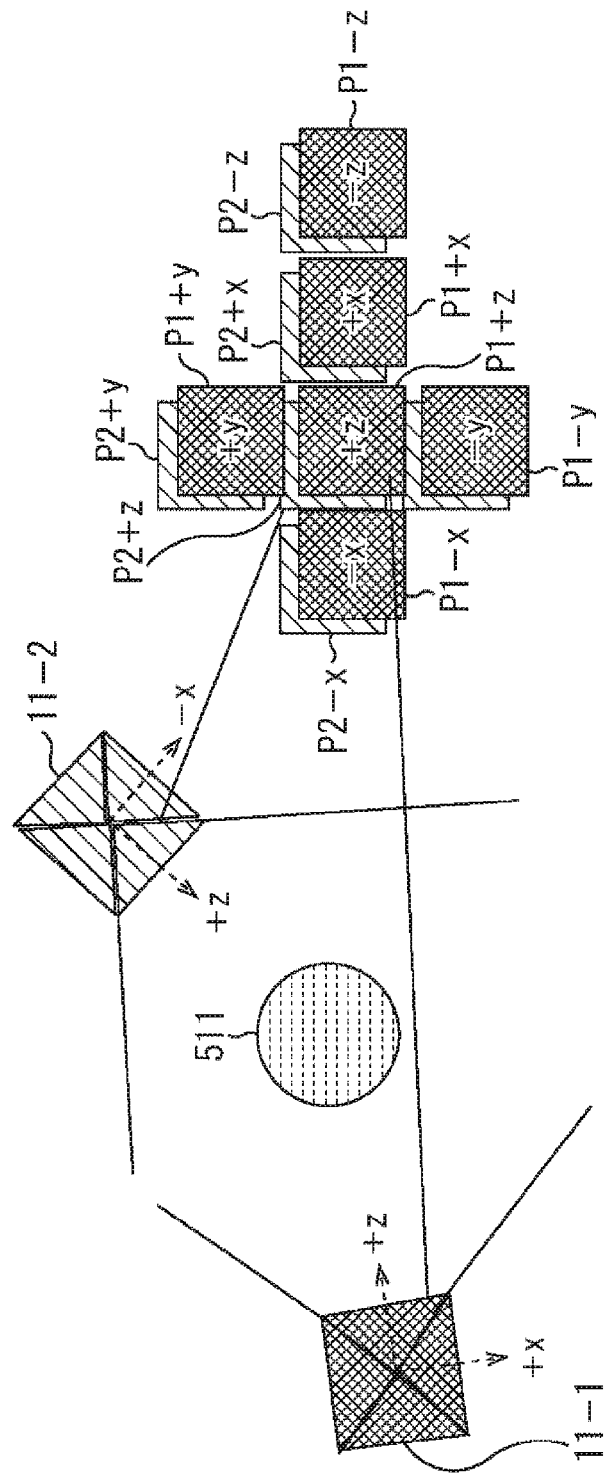
FIG. 32 is an explanatory diagram illustrating a camera layer in the image display system in FIG. 31.

Here, in FIG. 32, surface information of six surfaces photographed by each multi-camera unit 11 is expressed as a development drawing of a regular hexahedron for each multi-camera unit 11, as illustrated in the upper right part of FIG. 32. A reference numeral for identifying each camera layer and each surface with regard to each camera is given to each camera layer. Further, development drawings of regular hexahedrons are drawn to be stacked for each camera layer.

That is, for six surfaces of the multi-camera unit 11-1 in FIG. 32, a camera layer P1 is assumed and reference numerals are given as a +X surface P1+X, a −X surface P1−X, a +Y surface P1+Y, a −Y surface P1−Y, a +Z surface P1+Z, and a −Z surface P1−Z to correspond to names of surfaces. In addition, for six surfaces of the multi-camera unit 11-2, a camera layer P2 is assumed and reference numerals are given as a +X surface P2+X, a −X surface P2−X, a +Y surface P2+Y, a −Y surface P2−Y, a +Z surface P2+Z, and a −Z surface P2−Z to correspond to names of surfaces. Further, the camera layer P1 is expressed to be stacked on the development drawing of the camera layer P2 in FIG. 32.

Here, in the upper left part of FIG. 32, a top view of the multi-camera units 11-1 and 11-2 is illustrated and the multi-camera units 11 are each expressed in a square shape. In addition, a center position of the multi-camera unit 11 with each square shape is a viewpoint position and a name of an axis serving as a normal line of each surface at the viewpoint is considered to be the name of each surface. For example, a surface that has the +Z axis from the viewpoint position of the multi-camera unit 11-1 as a normal line, that is, a surface that has the +Z direction as a visual line direction, is a +Z surface of the camera layer P1 and is shown as a +Z surface P1+Z in the development drawing.

In addition, similarly, a surface that has the +X axis forming 90 degrees with the +Z axis from the viewpoint position of the multi-camera unit 11-1 in the drawing as a normal line, that is, a surface that has the +X axis as a visual line direction, is the +X surface P1+X. Similarly, for the multi-camera unit 11-2, a surface that has the +Z axis from the viewpoint position as a normal line, that is, a surface that has the +Z axis direction as a visual line direction, is the +Z surface P2+Z of the camera layer P2. A surface that has the −X axis from the viewpoint position as a normal line, that is, a surface that has the −X axis direction as a visual line direction, is the −X surface P2−X of the camera layer P2.

Further, since the front side or the rear side of the multi-camera units 11-1 and 11-2 on the sheet surface are the +Y axis and −Y axis direction with respect to each viewpoint position, although not illustrated, a surface that has the +Y axis from the viewpoint position as a normal line, that is, a surface that has the +Y axis direction as a visual line direction, is the +Y surface P1+Y. Similarly, there are the −Y surface P1−Y, the +Y surface P2+Y, and the −Y surface P2−Y.

In this way, the six surfaces of each of the multi-camera units 11-1 and 11-2 are expressed as a development drawing in which three surfaces in the longitudinal direction of the cross and four surfaces in the transverse direction are arranged, as illustrated in the upper right part of FIG. 32. Each surface is shown as each surface that forms the camera layers P1 and P2.

Accordingly, hereinafter, factors which are an aggregation of the six surfaces and are descriptions on the development drawing shape, for example, data of each of the six surfaces of the multi-camera unit 11-1 is assumed to be expressed as surface data of the camera layer P1 and data of each of the six surfaces of the multi-camera unit 11-2 is assumed to be expressed as surface data of the camera layer P2. Accordingly, in the upper right part of FIG. 32, the data of the six surfaces including each piece of surface data of the camera layers P1 and P2 is expressed to be stacked.

In addition, in FIG. 32, a range of every 90 degrees centering on the viewpoint position expressed as a line segment extending a diagonal line of each of the multi-camera units 11-1 and 11-2 expressed in a square shape is a field angle of each surface, and thus a spatial positional relation of the multi-camera units 11-1 and 11-2 is also shown.

Therefore, in FIG. 32, in a case in which a subject 511 is between the multi-camera units 11-1 and 11-2, the subject 511 is photographed on two surfaces, the +Z surface P1+Z and the +Z surface P2+Z.

Note that the camera layers mentioned here expresses different hierarchies from the first layer which is mainly a foreground and the second layer which is mainly a background, as described above.

In a case in which the surface data of the plurality of multi-camera units 11 is used in this way, the camera layer is set for each multi-camera unit 11 and six surfaces that form an entire celestial sphere image are set as surface data of the six surfaces for each camera layer.

Figure 33:
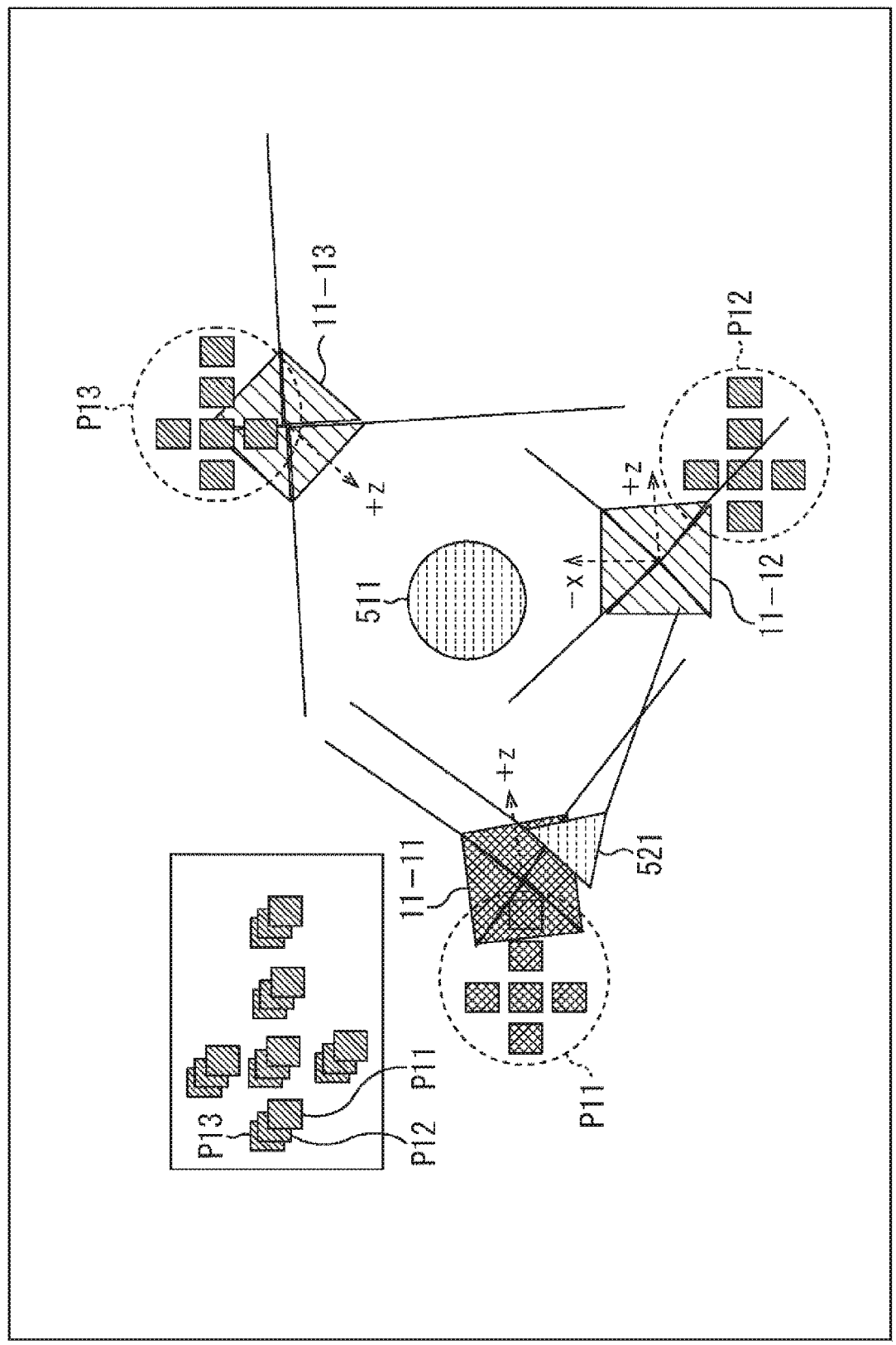
FIG. 33 is an explanatory diagram illustrating a camera layer in the image display system in FIG. 31.

Therefore, for example, when the subject 511 is surrounded by the multi-camera units 11-11 to 11-13 in a positional relation illustrated in FIG. 33 in a case in which an image is assumed to be reproduced as an entire celestial sphere image and an imaginary viewpoint 512 is set, an image can be reproduced at the imaginary viewpoint 512 with high precision by using data of six surfaces of a camera layer P11 which is the multi-camera unit 11-11 closest to the imaginary viewpoint 512.

Note that, as illustrated FIG. 33, surface data of six surfaces of each of the camera layers P11, P12, and P13 of the multi-camera units 11-11 to 11-13 is set. Stacked layers are configured in the upper left part of FIG. 33.

Figure 34:
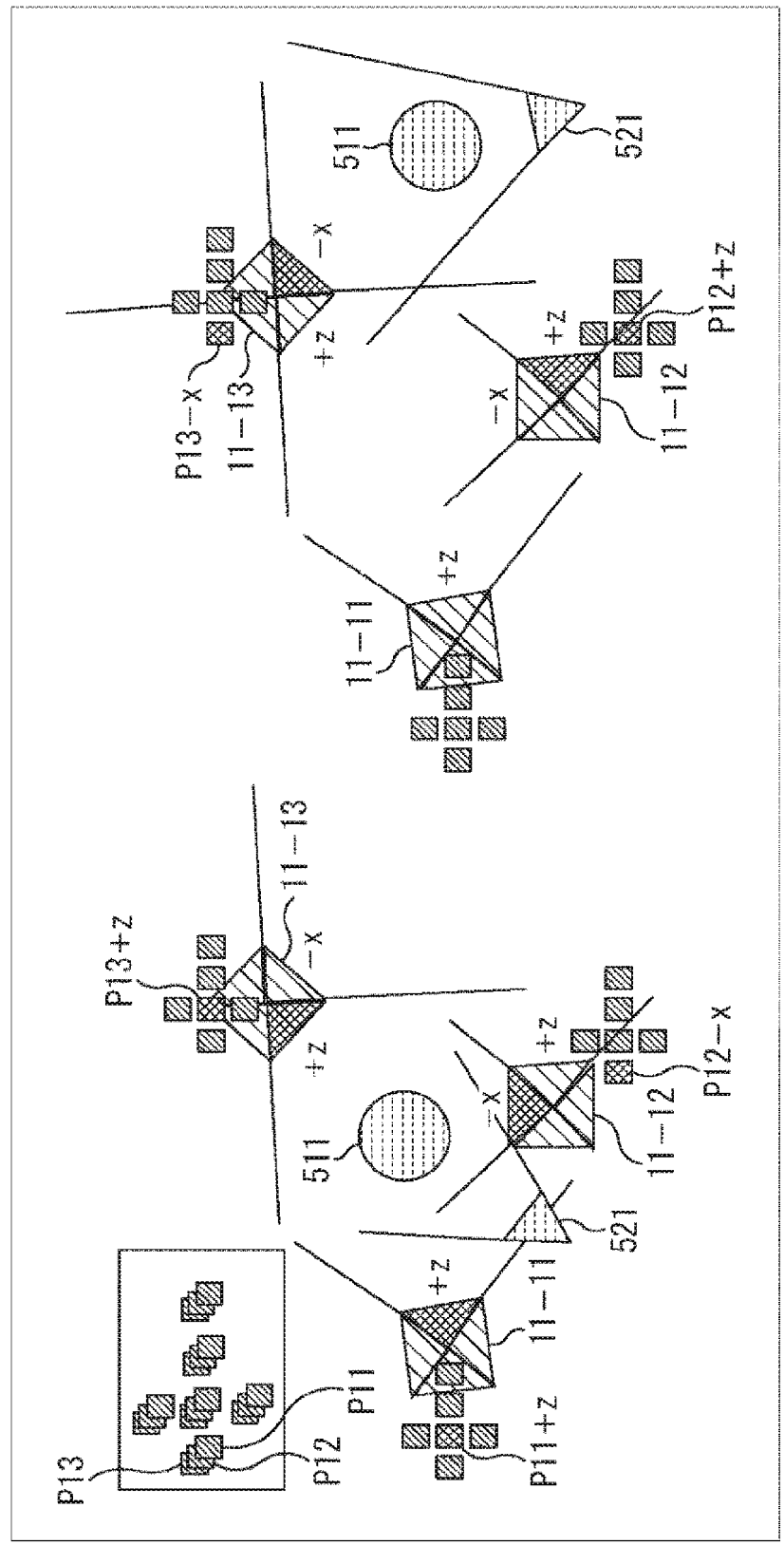
FIG. 34 is an explanatory diagram illustrating a camera layer in the image display system in FIG. 31.

In addition, in a case in which an image provided around the subject 511 is assumed to be reproduced as an enclosure image switched and displayed in accordance with an imaginary viewpoint and a case in which the multi-camera units 11-11 to 11-13 are disposed around the subject 511, as illustrated in the left part of FIG. 34, only images of surfaces on which the subject 511 is photographed are used among the camera layers P11, P12, and P13 formed for each multi-camera unit 11.

That is, in the case of the left part of FIG. 34, images of the subject 511 are photographed on three surfaces, the +Z surface P11+Z surface of the multi-camera unit 11-11, the −X surface P12−X of the multi-camera unit 11-12, and the +Z surface P13+Z of the multi-camera unit 11-13.

On the other hand, as illustrated in the right part of FIG. 34, in a case in which the imaginary viewpoint 521 and the subject 511 are moved, the surfaces are changed to two surfaces, the +Z surface P12+Z of the multi-camera unit 11-12 and the −X surface P13−X of the multi-camera unit 11-13.

Accordingly, of the six surfaces set in each camera layer, necessary surfaces are three surfaces. Therefore, even when images of a plurality of camera layers are necessary in the home server 502, a band margin can be allowed by transmitting only the necessary surfaces to the home server 502.

Figure 35:
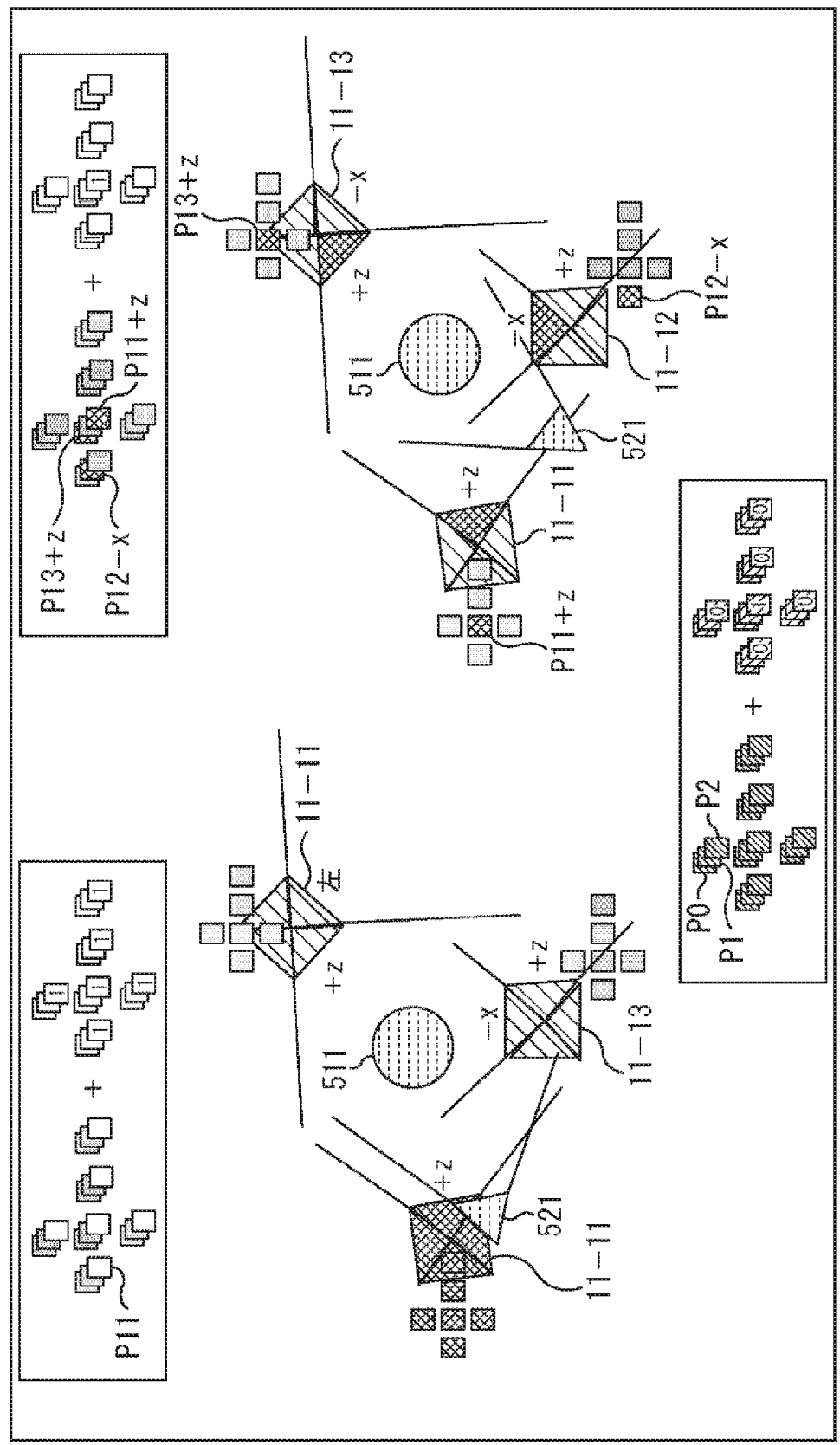
FIG. 35 is an explanatory diagram illustrating a camera layer in the image display system in FIG. 31.

That is, as illustrated in the lower middle part of FIG. 35, a priority table for setting whether or not to transmit each piece of surface data is set in six pieces of surface data set for every three camera layers. In the lower middle part of FIG. 35, a priority table in which a left term expresses data of the six surfaces set in each of the camera layers P0 and P1 and a right term sets whether or not surface data is transmitted in each camera layer is shown. In the right term in FIG. 35, "1" is set as a priority of each surface when it is necessary to transmit surface data. Data corresponding to the surfaces in which the priority of "1" is set is transmitted and data with regard to the surfaces in which the priority of "1" is not set is not transmitted are shown.

Accordingly, as illustrated in the lower left part of FIG. 35, for example, in the case in which reproduction of an entire celestial sphere image is assumed, an image can be reproduced at the imaginary viewpoint 512 at high precision by using data of six surfaces (six surfaces of the top layer in the drawing) of the camera layer P11 which is the multi-camera unit 11-11 closest to the imaginary viewpoint 521. Therefore, in the priority table, data corresponding to six surfaces that form the camera layer P11 is set to "1" and transmitted and data of six surfaces of each of the camera layers P12 and P13 is not transmitted.

In addition, as illustrated in the upper right part of FIG. 35, in a case in which an image is assumed to be reproduced as an enclosure image, images of the subject 511 are photographed on three surfaces, the +Z surface P11+Z of the multi-camera unit 11-11, the +X surface P12+X of the multi-camera unit 11-12, and the +Z surface P13+Z of the multi-camera unit 11-13. Therefore, in the priority table, data corresponding to the three surfaces, the +Z surface P11+Z of the multi-camera unit 11-11, the +X surface P12+X of the multi-camera unit 11-12, and the +Z surface P13+Z of the multi-camera unit 11-13, is set to "1" and is transmitted and data of the other surfaces is not transmitted.

In this way, the images photographed by the plurality of multi-camera units 11-1 to 11-n are managed as the data of the six surfaces in a camera layer unit set for each multi-camera unit 11. Further, at the time of reproduction, the priority table for specifying surfaces to be necessarily transmitted is generated in accordance with the positional relation between the subject and the imaginary viewpoint. In the case of an entire celestial sphere image, only images of a specific camera layer are transmitted. At the time of transmission of an enclosure image, only data of necessary surfaces is transmitted, and thus it is possible to reduce a load of a transmission band related to the transmission.

Hereinafter, an image display system according to the present disclosure will be described using the concept of the camera layers described with reference to FIGS. 31 to 35.
(Configuration Example of Content Server in FIG. 31)

Next, a configuration example of the high-resolution image processing unit 34 will be described with reference to the block diagram of FIG. 36. Note that the configuration of the content server 501 in FIG. 31 is different from the configuration of the content server 12 in FIG. 2 in only the configuration of the high-resolution image processing unit 34. Therefore, only the configuration example of the high-resolution image processing unit 34 in the content server 501 in FIG. 31 will be described here.

Figure 36:
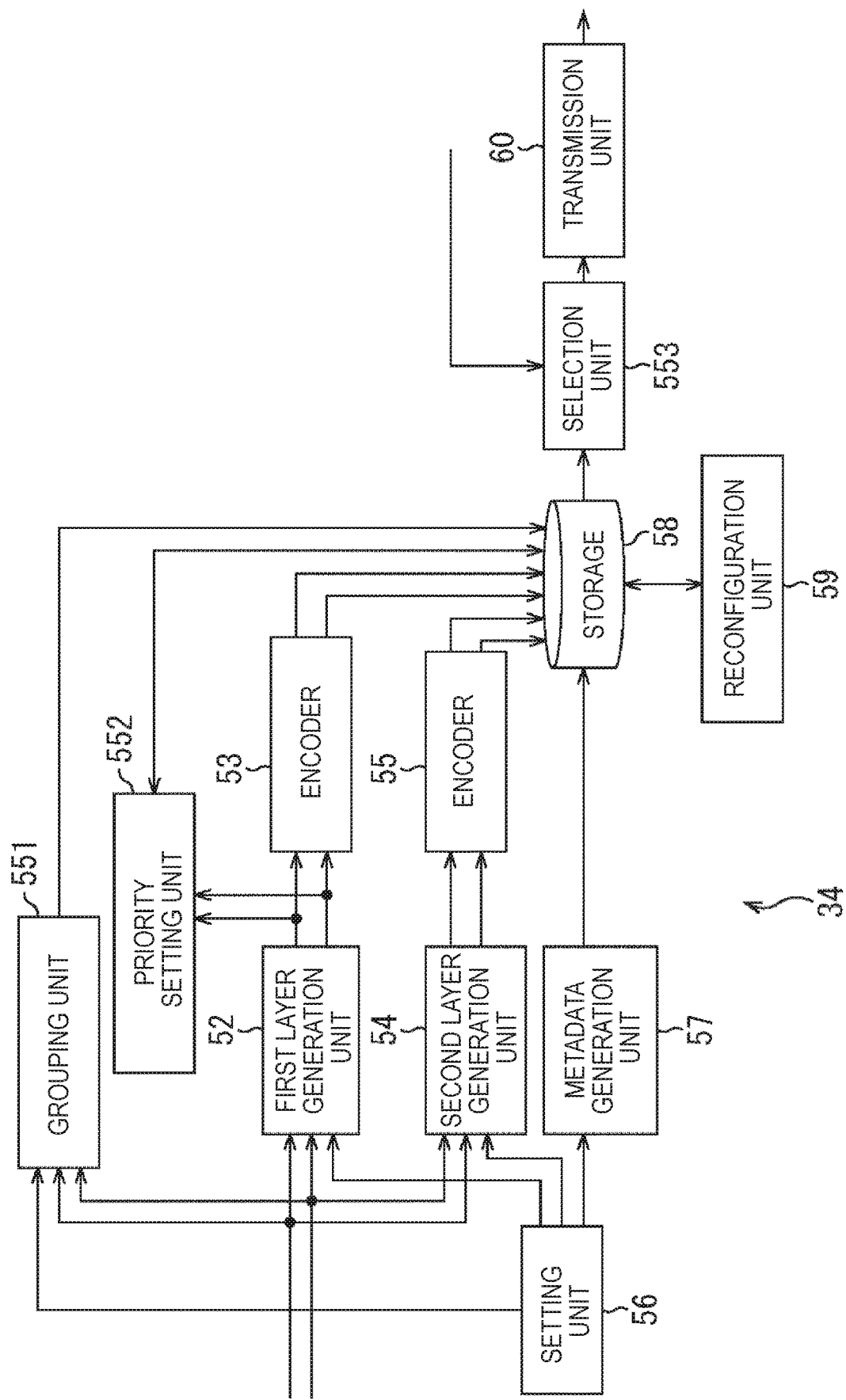
FIG. 36 is an explanatory diagram illustrating a configuration example of a high-quality image processing unit in a content server in the image display system in FIG. 31.

A difference between the high-resolution image processing unit 34 in FIG. 36 and the high-resolution image processing unit 34 in FIG. 3 is that a grouping unit 551, a priority setting unit 552, and a selection unit 553 are provided.

The grouping unit 551 classifies the plurality of multi-camera units 11 into a plurality of groups on the basis of at least one of internal parameters and external parameters of each multi-camera unit 11. The grouping unit 551 generates a global table in which group information regarding a plurality of groups is registered.

In addition, the grouping unit 551 generates a group table in which camera information used at the time of generation of 3-dimensional data from texture images photographed by the multi-camera units 11 classified into a group is registered, for each group. As the camera information, there are internal parameters, external parameters, and the like. The grouping unit 551 stores the global table and the group table in the storage 58.

The priority setting unit 552 divides a viewing region in which there is a subject into a plurality of grids in a group unit, sets an evaluation value of each camera disposition of cameras (here, six cameras since there are six surfaces) of the surfaces configured in each of the plurality of multi-camera units 11 for each grid, and sets a priority in accordance with the evaluation value.

More specifically, the priority setting unit 552 obtains a field angle of each camera on the basis of the external parameters and the internal parameters of each camera in each image of the camera among the six cameras included in the multi-camera unit 11 for each group of the plurality of multi-camera units 11. The priority setting unit 552 calculates an evaluation value of camera disposition with regard to the generation of the 3-dimensional data on the basis of a field angle of each camera.

For example, since the positional relation between the subject and the disposition of the multi-camera unit 11 is fixed in a predetermined group, the priority setting unit 552 divides a viewing region in which there is a subject into grids, changes a presence or absence pattern of the cameras of the multi-camera unit 11 belonging to the predetermined group in a grid unit and a visual direction unit, calculates an evaluation value of each camera disposition, calculates a priority for each camera included in the camera disposition on the basis of each evaluation value, sets the priority table, and stores the priority table in the storage 58.

The selection unit 553 selects an image (surface) with a highest priority on the basis of the priority of the surfaces photographed by the cameras corresponding to the imaginary viewpoint and on the basis of the priority table supplied from the priority setting unit 552 from the imaginary viewpoint requested from the home server 502 and transmits the image from the transmission unit 60 to the home server 502.
(Configuration Example of Grouping Unit)

Next, a configuration example of the grouping unit 551 in FIG. 36 will be described with reference to the block diagram of FIG. 37.

Figure 37:
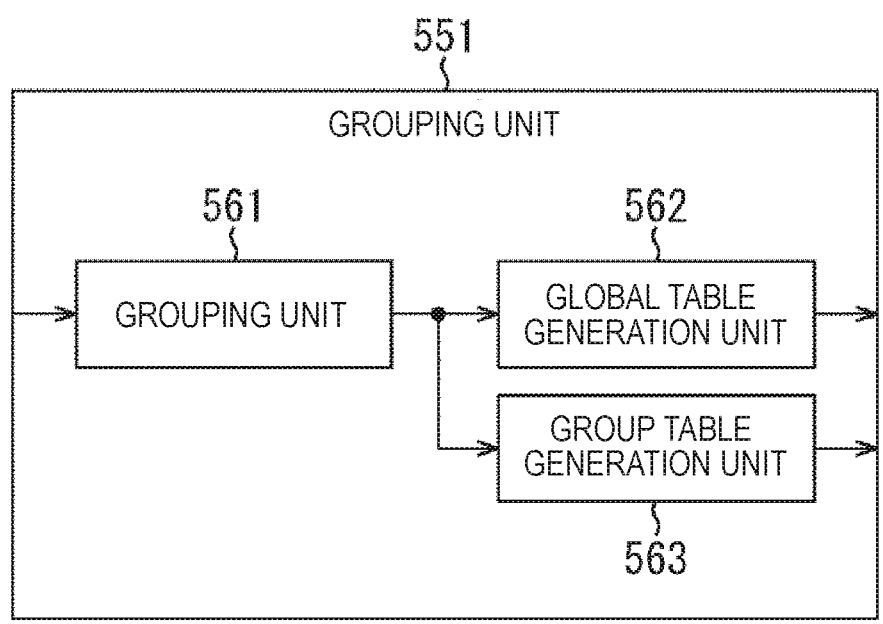
FIG. 37 is an explanatory diagram illustrating a configuration example of a grouping processing unit in FIG. 36.

The grouping unit 551 in FIG. 37 includes a grouping unit 561, a global table generation unit 562, and a group table generation unit 563.

The grouping unit 561 of the grouping unit 551 classifies the plurality of cameras into a plurality of groups on the basis of at least one of the internal parameters and the external parameters of each camera set by the priority setting unit 552. The grouping unit 561 generates group information of each group and supplies the group information to the global table generation unit 562.

In addition, the grouping unit 561 supplies the multi-camera units 11 classified into a group and the internal parameters and the external parameters of each camera to the group table generation unit 563 for each group.

The global table generation unit 562 (a group information generation unit) generates a global table on the basis of the group information of each group supplied from the grouping unit 561. The global table generation unit 562 supplies the global table to the storage 58 and causes the global table to be stored.

The group table generation unit 563 (a camera information generation unit) generates a group table for each group on the basis of the internal parameters and the external parameters of the multi-camera units 11 classified into each group supplied from the grouping unit 561. The group table generation unit 563 supplies the group table to the storage 58 and causes the group table to be stored.

(Description of First Classification Method for Multi-Camera Units)

Figure 38:
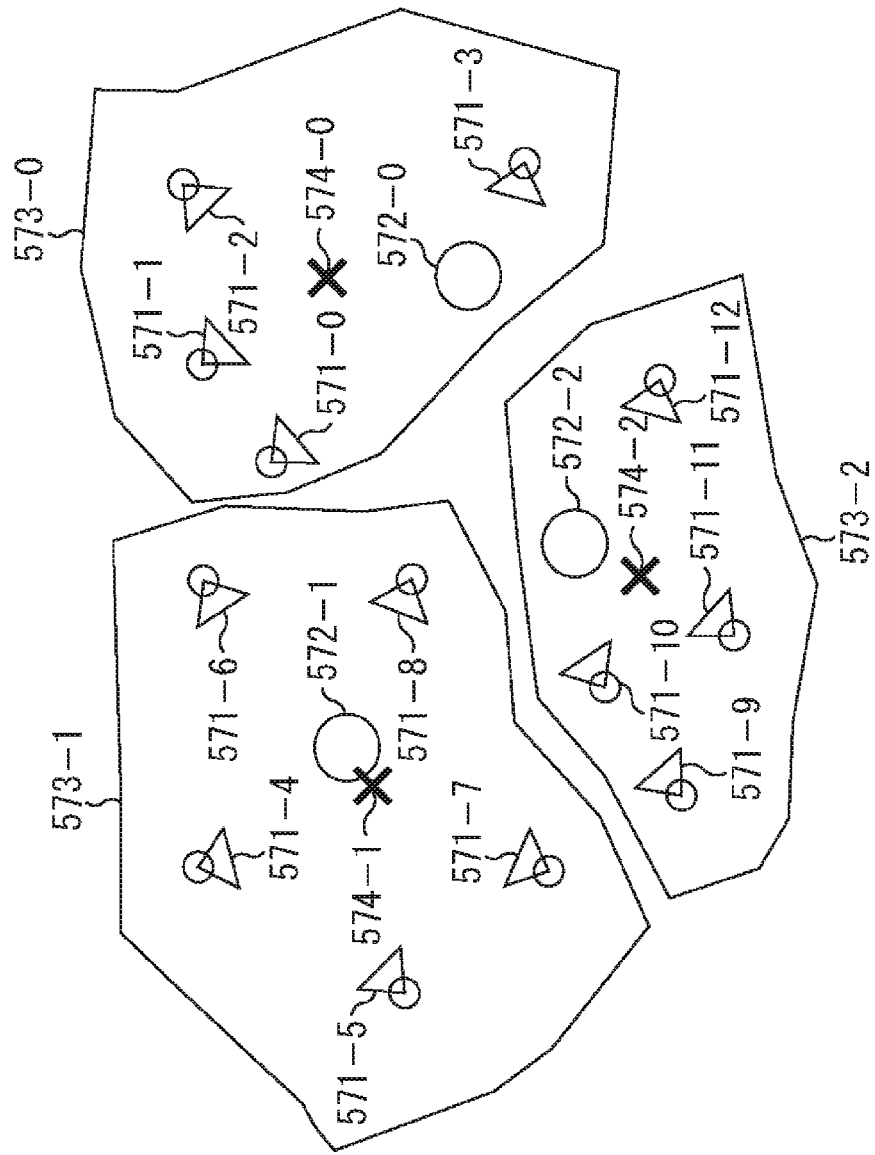
FIG. 38 is an explanatory diagram illustrating a first example of a first classification method for cameras.
Figure 39:
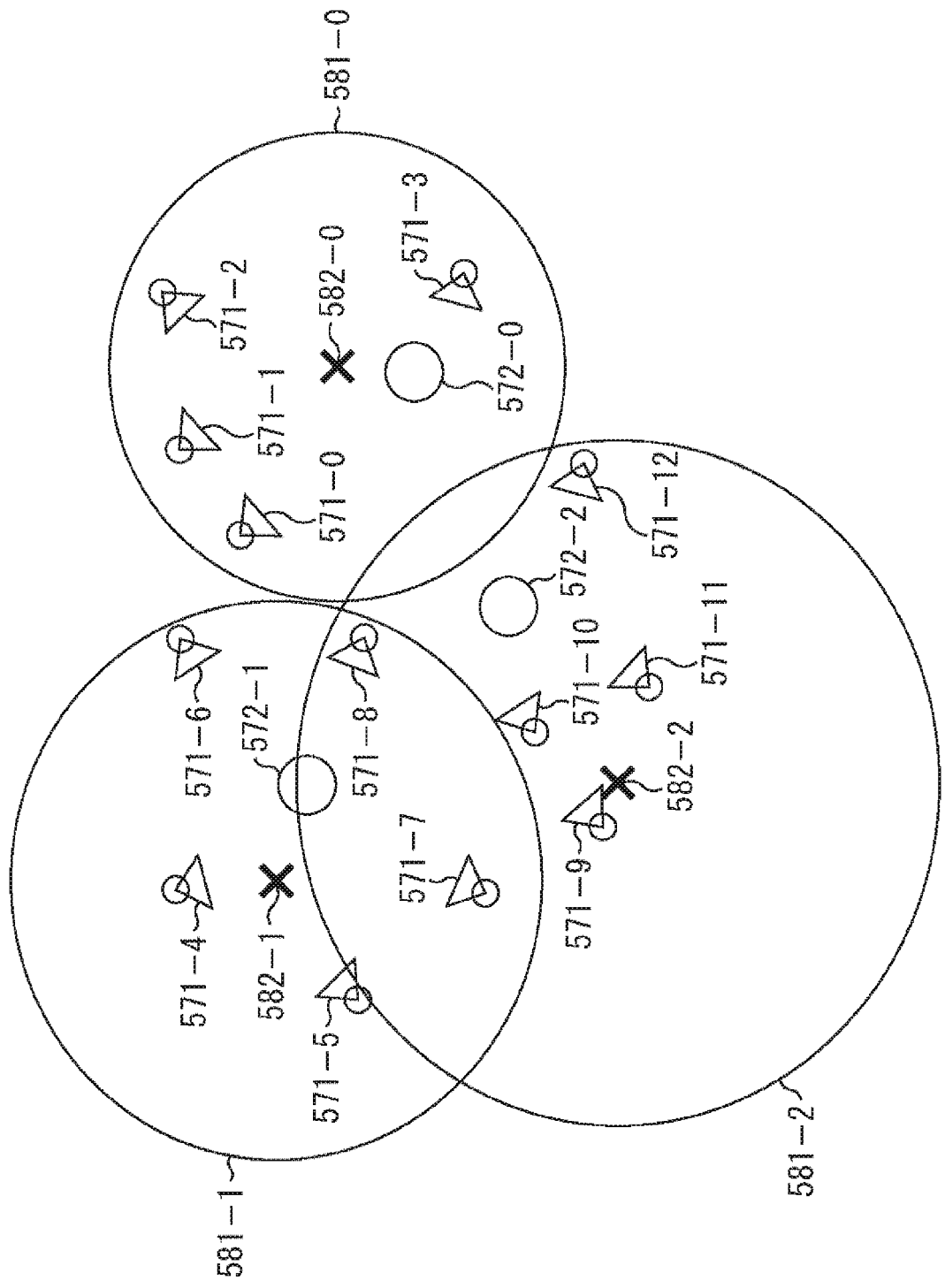
FIG. 39 is an explanatory diagram illustrating a second example of a first classification method for cameras.

FIGS. 38 and 39 are explanatory diagrams illustrating the first classification method for the multi-camera units 11 by the grouping unit 561.

In the examples of FIGS. 38 and 39, three 3-dimensional objects 572-0 to 572-2 are photographed as main subjects by cameras 571-0 to 571-12 of one of thirteen multi-camera units 11. Note that this applies to FIG. 41 to be described below. In addition, hereinafter, in a case in which it is not particularly necessary to distinguish the cameras 571-0 to 571-12 from each other, the cameras 571-0 to 571-12 are collectively referred to as cameras 71. Further, hereinafter, an example in which only one camera is grouped among six cameras 571 belonging to the multi-camera unit 11 will be described in the description of a method of grouping the multi-camera unit 11. The multi-camera unit 11 is assumed to belong to each of the groups to which each camera 571 belongs.

In this case, in the first classification method, for example, the grouping unit 551 classifies the multi-camera unit 11 to which the camera 571 belongs into a group in accordance with a k-means method or the like on the basis of a position indicated by an external parameter of the camera 571, as illustrated in FIG. 38. That is, in the multi-camera unit 11, for example, six surfaces are photographed by six cameras. Therefore, one multi-camera unit 11 belongs to a group with regard to each of the six surfaces. Thus, all the multi-camera units 11 are classified into any one group. In the example of FIG. 38, the grouping unit 561 classifies the multi-camera unit 11 to which four cameras 571-0 to 571-3 belong into a first group, classifies the multi-camera unit 11 to which five cameras 71-4 to 71-8 belong into a second group, and classifies the multi-camera unit 11 to which four cameras 71-9 to 71-12 belong into a third group.

At this time, the grouping unit 561 decides regions 573-0 to 573-2 including positions of the multi-camera units 11 to which all the cameras 571 classified into groups for each group belong and obtains centroids 574-0 to 574-2 of the regions 573-0 to 573-2. Regions which are adjacent to each other among the regions 573-0 to 573-2 may be in contact or may not be in contact.

In the first classification method of FIG. 38, the multi-camera units 11 including the cameras 571 are classified into any one group. However, as illustrated in FIG. 39, the multi-camera unit 11 to which at least one camera 571 belongs is classified into two or more of the groups in some cases. In this case, for a region including positions indicated by the external parameters of all the cameras 571, the grouping unit 561 sets a partial region that is a part of a region so that at least one partial region overlaps another partial region. Then, the grouping unit 561 classifies the multi-camera unit 11 to which the cameras 571 located within a partial region belong into one group for each partial region.

In the example of FIG. 39, three circular partial regions 581-0 to 581-2 are set in the region including the positions of the multi-camera units 11 to which all the cameras 571 belong. Then, the multi-camera unit 11 to which four cameras 571-0 to 571-3 located within the partial region 581-0 belong is classified into the first group and the multi-camera unit 11 to which five cameras 571-4 to 571-8 located within the partial region 581-1 belong is classified into the second group. In addition, the multi-camera unit to which six cameras 571-7 to 571-12 located within the partial region 581-2 belong is classified into the third group. Accordingly, the multi-camera unit 11 to which the cameras 571-7 and 571-8 belong is classified into both the second group and the third group.

At this time, the grouping unit 561 obtains centroids (centers) 582-0 to 582-2 of the partial regions 581-0 to 581-2.

Note that in the examples of FIGS. 38 and 39, the main subjects photographed by the cameras 571 are the 3-dimensional objects, but may be 3-dimensional spaces.

(Configuration Example of Global Table in First Classification Method)

FIG. 40 is a diagram illustrating a configuration example of a global table in the first classification method.

Note that in the example of FIG. 40, the number of groups is 3 and a group ID is sequentially granted to each group from 0.

In the global table of FIG. 40, group information including a centroid position of the group, region information, and group table acquisition information is registered in association with the group ID of each group.

The centroid position is 3-dimensional coordinates indicating the positions of centroids of regions including the positions of all the cameras classified into the groups (the centroids 574-0 to 574-2 in the example of FIG. 38 and the centroids 582-0 to 582-2 in the example of FIG. 39). In FIG. 40, a centroid position of a group of which a group ID is i (where i=0, 1, and 2) is written as 3-dimensional coordinates $(x_i, y_i, z_i)$.

In addition, the region information is information indicating regions including the positions of all the cameras classified into the groups (the regions 573-0 to 573-2 in the example of FIG. 38 and the partial regions 581-0 to 581-2 in the example of FIG. 39). In a case in which the shapes of the regions are not circles as in the regions 573-0 to 573-2, the region information is, for example, 3-dimensional coordinates of each vertex of the regions. Conversely, in a case in which the shapes of the regions are circulars as in the partial regions 581-0 to 581-2, the region information is, for example, information indicating a radius of the region. In the example of FIG. 40, the region information of the group of which the group ID is i is written as $Region_i$.

The group table acquisition information is, for example, information such as Uniform Resource Locator (URL) for specifying the position of the global table in the storage 58. In FIG. 40, the group table acquisition information of the group of which the group ID is i is written as $URL_i$.

(Description of Second Classification Method for Multi-Camera Units)

Figure 41:
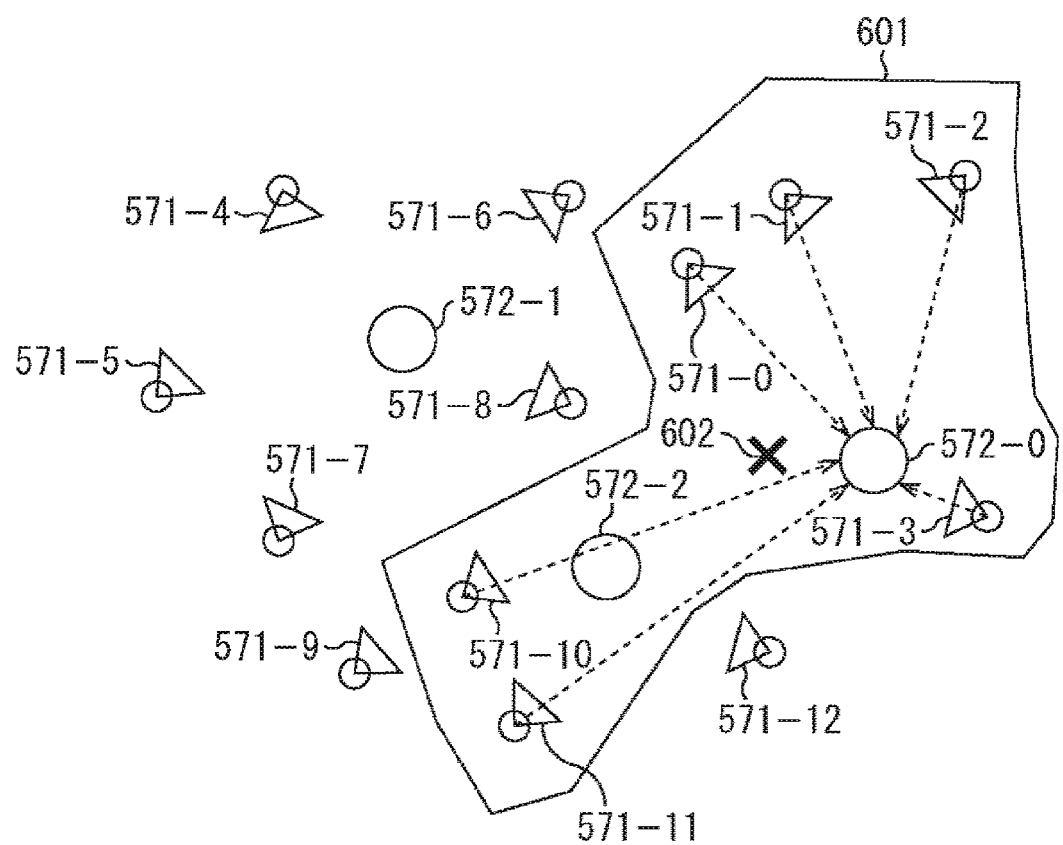
FIG. 41 is an explanatory diagram illustrating a second classification method for cameras.

FIG. 41 is an explanatory diagram illustrating a second classification method for the multi-camera units 11 by the grouping unit 561 in FIG. 37.

In the second classification method, the internal parameters and the external parameters of the cameras assumed to be installed at the imaginary viewpoints and the cameras of the multi-camera units 11 are the same.

In addition, as illustrated in FIG. 41, with regard to the 3-dimensional objects 572-0 to 572-2, the grouping unit 561 classifies the cameras belonging to any of the multi-camera units 11 corresponding to the texture images in which the 3-dimensional objects 572-0 to 572-2 are subjects into groups. Specifically, the grouping unit 561 recognizes a corresponding 3-dimensional object using the texture image (a 2-dimensional image) on the basis of the internal parameters and the external parameters for each camera. Then, the grouping unit 561 classifies the cameras corresponding to the 3-dimensional objects for each 3-dimensional object into groups and classifies the cameras into groups in association with the corresponding multi-camera unit 11 into groups.

In the example of FIG. 41, the grouping unit 561 classifies the multi-camera unit 11 to which six cameras 571-0 to 571-3, 71-10, and 571-11 belong into the group corresponding to the 3-dimensional object 72-0. At this time, the grouping unit 561 decides a region 601 including the position of the multi-camera unit 11 to which all the cameras 571 classified into the group corresponding to the 3-dimensional object 572-0 belong and obtains a centroid 602 of the region 601.

In addition, the grouping unit 561 classifies the multi-camera unit 11 to which the cameras 571 belong into the group corresponding to the 3-dimensional objects 572-1 and 572-2 as in the group corresponding to the 3-dimensional object 572-0. Then, the grouping unit 561 decides a region including the position of the multi-camera unit 11 to which all the cameras 571 classified into the group belong for each group and obtains the centroid of the region.

(Configuration Example of Global Table in Second Classification Method)

FIG. 42 is a diagram illustrating a configuration example of a global table in the second classification method.

The configuration of the global table of FIG. 42 is different from the configuration of FIG. 40 in that 3-dimensional object position is further included in the group information.

That is, in the global table of FIG. 42, 3-dimensional coordinates of the centers of 3-dimensional objects which are information indicating 3-dimensional objects (3-dimensional objects 572-0 to 572-2 in the example of FIG. 41) corresponding to the group are registered as 3-dimensional object position in association with the group ID of each group. That is, the 3-dimensional object position is information indicating whether or not the texture images photographed by the cameras belonging to the multi-camera unit 11 corresponding to the cameras classified into each group are used to generate 3-dimensional data of a certain 3-dimensional object. In FIG. 42, the 3-dimensional position object of the group of which the group ID is i (where i=0, 1, and 2) is written as 3-dimensional coordinates (xsi, ysi, zsi).

(Description of Third Classification Method for Cameras)

Figure 43:
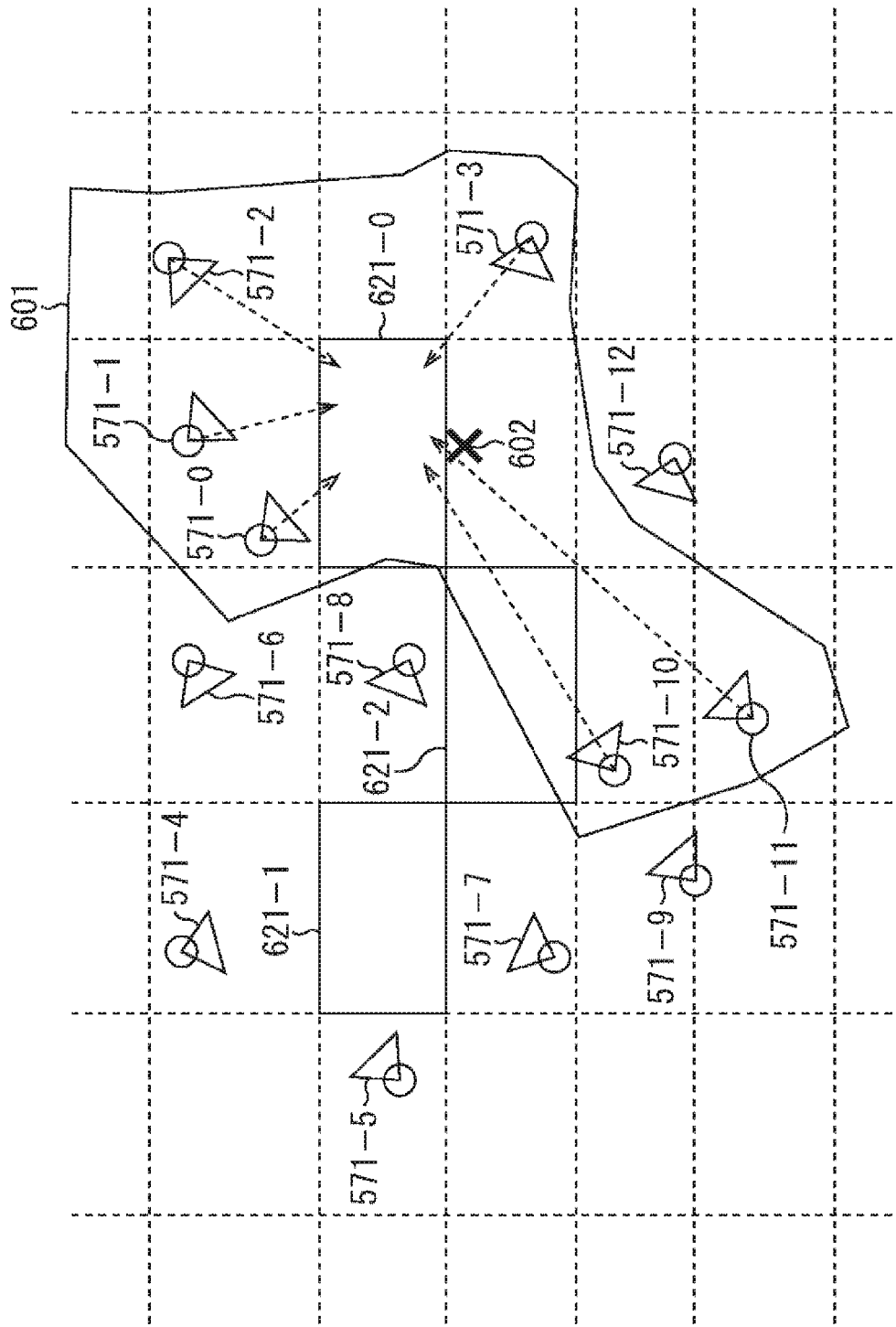
FIG. 43 is an explanatory diagram illustrating a third classification method for cameras.

FIG. 43 is an explanatory diagram illustrating a third classification method for the cameras by the grouping unit 561 in FIG. 37.

In the third classification method, a main subject of each camera belonging to the multi-camera unit 11 is a 3-dimensional space. In the example of FIG. 43, the number of cameras belonging to the multi-camera unit 11 is 13 and the internal parameters and the external parameters are set in thirteen cameras 571-0 to 571-12.

Further, as illustrated in FIG. 43, the grouping unit 561 divides the 3-dimensional space into 3-dimensional space division regions in accordance with grids, Voronoi, or the like. In the example of FIG. 43, the thirteen cameras 571 belonging to any multi-camera unit 11 photograph three 3-dimensional space division regions 621-0 to 621-2 as main subjects. Note that 3-dimensional objects are included in the 3-dimensional space division regions 621-0 to 621-2 photographed by the cameras 571.

In addition, as illustrated in FIG. 43, the grouping unit 561 classifies the cameras corresponding to the texture images in which the 3-dimensional space division regions 621-0 to 621-2 are subjects into the group with regard to each of the 3-dimensional space division regions 621-0 to 621-2. Specifically, the grouping unit 561 recognizes the 3-dimensional space division regions corresponding to the 3-dimensional data generated using the texture images on the basis of the internal parameters and the external parameters for each camera. Then, the grouping unit 561 classifies the cameras corresponding to the 3-dimensional space division regions into the group for each 3-dimensional space division region.

In the example of FIG. 43, the grouping unit 561 classifies the multi-camera unit 11 to which six cameras 571-0 to 571-3, 571-10, and 571-11 belong into the group corresponding to the 3-dimensional space division region 621-0. At this time, the grouping unit 561 decides a region 601 including the position of the multi-camera unit 11 to which all the cameras 571 classified into the group corresponding to the 3-dimensional space division region 621-0 belong and obtains a centroid 602 of the region 601.

In addition, the grouping unit 561 classifies the multi-camera unit 11 to which the cameras 571 belong into the group corresponding to the 3-dimensional space division regions 621-1 and 621-2 as in the group corresponding to the 3-dimensional space division region 621-0. Then, the grouping unit 561 decides a region including the position of the multi-camera unit 11 to which all the cameras 571 classified into the group belong for each group and obtains the centroid of the region.

(Configuration Example of Global Table in Third Classification Method)

FIG. 44 is a diagram illustrating a configuration example of a global table in the third classification method.

The configuration of the global table of FIG. 44 is different from the configuration of FIG. 40 in that 3-dimensional space division region position is further included in the group information.

That is, in the global table of FIG. 44, the 3-dimensional coordinates of the center of the 3-dimensional space division region which is information indicating the 3-dimensional space division region (the 3-dimensional space division regions 621-0 to 621-2 are registered in the example of FIG. 43) corresponding to the group is registered as a 3-dimensional space division region position in association with the group ID of each group. That is, the 3-dimensional space division region position is information indicating whether or not the texture images or the like photographed by the cameras classified into each group are used to generate 3-dimensional data of a certain 3-dimensional space division region. In FIG. 44, the 3-dimensional space division region position of the group of which the group ID is i (where i=0, 1, and 2) is written as 3-dimensional coordinates (xci, yci, zci).

(Example of Group Table)

FIG. 45 is a diagram illustrating an example of a group table generated by the group table generation unit 563 in FIG. 37.

As illustrated in FIG. 45, in the group table, the internal parameters, the external parameters, and stream acquisition information of the cameras are registered as camera information in association with the multi-camera unit ID to which the multi-camera unit 11 classified into the group corresponding to the group table belongs and surfaces photographed by the cameras belonging to each multi-camera unit.

In the example of FIG. 45, the number of multi-camera units 11 classified into the group corresponding to the group table is 3, multi-camera unit IDs of the multi-camera units 11 are 1 to 3, and surfaces photographed by the cameras to which each multi-camera unit 11 belongs are posZi, negZi, posXi, negXi, posYi, and negYi (where i=1, 2, and 3). Note that the surfaces corresponding to the cameras in the multi-camera unit 11 correspond to surfaces 81 to 86 described with reference to FIGS. 8A and 8B.

In addition, in FIG. 45, the internal parameters of the cameras which are posZi, negZi, posXi, negXi, posYi, and negYi (where i=1, 2, and 3) are written as Kij (where j=0 to 5) and external parameters are written as Rij|Tij.

The stream acquisition information includes the texture image acquisition information and depth image acquisition information. In FIG. 45, the texture image acquisition information of the cameras in which surfaces for identifying the cameras are posZi, negZi, posXi, negXi, posYi, and negYi (where i=1, 2, and 3) is written as VIDEO URLij (where j=0 to 5).

The depth image acquisition information is information used to acquire an encoded stream of depth image data photographed by the cameras and is, for example, information such as URL for specifying a position of the depth image data in the storage 58. In FIG. 45, depth image data acquisition information of the cameras in which the surfaces for identifying the cameras are posZi, negZi, posXi, negXi, posYi, and negYi (where i=1, 2, and 3) is written as DEPTH URLij (where j=0 to 5).

The selection unit 553 selects camera information which is used to generate 3-dimensional data reproduced by the home server 502 from camera information of all the registered cameras on the basis of the camera information of each camera registered in the group table in this way in response to a request from the home server 502.

(Configuration Example of Priority Setting Unit)

Next, a configuration example of the priority setting unit 552 will be described with reference to the block diagram of FIG. 46. The priority setting unit 552 includes an evaluation unit 651 and a priority determination unit 652.

The evaluation unit 651 obtains a field angle of each camera on the basis of the external parameters and the internal parameters of each camera necessary to generate an enclosure image for each group. The evaluation unit 651 calculates an evaluation value of each disposition of the camera for generating 3-dimensional data on the basis of a field angle of each camera for each disposition of the cameras that form a group. The evaluation unit 651 supplies the evaluation value of each disposition of the camera to the priority determination unit 652 in a group unit. The priority determination unit 652 supplies the evaluation value of each disposition of the camera for each group supplied from the evaluation unit 651 to the priority determination unit 652.

The priority determination unit 652 sets an entire celestial sphere priority in units of the multi-camera units 11 at the time of display of the entire celestial sphere image and an enclosure priority in each camera unit at the time of displaying of an enclosure image on the basis of the evaluation value of each camera disposition of each group supplied from the evaluation unit 651, generates a priority table, and stores the priority table in the storage 58. For example, the priority determination unit 652 may set an enclosure priority which is a priority of the enclosure image to be described below and may set an entire celestial sphere priority which is a priority of the entire celestial sphere image using the priority set in an individual camera unit irrespective of the multi-camera unit 11 set with the enclosure priority. For example, the priority determination unit 652 may set the entire celestial sphere priority of each multi-camera unit 11 by a total indicator of the priority set in the individual camera in accordance with the entire celestial sphere priority.

(Example of Enclosure Image)

Here, an example of enclosure disposition by the cameras photographing images necessary to generate an enclosure image will be described with reference to FIG. 47.

Figure 47:
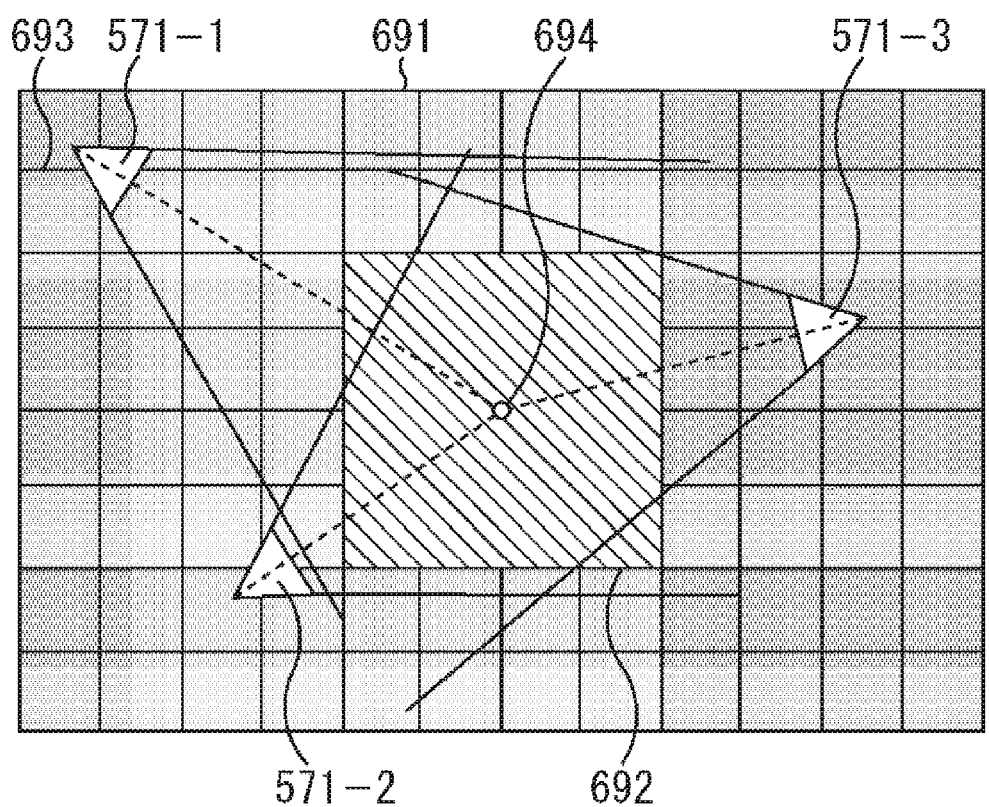
FIG. 47 is an explanatory diagram illustrating an example of candidate enclosure disposition.

In the enclosure image, for example, disposition of the cameras 571 is enclosure disposition in a case in which an installation region 691 in which each camera 571 of the multi-camera unit 11 is installed includes a viewing region 692 which is a subject or a subject region in each group, as illustrated in FIG. 47. In FIG. 47, the installation region 691 is divided into a plurality (in the example of FIG. 47, 12 (transverse)×8 (longitudinal)) of grids 693. Then, in each combination of three vertexes among the vertexes of all the grids 693, it is assumed that the three vertexes are included as a position t of each camera 571 and an external parameter of each camera 571 including an attitude R at which an optical axis of each camera 571 passes through a central point 694 of the viewing region 692 is generated. The external parameter of each camera 571 in each combination of three vertexes is assumed to be decided as an external parameter of the disposition of each camera 571.

Note that the disposition of the cameras 571 inside the installation region 691 is realized for each group in which the field angles of all the cameras 571 include the viewing region 692.

Here, the configuration example of the priority setting unit 552 will be described again. The evaluation unit 651 of the priority setting unit 552 includes a division unit 671, a projection unit 672, a determination unit 673, and a computation unit 674.

The division unit 671 of the evaluation unit 651 divides a surface of a viewing region indicating the position of the viewing region information associated with the subject in each group into a plurality of grids. The division unit 671 supplies grid information including 3-dimensional coordinates or the like indicating the position of the upper left of each grid to the projection unit 672.

Figures 48A, 48B, 48C:
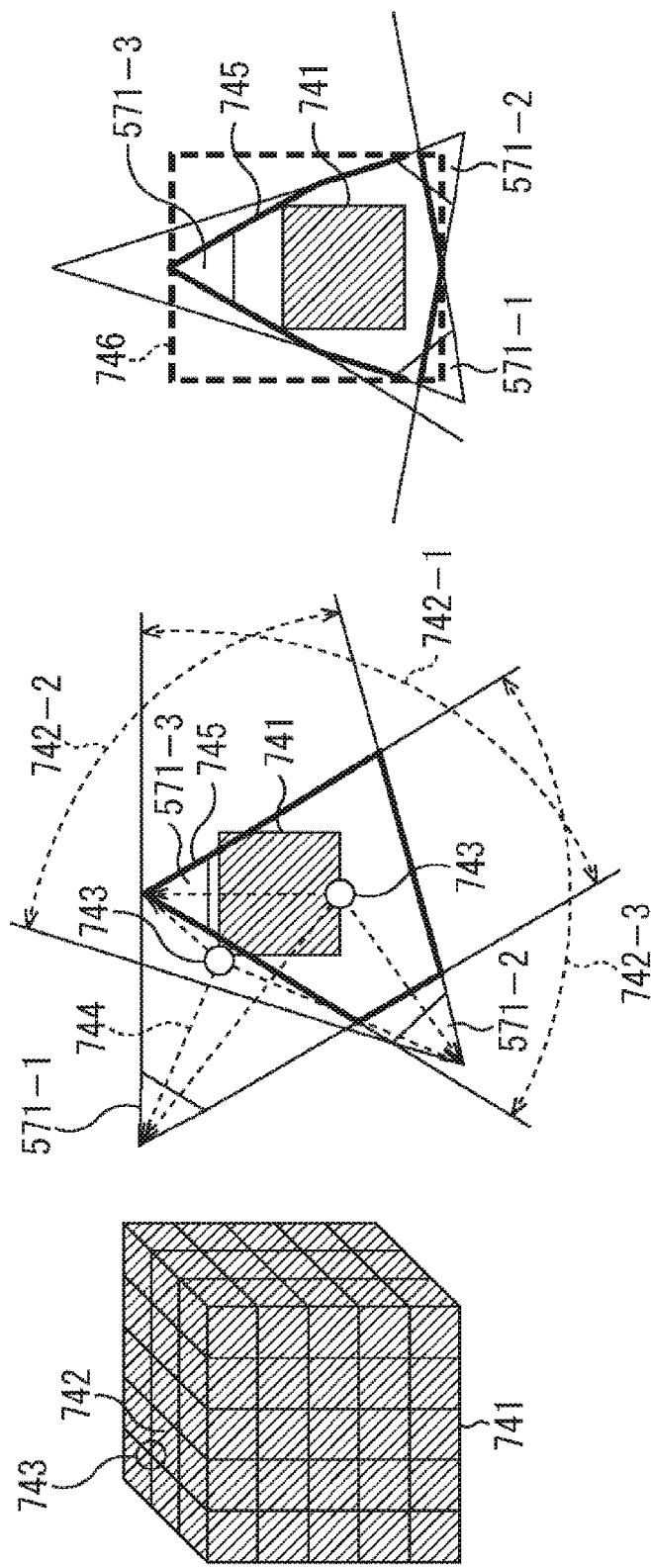
FIGS. 48A, 48B, and 48C are explanatory diagrams illustrating a process by an evaluation unit in FIG. 46.

For example, the division unit 671 divides a surface of a viewing region 741 illustrated in FIG. 48A into a plurality of grids 742 and supplies 3-dimensional coordinates indicating positions 743 at the upper left of the grid 742 as grid information to the projection unit 672. Note that FIG. 48A is a perspective view illustrating the viewing region 741.

The projection unit 672 projects each grid to each camera 571 on the basis of the grid information supplied from the division unit 671 and the external parameters and the internal parameters of each camera 571 for each disposition of the camera 571 and generates projection line information indicating a projection line with regard to each group. The projection unit 672 supplies the projection line information to each camera 571 of each grid to the determination unit 673 for each group of the cameras 571.

For example, the projection unit 672 projects the positions 743 at the upper left of the grid 742 illustrated in FIG. 48B to each of the cameras 571-1 to 571-3 and supplies the projection line information indicating projection lines 744 to the determination unit 673. Note that FIG. 48B is a diagram illustrating the cameras 571 and the viewing region 741 viewed from the upper side of the cameras 571. The same applies to FIG. 48C.

The determination unit 673 detects the number Viewcount of cameras 571 in which the projection lines to the cameras 571 are within the field angle of each camera 571 with regard to each grid on the basis of the projection line information supplied from the projection unit 672 for each camera 571 in each group.

In a case in which the number Viewcount is the number N of cameras 571 for each grid, that is, a case in which all the projection lines to each camera 571 are within the field angle of the camera 571, the determination unit 673 sets 1 indicating validity in a ValidFlag indicating whether or not the disposition of the camera 571 is valid, that is, a subject is validly photographed by the camera 571.

On the other hand, in a case in which the number Viewcount is less than the number N of cameras 571 for each grid, that is, a case in which at least one of the projection lines to each camera 571 is not within the field angle of the camera 571, the determination unit 673 sets 0 indicating invalidity in ValidFlag. The determination unit 673 supplies ValidFlag of each grid to a calculation unit 675 for each disposition of the camera 571.

For example, projection lines from the position 743 at the upper left position illustrated in FIG. 48B to the cameras 571-1 and 571-2 are within a field angle 742-1 of the camera 571-1 and a field angle 742-2 of the camera 571-2. However, the projection lines from the upper left position 743 to the camera 571-3 are not within a field angle 742-3 of the camera 571-3. Accordingly, the determination unit 673 determines that the determined number Viewcount of cameras 571 is 2 with regard to the grid 742 of the upper left position 743. Then, since 2 which is the determined number Viewcount is less than 3 which is the number N of cameras 571, the determination unit 673 sets 0 in ValidFlag of the grid 742 of the upper left position 743 and supplies Valid-Flag to the calculation unit 675.

On the other hand, the projection lines from the lower middle position 743 illustrated in FIG. 48B to the cameras 571-1 and 571-3 are within the field angles 742-1 to 742-3 of the cameras 571-1 to 571-3, respectively. Accordingly, the determination unit 673 determines that the number Viewcount of the cameras 571 is 3 with regard to the grid 742 of the lower middle position 743. Then, since 3 which is the determined number Viewcount is equal to 3 which is the number N of cameras 571, the determination unit 673 sets 1 in ValidFlag of the grid 742 of the lower middle position 743 and supplies ValidFlag to the calculation unit 675.

The computation unit 674 generates Convex Hull on the basis of the external parameters and the internal parameters of each camera 571 for each disposition of the cameras 571. Convex Hull is regions that intersect when the field angles of the cameras 571 are projected to the 3-dimensional coordinates and is Visual Hull generated in accordance with the field angles of the cameras 571. The details of Convex Hull are described in, for example, C. BRADFORD BARBER, DAVID P. DOBKIN, HANNU HUHDANPAA, The Quickhull Algorithm for Convex Hulls.

In the example of FIG. 48B, the computation unit 674 generates Convex Hull 745. Here, 3-dimensional data of the viewing region 741 protruding from Convex Hull 745 may not be generated using the texture images and the depth images photographed by the cameras 571.

In addition, the computation unit 674 computes 3-dimensional coordinates of Bounding Box which is a quadrangle pole circumscribed with Convex Hull on the basis of a minimum value and a maximum value of x, y, and z coordinates of Convex Hull for each disposition of the cameras 571. The computation unit 674 supplies the 3-dimensional coordinates of Bounding Box to the calculation unit 675 for each disposition of the cameras 571.

For example, the computation unit 674 computes 3-dimensional coordinates of Bounding Box 746 which is a quadrangle pole circumscribed with Convex Hull 745 on the basis of a minimum value and a maximum value of x, y, and z coordinates of Convex Hull 745 in FIG. 48C and supplies the 3-dimensional coordinates to the calculation unit 675.

The calculation unit 675 determines whether ValidFlag of all the grids is 1 on the basis of ValidFlag of each grid supplied from the determination unit 673 for each disposition of the cameras 571. The calculation unit 675 calculates an evaluation value E on the basis of Expression (2) below in a case in which the calculation unit 675 determines that ValidFlag of all the grids is 1.

[Math. 2]

$$E = \frac{\text{len}(BoundingBox)}{\text{len}(Viewing\ region)} \quad (2)$$

Note that len(R) is a sum of lengths of the sides of a region R in the x direction, the y direction, and the z direction. In addition, in the present specification, the shape of the viewing region is quadrangle pole, but may be a shape other than the quadrangle pole. In this case, in Expression (2), a region of a quadrangle pole circumscribed with the viewing region is used instead of the viewing region.

According to Expression (2), the evaluation value E is closer to 1 as a ratio of the viewing region occupying Bounding Box is larger. That is, the evaluation value E is closer to 1 as a ratio of the viewing region occupying Convex Hull is larger.

Figure 49A:
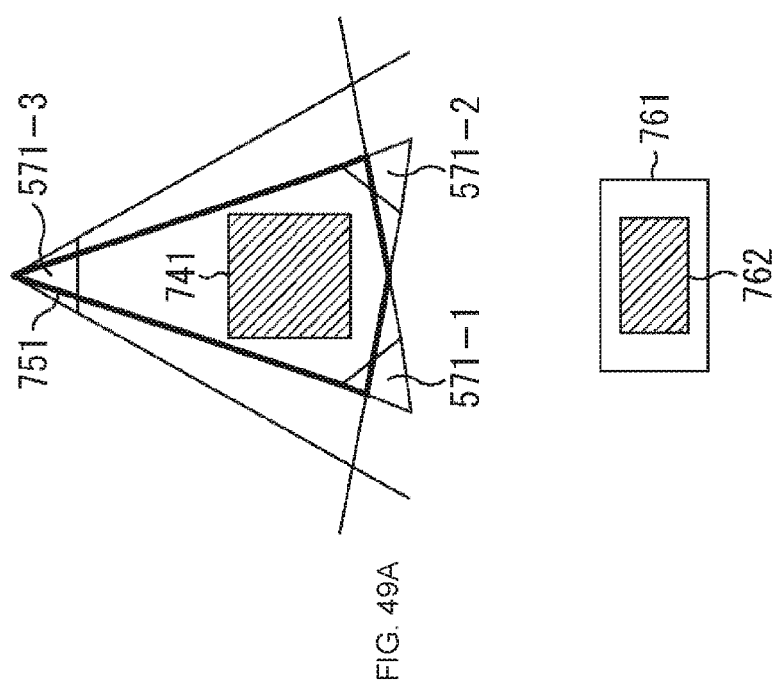
FIGS. 49A and 49B are explanatory diagrams illustrating an evaluation value calculated by the evaluation unit in FIG. 46.
Figure 49B:
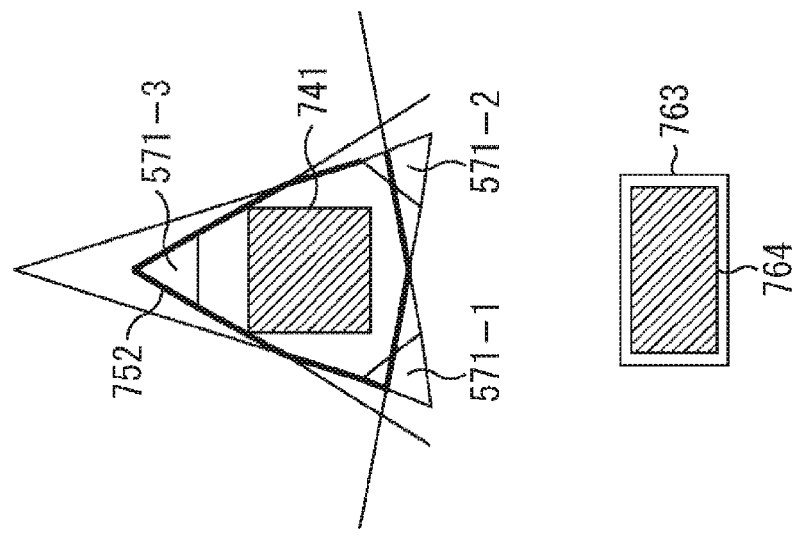

For example, in a case in which a ratio of the viewing region 741 occupying Convex Hull 752 is relatively large, as illustrated in the upper part of FIG. 49B, the evaluation value E is a value closer to 1 than a case in which the ratio of the viewing region 741 occupying Convex Hull 751 is relatively small as illustrated in the upper part of FIG. 49A.

In addition, in a case in which the disposition of the cameras 571 is enclosure disposition, Visual Hull is used from the texture images or the like photographed by the cameras 571 to generate 3-dimensional data. Accordingly, in a case in which a ratio of the viewing region 741 occupying Convex Hull 751 which is Visual Hull generated in accordance with a field angle is relatively small, as illustrated in the upper part of FIG. 49A, a ratio of a texture image 762 of the viewing region 741 within a texture image 761 generated from the 3-dimensional data is relatively small, as illustrated in the lower part of FIG. 49A.

On the other hand, in a case in which a ratio of the viewing region 741 occupying Convex Hull 752 is relatively large, as illustrated in the upper part of FIG. 49B, a ratio of a texture image 764 of the viewing region 741 within the texture image 763 generated from the 3-dimensional data is relatively large, as illustrated in the lower part of FIG. 49B. Accordingly, a resolution of the texture image 762 of the viewing region 741 is higher than a resolution of the texture image 764 of the viewing region 741. Consequently, as the evaluation value obtained in Expression (2) is closer to 1, precision of the 3-dimensional data increases.

In addition, the calculation unit 675 decides the evaluation value E to 0 in a case in which ValidFlag of at least one grid is determined to be 1, that is, a case in which at least a part of the viewing region is not included in a field angle of at least one camera 571. The calculation unit 675 supplies the evaluation value E of each disposition of the cameras 571 to the priority determination unit 652.

When the evaluation value E is decided, as described above, the evaluation value E corresponding to the disposition of the cameras 571 in which precision of the 3-dimensional data is the highest is closest to 1. Accordingly, the priority determination unit 652 determines a priority using disposition in which the evaluation value E is closest to 1 as an image of optimum disposition.

Figure 46:
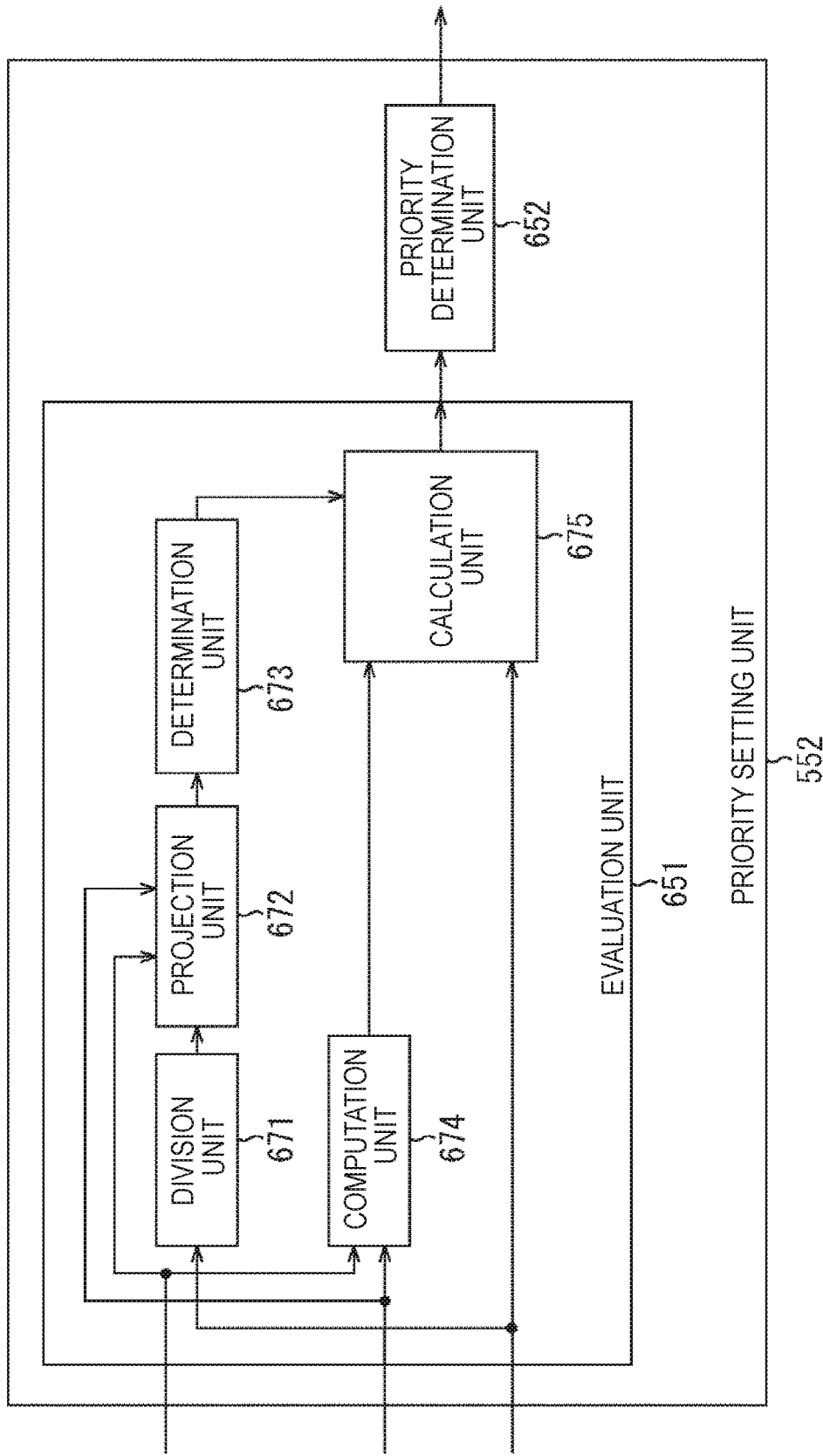
FIG. 46 is an explanatory diagram illustrating a configuration example of a priority setting unit in FIG. 36.

Note that in the example of FIG. 46, the projection unit 672 has projected the grid to the camera 571, but the camera 571 may be projected to the grid.

In addition, when the evaluation value E is a value indicating the precision of Visual Hull generated using the texture images or the like photographed by the cameras 571, the evaluation value E may be a value other than a value indicating a ratio of the viewing region occupying Bounding Box.

For example, the evaluation value E can be set to a value indicating a ratio of the viewing region occupying convex hull, a volume or a surface area of Convex Hull, a difference in the lengths of the sides of Bounding Box in the x, y, and z directions, or the like. In this case, the disposition corresponding to the evaluation value E indicating that the ratio of the viewing region occupying convex hull is the largest, the volume or the surface area of Convex Hull is the smallest, or the difference in the lengths of the sides of Bounding Box in the x, y, and z directions (Bounding Box is closest to a cube) is the smallest is selected as optimum disposition.

The priority determination unit 652 determines an enclosure priority for each corresponding camera 571 in a grid unit in the above-described viewing region on the basis of the evaluation value E corresponding to the camera disposition. More specifically, in a case in which the cameras 571-1 to 571-4 are disposed in a viewing region 771, as illustrated in the left part of FIG. 50, a grid 771A which is a subject within a field angle is included in, for example, the camera configuration of the cameras 571-1 to 571-3 and a relatively high value is set as the evaluation value E. Conversely, since the camera 571-4 is not included in the grid 771A which is a subject, a relatively low value is set.

Figure 50:
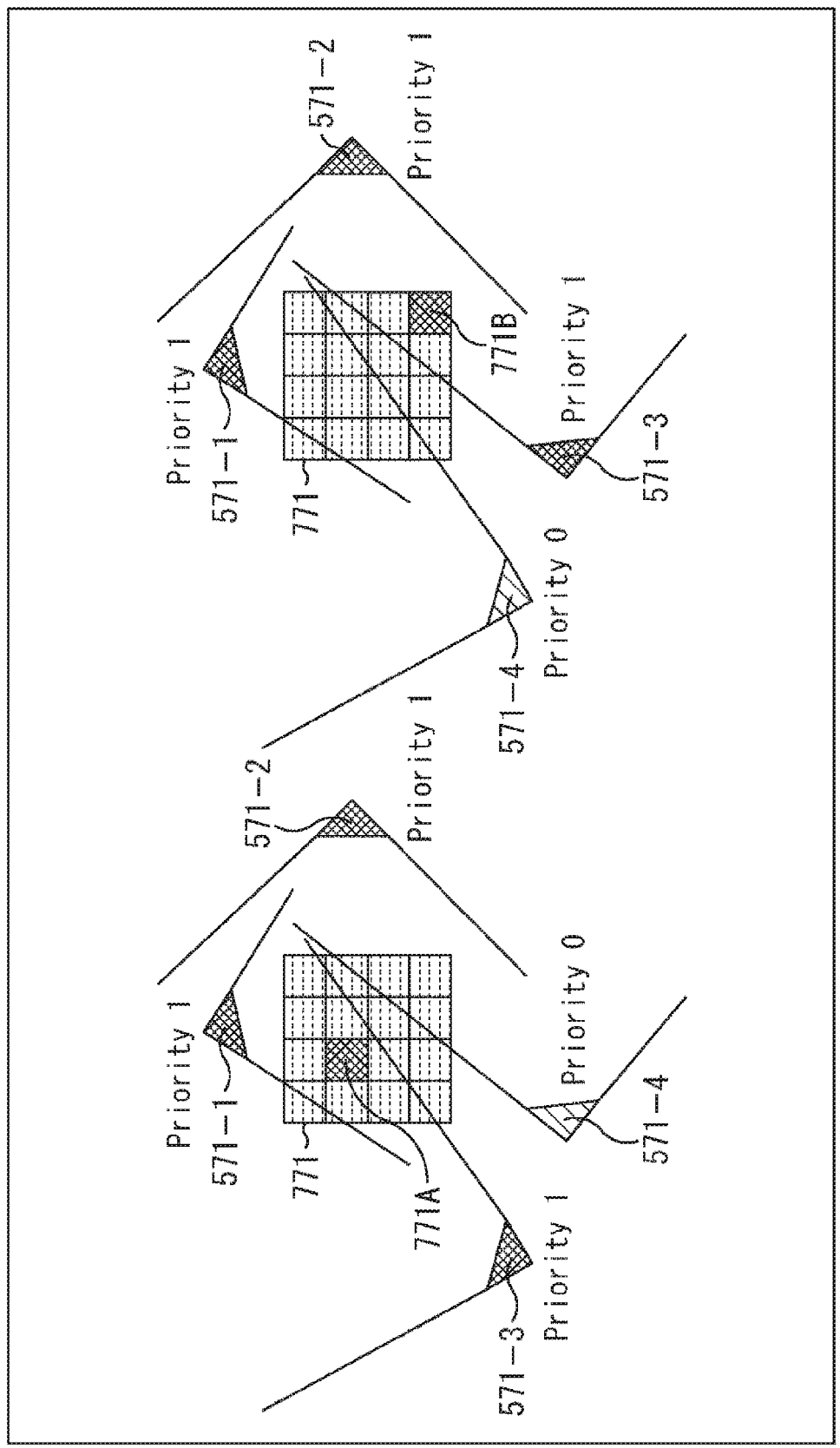
FIG. 50 is an explanatory diagram illustrating a priority determined by a priority determination unit in FIG. 46.

As a result, in the case of the left part of FIG. 50, in the grid 771A in the viewing region 771, the enclosure priority of the cameras 571-1 to 571-3 in which the grid 771A is included within the field angle is set to Priority=1 and the camera 571-4 in which the grid 771A is not included in the field angle is set Priority=0.

In addition, in the case of the right part of FIG. 50, in the grid 771B in the viewing region 771, the enclosure priority of the cameras 571-1 to 571-3 in which the grid 771A is included within the field angle is set to Priority=1 and the camera 571-4 in which the grid 771B is included in the field angle is set Priority=0. Note that as the enclosure priority is higher, the value is higher. As the enclosure priority is lower, the value is closer to 0. Herein, a range of the priority is between 0 and 1. Herein, the range is not limited to 0 to 1, but may be a range different from 0 to 1.

Further, the priority determination unit 652 sets the entire celestial sphere priority in units of the multi-camera units 11 in the entire celestial sphere image on the basis of the value of the enclosure priority. For example, the priority determination unit 652 may set a sum of the enclosure priority of the cameras belonging to each multi-camera unit 11 as the entire celestial sphere priority of the multi-camera unit 11 in a group unit and may set the sum value as the entire celestial sphere priority in all the cameras belonging to the multi-camera unit 11. In addition, the priority determination unit 652 may set a high priority in the cameras belonging to the multi-camera unit 11 closest to the grid 771 which is a subject, irrespective of the enclosure priority, and may set a low priority in the cameras belonging to the multi-camera units 11 that are away.

Note that since the disposition of the cameras is basically fixed, the evaluation value may be obtained by changing the disposition of the cameras in combination of the cameras belonging to the group in the group and the priority in the camera disposition with the largest evaluation value may be set as a priority in the group in the same group.

(Priority Table)

The priority determination unit 652 generates a priority table which is metadata regarding the priority on the basis of the priority of each camera 571 in accordance with the scheme described with reference to FIG. 50 and causes the priority table to be stored in the storage 58.

More specifically, for example, the priority table is generated for each grid in the viewing region illustrated in FIG. 51 and each group and is stored in the storage 58.

In FIG. 51, the entire celestial sphere priority and the enclosure priority are registered in association with the multi-camera unit ID belong to the multi-camera unit 11 from the left of the drawing and each surface photographed by the cameras belonging to each multi-camera unit.

The entire celestial sphere priority is a priority in units of the multi-camera units 11 and is a priority set in units of the cameras belonging to the multi-camera unit 11 with the highest priority set in units of the cameras 571 with regard to the grid.

The enclosure priority is a priority set in the individual camera of each group and each grid.

Therefore, for example, in the priority table illustrated in FIG. 51, the entire celestial sphere priority of the cameras in which the surfaces with the camera ID=1 of the multi-camera unit 11 for identifying the camera are posZ1, negZ1, posX1, negX1, posY1, and negY1 is all written to 2. Note that the priority is set in the range of 0 to 2 herein.

In addition, the priority of the cameras in which the surfaces with the multi-camera unit ID=1 of the multi-camera unit 11 for identifying the cameras are posZ1 and negZ3 is all written to 2 and the priority of the cameras in which the surface is posX2 is written to 1.

In a case in which display on the entire celestial sphere image is set in the priority table in FIG. 51, images of six surfaces PX1, NX1, PY1, NY1, PZ1, and NZ1 belonging to the multi-camera unit ID=1 are selected while the multi-camera unit ID is set to 1 to 3 in the setting of the entire celestial sphere priority, for example, as illustrated in the upper right part of FIG. 51.

In addition, in a case in which display on the enclosure image is set, images of the surfaces PX1, NX2, and PX3 are selected in the setting of the enclosure priority, for example, as illustrated in the lower right part of FIG. 51.

(Configuration Example of Selection Unit)

Next, a configuration example of the selection unit 553 will be described with reference to the block diagram of FIG. 52.

Figure 52:
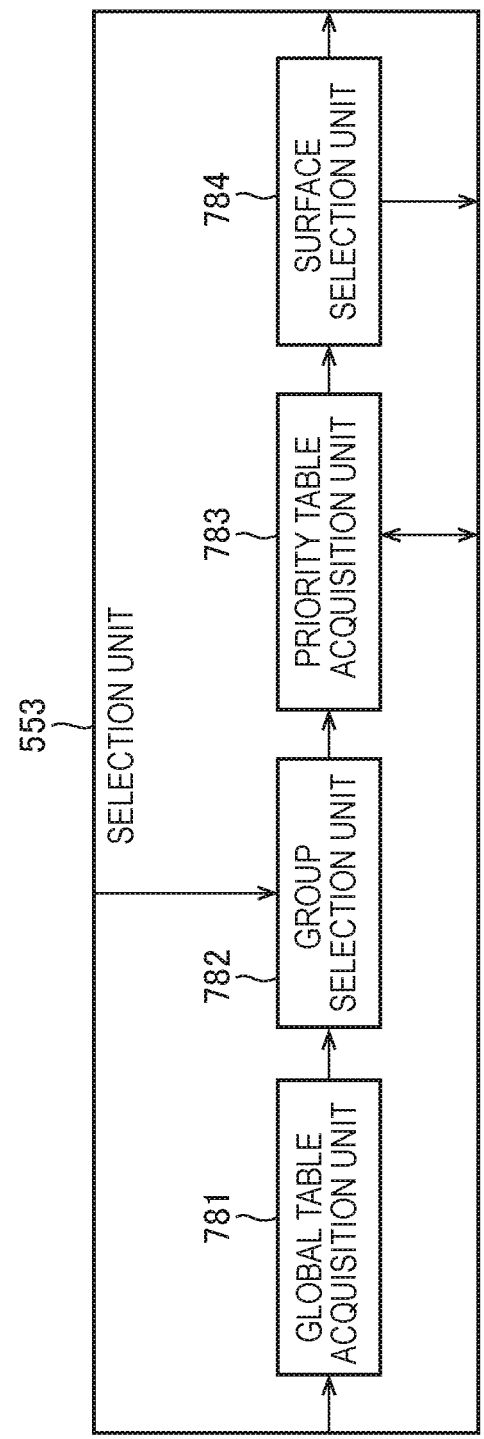
FIG. 52 is an explanatory diagram illustrating a configuration example of a selection unit in FIG. 36.

The selection unit 553 in FIG. 52 includes a global table acquisition unit 781, a group selection unit 782, a group table acquisition unit 783, and a surface selection unit 784.

The global table acquisition unit 781 of the selection unit 553 acquires the global table supplied from the storage 58 and supplies the global table to the group selection unit 782.

The group selection unit 782 selects a group including the selection surfaces from all the groups on the basis of the viewing position, the visual line direction, and the global table supplied from the global table acquisition unit 781. The group selection unit 782 supplies the selected group registered in the global table to the priority table acquisition unit 783.

The priority table acquisition unit 783 (a camera information acquisition unit) acquires the priority table of the grid designated in accordance with the viewing position and the visual line direction in the priority table of the corresponding group on the basis of information regarding the group, selects the priority depending on whether an image designated by the user is an entire celestial sphere image or an enclosure image, and supplies information regarding the selected surface to the surface selection unit 784.

The surface selection unit 784 supplies the texture images and the depth images corresponding to the surfaces stored in the storage 58 from the information regarding the selected surface supplied from the group table acquisition unit 783 to the transmission unit 60.

(Description of Group Table Selection Method)

A group table selection method by the group selection unit 782 will be described with reference to FIG. 53.

Figure 53:
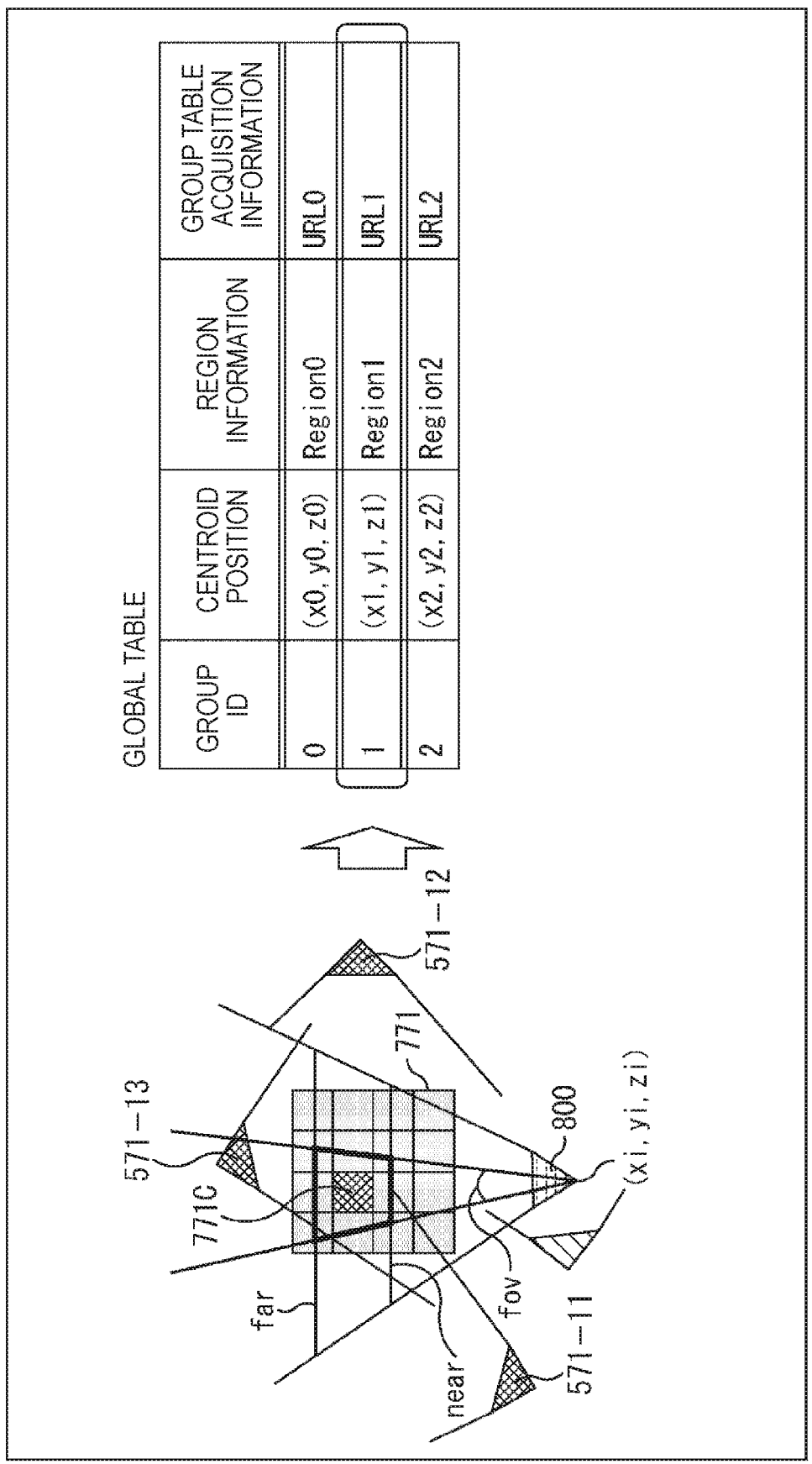
FIG. 53 is an explanatory diagram illustrating a scheme of selecting a group in the global table.

As illustrated in the left part of FIG. 53, a camera 800 imaginarily installed at an imaginary viewpoint is within, for example, a field angle fov and a grid 771C is specified in accordance with a distance near to the front surface of a subject and a distance far to the rear surface of the subject.

In a case in which the grid 771C in the viewing region 771 which is an upper part of the drawing is set to be a viewing region from the camera 800 imaginarily installed at the imaginary viewpoint, as illustrated in the left part of FIG. 53, the group with the group ID=1 is selected as, for example, a group which is specified by the grid 771C and to which the cameras 571-11 to 571-13 belong, as illustrated in the right part of FIG. 53.

As described above, the group selection unit 782 specifies a grid for which the subject of the camera 800 installed at the imaginary viewpoint is within the field angle fov of the camera 800 and which is in the distance near to the front surface of the subject and the distance far to the rear surface of the subject and selects the group which is associated on the basis of the region information including the grid. Thus, the surface selection unit 784 reads the setting of the priority table in accordance with the selected group and acquires information regarding a necessary surface in the image of the camera with a high priority.

(Description of Stream Generation Process)

Figure 54:
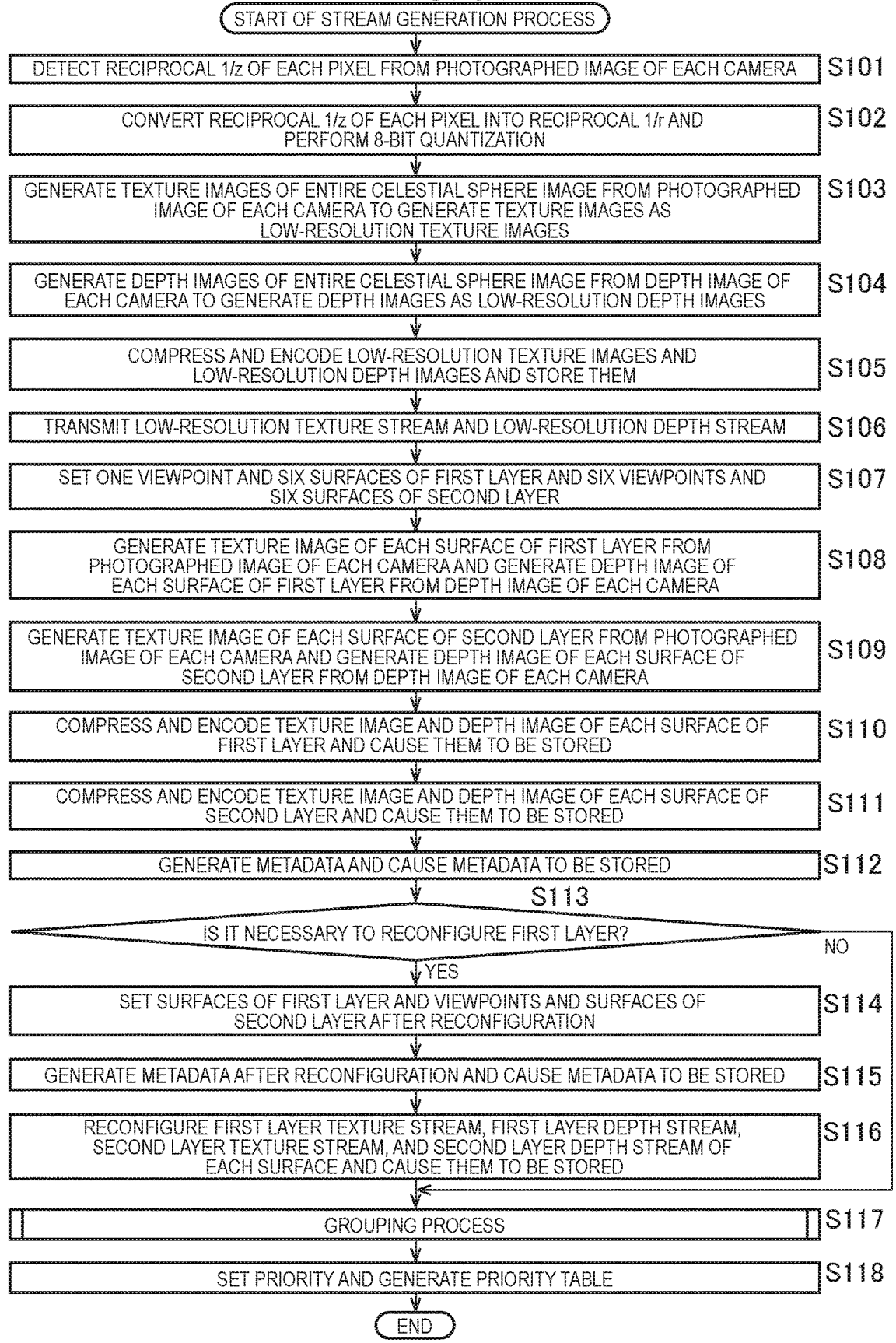
FIG. 54 is an explanatory flowchart illustrating a stream generation process of the home server in FIG. 31.

Next, a stream generation process of the content server 501 in FIG. 31 will be described with reference to the flowchart of FIG. 54. Note that processes of steps S101 to S116 in the flowchart of FIG. 54 are the same as the processes of steps S10 to S25 of FIG. 18, and thus the description thereof will be omitted. In addition, the stream generation process starts when photographed images of the cameras of the multi-camera units 11-1 to 11-n in FIG. 31 are sequentially supplied in a frame unit.

When the first layer texture stream, the first layer depth stream, the second layer texture stream, and the metadata of each surface of the individual multi-camera unit 11 are generated through the processes of steps S101 to S116 and are stored in the storage 58, the process proceeds to step S117.

In step S117, the grouping unit 551 performs a grouping process, groups the multi-camera units 11 and the cameras belonging to each of the multi-camera units 11 to generate a global table and a group table, and causes the global table and the group table to be stored in the storage 58. Note that the details of the grouping process will be described with reference to the flowchart of FIG. 55.

In step S118, the priority setting unit 552 sets the entire celestial sphere priority and the enclosure priority with regard to each multi-camera unit 11 and each camera in the viewing region and the grid unit for each group in accordance with the scheme described with reference to FIGS. 46, 47, 48A, 48B, 48C, 49A, 49B, and 50, generates a priority table including the entire celestial sphere priority and the enclosure priority, and causes the priority table to be stored in the storage 58.

Through the foregoing processes, the first layer texture stream, the first layer depth stream, the second layer texture stream, and the metadata of each surface of the individual multi-camera unit 11 are generated and stored in the storage 58, and the global table, the group table, and the priority table are generated.

(Grouping Process)

Figure 55:
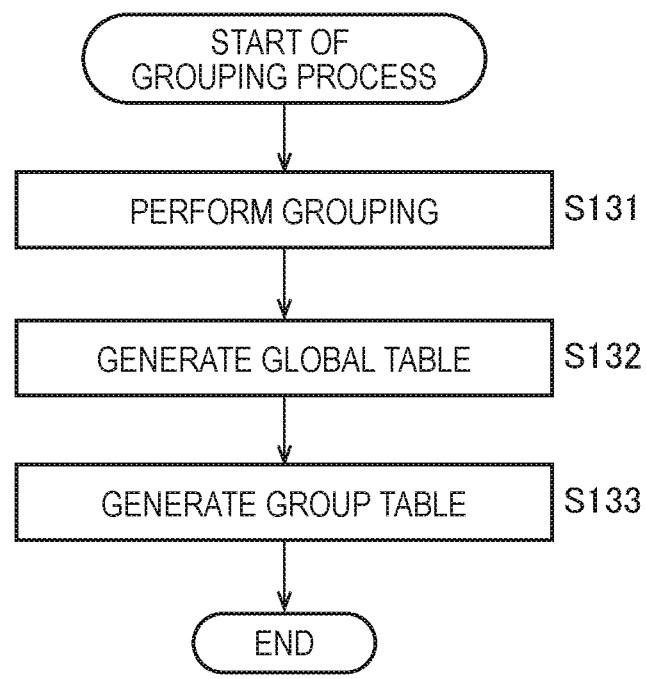
FIG. 55 is an explanatory flowchart illustrating a grouping process in FIG. 31.

Next, a grouping process will be described with reference to the flowchart of FIG. 55.

In step S131, the grouping unit 561 (see FIG. 37) of the grouping unit 551 classifies the plurality of multi-camera units 11 into a plurality of groups on the basis of at least of one of the internal parameters and the external parameters of the cameras belonging to each multi-camera unit 11. The grouping unit 561 generates group information regarding each group and supplies the group information to the global table generation unit 562.

In addition, the grouping unit 561 supplies the multi-camera unit ID of the multi-camera unit 11 classified into the group for each group, the surface for identifying the cameras of the multi-camera unit 11, the internal parameters, the external parameters, the texture image acquisition information, and the depth image acquisition information to the group table generation unit 563.

In step S132, the global table generation unit 562 generates a global table on the basis of the group information of each group supplied from the grouping unit 561. The global table generation unit 562 supplies the global table to the storage 58.

In step S133, the group table generation unit 563 generates the group table for each group on the basis of the multi-camera unit ID of the multi-camera unit 11 classified into each group, the surface for identifying each camera of the multi-camera unit 11, the internal parameters, the external parameters, the texture image acquisition information, and the depth image acquisition information supplied from the grouping unit 561. The group table generation unit 563 supplies the group table to the storage unit 58.

Through the foregoing process, the information of the surface for identifying the cameras belonging to each multi-camera unit 11 in addition to each of the plurality of multi-camera units 11 is grouped, and the global table and the group table are generated and stored in the storage 58.

(Configuration Example of Home Server in FIG. 31)

Figure 56:
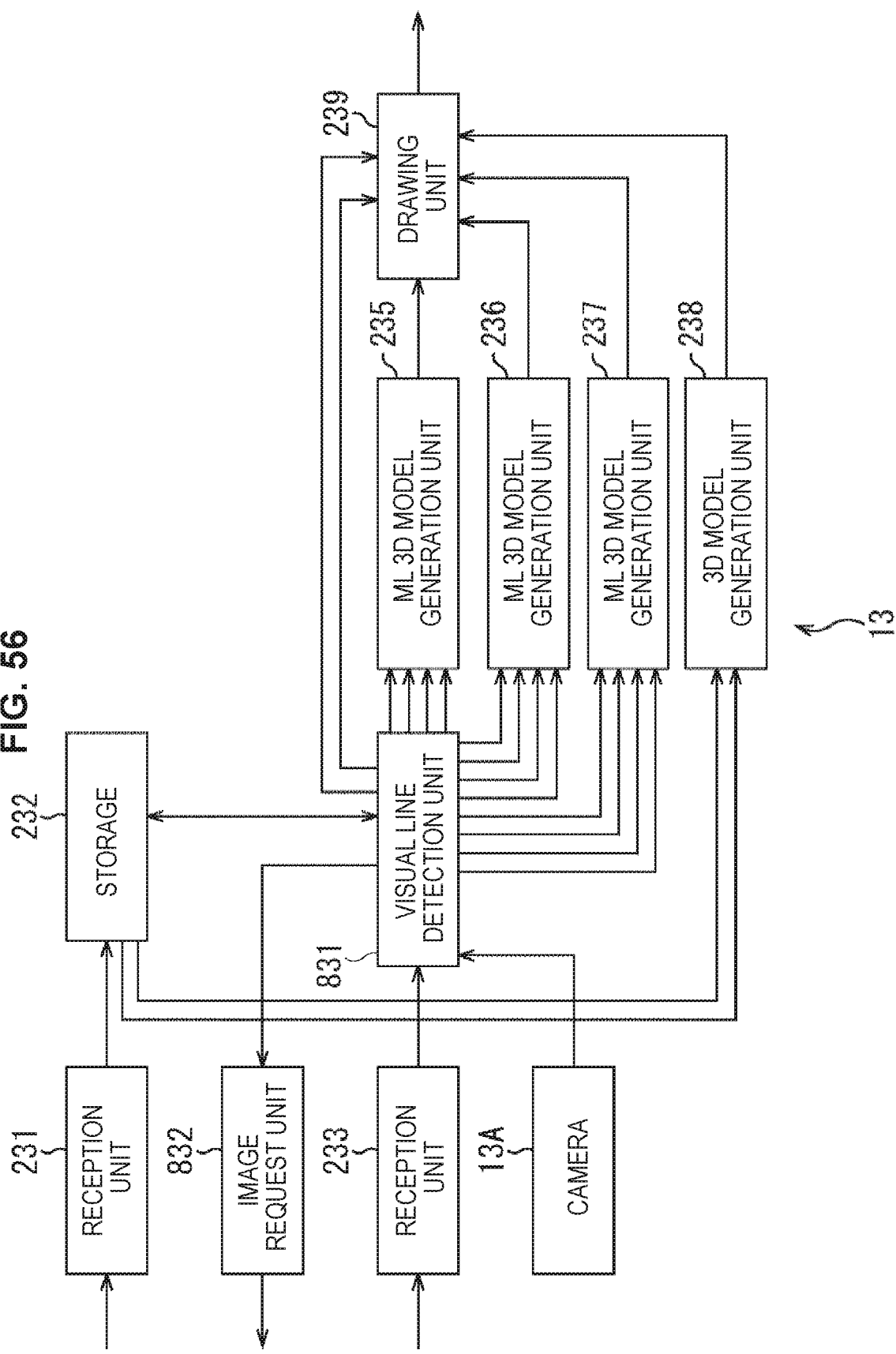
FIG. 56 is an explanatory diagram illustrating a configuration example of a selection unit in FIG. 31.

Next, a configuration example of the home server 502 in FIG. 31 will be described with reference to the block diagram of FIG. 56. Note that in the home server 502 in FIG. 56, the same reference numerals and the same names are given to configurations that have the same functions as those of the home server 13 in FIG. 19 and the description thereof will be appropriately omitted.

The home server 502 is different from the home server 13 in that a visual line detection unit 831 is provided instead of the visual line detection unit 234 and an image request unit 832 is newly provided.

The visual line detection unit 831 has the same functions as the visual line detection units 234 as basic functions, further decides information regarding selection surfaces which are three surfaces corresponding to visual line vectors closest to a visual line extending in a visual line direction from a viewing position among six surfaces on the basis of the viewing position and the visual line direction in the 3D model coordinate system and the table of the first layer, and supplies the information to the image request unit 832 in addition to the viewing position and the visual line direction.

When the viewing position, the visual line direction, and the information regarding the selection surface supplied from the visual line detection unit 831 are acquired, the image request unit 832 requests the selection surfaces which are the corresponding three surfaces in addition to the viewing position and the visual line direction from the content server 501.

The reception unit 231 receives the information regarding the selection surfaces in response to the request and stores the information in the storage 232. The visual line detection unit 831 reads the first layer texture stream, the first layer depth stream, the second layer texture stream, and the second layer depth stream corresponding to the three selection surfaces from the storage 232.

(Reproduction Process of FIG. 31)

A reproduction process by the image display system in FIG. 31 will be described with reference to the flowcharts of FIGS. 57 and 58. Note that the flowchart of FIG. 57 is a process of the home server 502 and the flowchart of FIG. 58 is a process of the content server 501.

Figure 57:
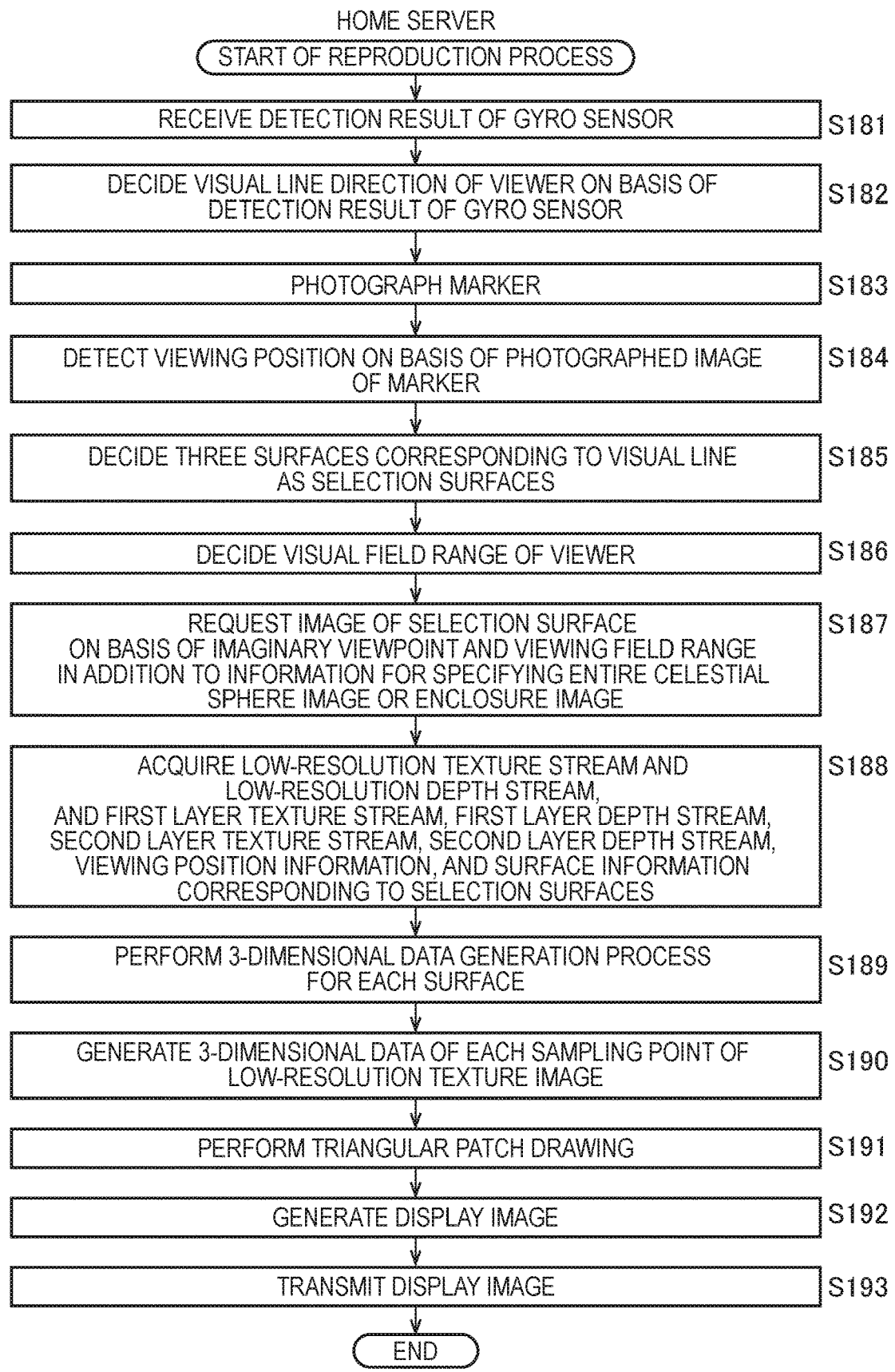
FIG. 57 is an explanatory flowchart illustrating a reproduction process of the home server in FIG. 31.
Figure 58:
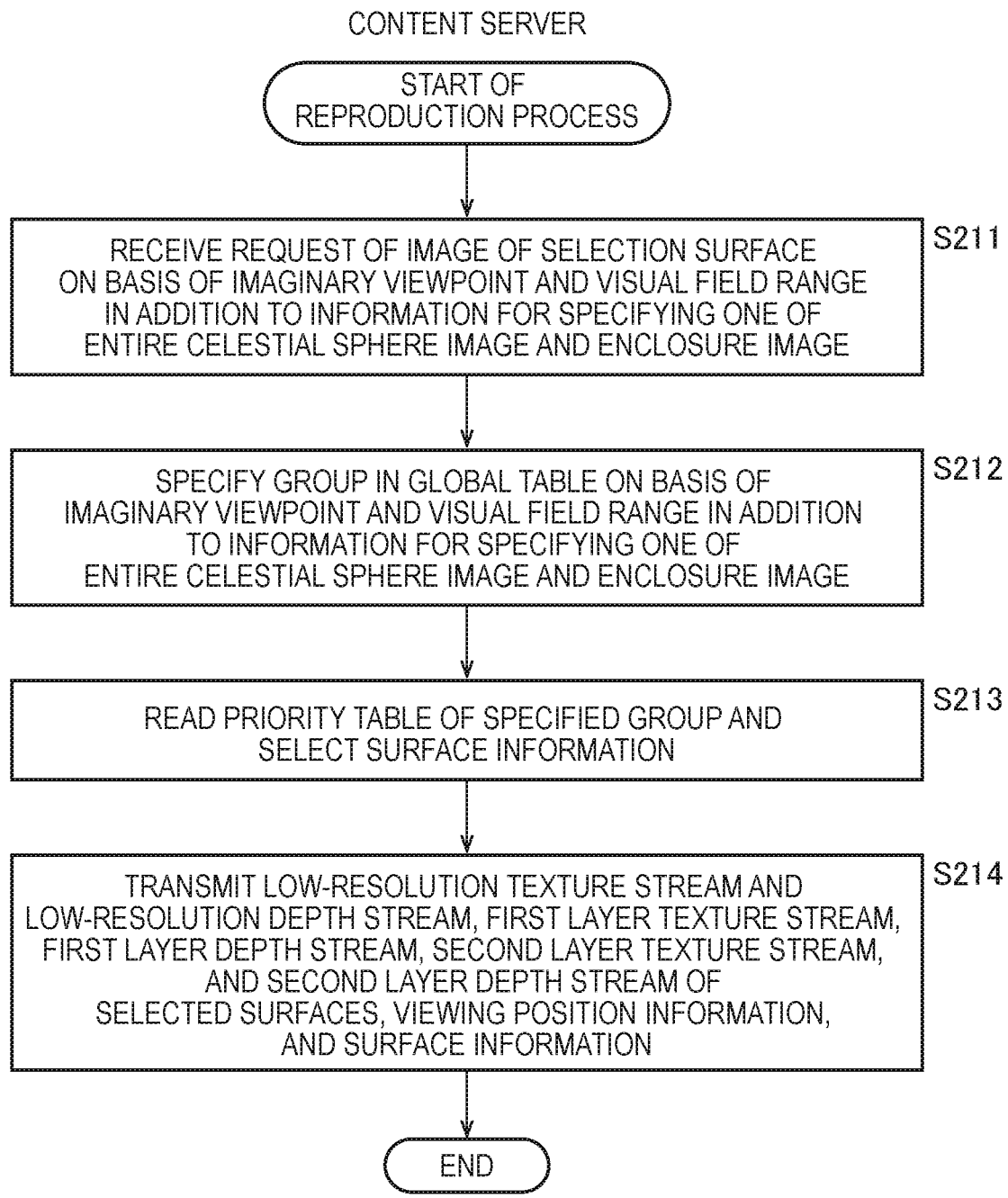
FIG. 58 is an explanatory flowchart illustrating a reproduction process of the content server in FIG. 31.

Note that processes of steps S181 to S186 and S189 to S193 in the flowchart of FIG. 57 are the same as the processes of steps S43 to S48 and steps S50 and S54 in the flowchart of FIG. 26, and thus the description thereof will be appropriately omitted.

That is, when the visual field range is decided through the processes of steps S181 to S186, the image request unit 832 requests the viewing position, the visual line direction, and images of the corresponding selection surface on the basis of the visual field range of a viewer serving as an imaginary viewpoint in step S187. At this time, the image request unit 832 also makes a request for selecting a type of image between the entire celestial sphere image and the enclosure image.

In response to the request, in step S211 (see FIG. 58), the global table acquisition unit 781 of the selection unit 553 acquires the global table supplied from the storage 58 and supplies the global table to the group selection unit 782.

In step S212, the group selection unit 782 selects a group including the selection surface by, for example, the scheme described with reference to FIG. 54 from all the groups on the basis of the viewing position and the visual line direction included in the request, the corresponding selection surface, and the global table supplied from the global table acquisition unit 781. The group selection unit 782 supplies the information regarding the selected group registered in the global table to the priority table acquisition unit 783.

In step S213, the priority table acquisition unit 783 (a camera information acquisition unit) acquires the priority table of the grid designated in accordance with the imaginary viewpoint in the priority table of the corresponding group on the basis of the group table acquisition information and supplies the requested information regarding the selection surface to the surface selection unit 784 on the basis of the priority depending on whether the image designated by the user is the entire celestial sphere image or the enclosure image.

In step S214, the surface selection unit 784 reads the first layer texture stream, the first layer depth stream, the second layer texture stream, and the second layer depth stream corresponding to the three selection surfaces in the information regarding the surfaces stored in the storage 58 among the information regarding the selection surfaces supplied from the group table acquisition unit 783 from the storage 232. The visual line detection unit 234 supplies the read first layer texture stream, first layer depth stream, second layer texture stream, and second layer depth stream to the transmission unit 60.

Through this process, in step S188, the reception unit 231 reads the first layer texture stream, the first layer depth stream, the second layer texture stream, and the second layer depth stream corresponding to the three selection surfaces from the storage 232. The visual line detection unit 234 causes the read first layer texture stream, first layer depth stream, second layer texture stream, and second layer depth stream to be stored in the storage 232.

The visual line detection unit 831 performs a process after the reading from the storage 232.

In a case in which the group is selected from the global table on the basis of the viewing position and the visual line direction through the foregoing process, the priority table of the selected group is, for example, the left part of FIG. 51, and display on the entire celestial sphere image is set, images of six surfaces PX1, NX1, PY1, NY1, PZ1, and NZ1 belonging to the multi-camera unit ID are selected while the multi-camera unit ID is set to 1 to 3, in the setting of the entire celestial sphere priority as illustrated in a left portion of the upper right part of FIG. 51, and the information regarding three surfaces which are the selection surfaces among these six surfaces is transmitted.

In addition, in a case in which display on the enclosure image is set, images of the surfaces PX1, NX2, and PX3 are selected in the setting of the enclosure priority, as illustrated in the lower right part of FIG. 51.

As a result, in the content server, the images photographed by the plurality of multi-camera units can be accumulated. Further, the images can be managed for each group with regard to each of the multi-camera unit and each of the cameras belonging to the multi-camera units.

In addition, the entire celestial sphere priority corresponding to the camera entire celestial sphere image and the enclosure priority corresponding to the enclosure image can be set in each group and can be delivered to the home server in association with the viewing position and the visual line direction.

At this time, reproduction in the home server can be realized when the content server transmits only the image data of the surfaces in response to a request for the images based on the viewing position and the visual line direction from the home server. Further, since only the image data of the surface in response to the request for the images based on the viewing position and the visual line direction from the home server is transmitted, it is possible to reduce a storage capacity or a processing speed requested for hardware in the home server and it is possible to reduce a transmission band. Further, when the image data is transmitted, the image data of the same surfaces photographed by the plurality of multi-camera units 11 can be transmitted in the plurality of layers, and thus it is possible to generate the 3-dimensional data with higher precision.

Fourth Embodiment (Explanation of Computer to which Present Embodiment is Applied)

A series of processes described above can be executed by hardware or software. When a series of processes is executed by software, a program constituting the software is installed in a computer. Here, examples of the computer include a computer incorporated in dedicated hardware and a general-purpose personal computer which is capable of executing various kinds of functions when various kinds of programs are installed therein.

Figure 59:
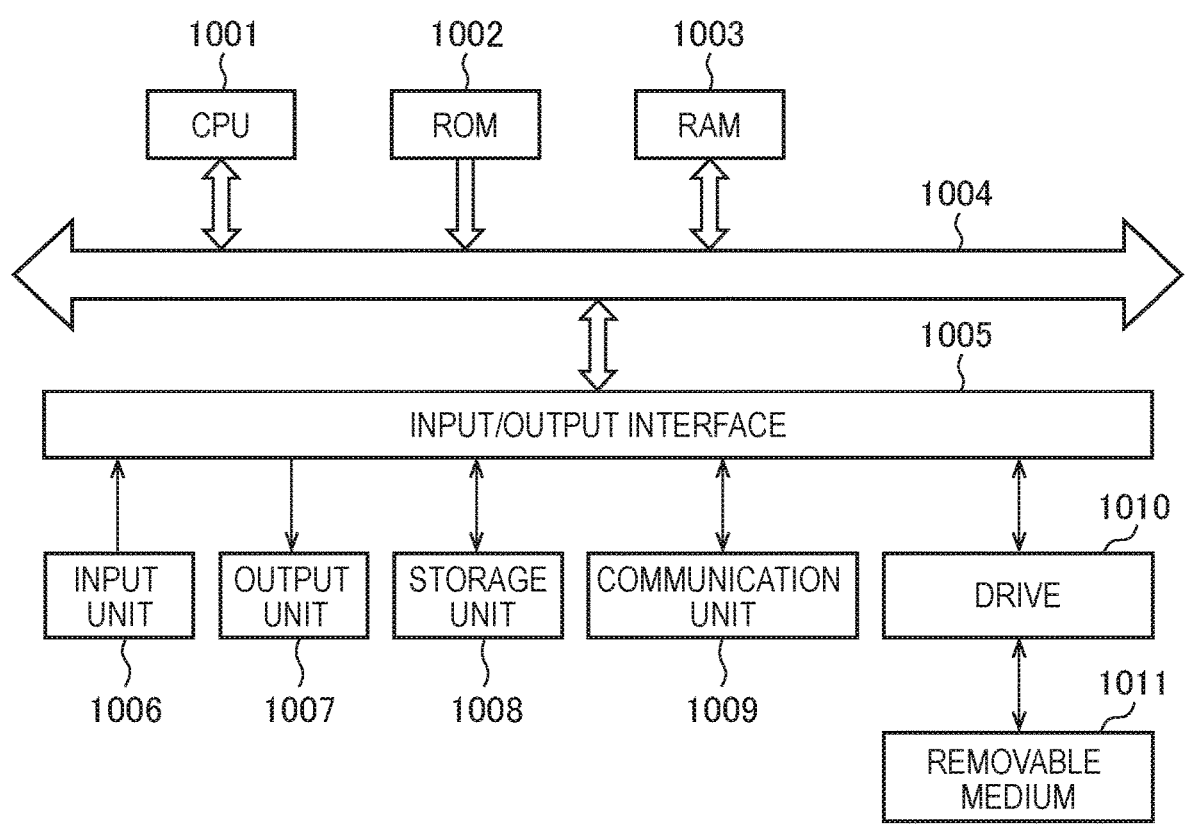
FIG. 59 is a block diagram illustrating a hardware configuration example of a computer.

FIG. 59 is a block diagram illustrating an exemplary hardware configuration of a computer that executes a series of processing described above by a program.

In the computer in FIG. 59, a central processing unit (CPU) 1001, a read only memory (ROM) 1002, and a random access memory (RAM) 1003 are connected to one another by a bus 1004.

An input/output interface 1005 is further connected to the bus 1004. An input unit 1006, an output unit 1007, a storage unit 1008, a communication unit 1009, and a drive 1010 are connected to the input/output interface 1005.

The input unit 1006 includes a keyboard, a mouse, a microphone, or the like. The output unit 1007 includes a display, a speaker, or the like. The storage unit 1008 includes a hard disk, a nonvolatile memory, or the like. The communication unit 1009 includes a network interface or the like. The drive 1010 drives a removable medium 1011 such as a magnetic disk, an optical disk, a magneto-optical disk, or a semiconductor memory.

In the computer 1000 configured as described above, the CPU 1001 loads a program that is stored, for example, in the storage unit 1008 onto the RAM 1003 via the input/output interface 1005 and the bus 1004, and executes the program. Thus, the above-described series of processing is performed.

Programs to be executed by the computer (the CPU 1001) are provided being recorded in the removable medium 1011 which is a packaged medium or the like. Also, programs may be provided via a wired or wireless transmission medium, such as a local area network, the Internet or digital satellite broadcasting.

In the computer in FIG. 59, by inserting the removable medium 1011 into the drive 1010, the program can be installed in the storage unit 1008 via the input/output interface 1005. Further, the program can be received by the communication unit 1009 via a wired or wireless transmission medium and installed in the storage unit 1008. Moreover, the program can be installed in advance in the ROM 1002 or the storage unit 1008.

It should be noted that the program executed by the computer in FIG. 59 may be a program that is processed in time series according to the sequence described in this specification or a program that is processed in parallel or at necessary timing such as upon calling.

Application Example

The technology according to the present disclosure can be applied to various products. For example, the technology according to the present disclosure is implemented as apparatuses mounted on any type of mobile bodies such as automobiles, electric vehicles, hybrid electric vehicles, motorcycles, bicycles, personal mobilities, airplanes, drones, ships, robots, construction machines, and agricultural machines (tractors).

FIG. 60 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 60, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 60 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 61 depicts an example of installation positions of the imaging section 7410 and the outside-vehicle information detecting section 7420. Imaging sections 7910, 7912, 7914, 7916, and 7918 are, for example, disposed at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 61 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 60, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 60, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 60 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Note that a computer program for realizing each function of the image display system 10 (400) according to the present embodiment described using FIG. 1 to FIG. 59 can be implemented on any control unit, or the like. Further, it is also possible to provide a computer readable recording medium in which such a computer program is stored. The recording medium is, for example, a magnetic disk, an optical disk, a magnetooptical disk, a flash memory, or the like. Further, the above-described computer program may be delivered, for example, via a network without using a recording medium.

In the above-described vehicle control system 7000, the image display system 10 (400) according to the embodiment described with reference to FIG. 1 FIGS. 1, 2, 3A, 3B, 4A, 4B, 5A, 5B, 6, 7, 8A, 8B, 9, 10, 11, 12A, 12B, 12C, 13A, 13B, 13C, 14A, 14B, 15, 16A, 16B, 17, 18, 19, 20, 21A, 21B, 22, 23A, 23B, 24A, 24B, 25A, 25B, 26, 27, 28, 28, 29, 30A, 30B, 31, 32, 33, 34, 35, 36, 37, 38, 39, 40, 41, 42, 43, 44, 45, 46, 47, 48A, 48B, 48C, 49A, 49B, 50, 51, 52, 53, 54, 55, 56, 57, and 58 can be applied to the vehicle control system 7000 according to the application example illustrated in FIG. 60. For example, the multi-camera unit 11 of the image display system 10 (400) is equivalent to at least a part of the imaging section 7410. In addition, the content server 12, the home server 13 (the delivery server 401, the network 402, and the reproduction device 403), and the conversion device 14 are integrated to be equivalent to the microcomputer 7610 and the storage section 7690 of the integrated control unit 7600. The head mount display 15 is equivalent to the display section 7720. Note that in a case in which the image display system 10 (400) is applied to the vehicle control system 7000, the camera 13A, the marker 15A, and the gyro sensor 15B are not provided and a visual line direction and a viewing position of a viewer are input through a manipulation of the input section 7800 of an occupant who is a viewer. As described above, by applying the image display system 10 (400) to the vehicle control system 7000 according to the application example illustrated in FIG. 60, it is possible to generate a display image with high quality using the entire celestial sphere image.

Further, at least part of components of the image display system 10 (400) described using FIGS. 1, 2, 3A, 3B, 4A, 4B, 5A, 5B, 6, 7, 8A, 8B, 9, 10, 11, 12A, 12B, 12C, 13A, 13B, 13C, 14A, 14B, 15, 16A, 16B, 17, 18, 19, 20, 21A, 21B, 22, 23A, 23B, 24A, 24B, 25A, 25B, 26, 27, 28, 28, 29, 30A, 30B, 31, 32, 33, 34, 35, 36, 37, 38, 39, 40, 41, 42, 43, 44,

45, 46, 47, 48A, 48B, 48C, 49A, 49B, 50, 51, 52, 53, 54, 55, 56, 57, 58, and 59 may be realized at a module for the integrated control unit 7600 (for example, an integrated circuit module configured with one die) illustrated in FIG. 60. Alternatively, the image display system 10 (400) described using FIGS. 1, 2, 3, 4A, 4B, 5A, 5B, 6, 7, 8A, 8B, 9, 10, 11, 12A, 12B, 12C, 13, 14A, 14B, 15, 16A, 16B, 17, 18, 19, 20, 21A, 21B, 22, 23A, 23B, 24A, 24B, 25A, 25B, 26, 27, 28, 29, 30A, and 30B may be realized with a plurality of control units of the vehicle control system 7000 illustrated in FIG. 60.

In the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

The advantageous effects described in the present specification are merely examples and are not limitative, and other advantageous effects may be achieved.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

Additionally, the present technology may also be configured as below.

<1>

An image processing device including:

a grouping unit configured to classify a plurality of cameras that acquire texture images necessary to generate 3-dimensional data of a subject into a plurality of groups; and a priority setting unit configured to set a priority of the plurality of cameras for each of the plurality of groups.

<2>

The image processing device according to <1>, further including:

a group selection unit configured to receive a request for the texture images which are based on a viewing position and a visual line direction of a viewer, correspond to a visual field range of the viewer, and are necessary to generate the 3-dimensional data of the subject, and select the group of cameras that acquire the texture images including the subject within the visual field range of the viewer among the plurality of groups; and an image selection unit configured to select the texture images corresponding to the visual field range of the viewer in accordance with the priority of the cameras in the group selected by the group selection unit, and transmit the texture images.

<3>

The image processing device according to <1> or <2>, further including:

an evaluation unit configured to calculate an evaluation value of disposition of the cameras with regard to the generation of the 3-dimensional data, on the basis of disposition of the cameras that photograph the texture images used to generate the 3-dimensional data of the subject, for each of the groups of the plurality of cameras that acquire the texture images including the subject and are classified into the plurality of groups, in which the priority setting unit sets the priority of the cameras on the basis of the evaluation value for each of the groups.

<4>

The image processing device according to <3>, in which the texture images necessary to generate the 3-dimensional data of the subject include an entire celestial sphere image and an enclosure image, and the priority setting unit sets an entire celestial sphere priority which is a priority of the plurality of cameras in a case of the entire celestial sphere image and sets an enclosure priority which is a priority of the plurality of cameras in a case of the enclosure image for each of the groups on the basis of the evaluation value.

<5>

The image processing device according to <4>, in which a request received by the reception unit includes information designating one of the entire celestial sphere image and the enclosure image, in a case in which the request includes the information designating the entire celestial sphere image, the image selection unit selects the texture images which are necessary to generate the entire celestial sphere image and correspond to the visual field range of the viewer in accordance with the entire celestial sphere priority of the cameras in the group selected by the group selection unit, and transmits the texture images, and in a case in which the request includes the information designating the enclosure image, the image selection unit selects the texture images which are necessary to generate the enclosure image and correspond to the visual field range of the viewer in accordance with the enclosure priority of the cameras in the group selected by the group selection unit, and transmits the texture images.

<6>

The image processing device according to <4>, in which the plurality of cameras are included in a plurality of multi-camera units that perform photographing in a plurality of directions, and the grouping unit classifies not only the plurality of cameras that acquire the texture images necessary to generate the 3-dimensional data of the subject but also the multi-camera units into the plurality of groups.

<7>

The image processing device according to <6>, in which the priority setting unit sets the entire celestial sphere priority of the plurality of cameras in units of the multi-camera units for each of the plurality of groups on the basis of the evaluation value.

<8>

The image processing device according to any one of <1> to <7>, in which the grouping unit classifies the plurality of cameras into the plurality of groups on the basis of positions of the plurality of cameras.

<9>
The image processing device according to <8>, further including:
a group information generation unit configured to generate group information regarding each of the plurality of groups,
in which the group information is information indicating a centroid position of a region including the cameras classified into the group.

<10>
The image processing device according to any one of <1> to <9>,
in which the grouping unit classifies the cameras corresponding to the texture images into the groups for each 3-dimensional object corresponding to the 3-dimensional data generated using the texture images.

<11>
The image processing device according to <10>, further including:
a group information generation unit configured to generate group information regarding each of the plurality of groups,
in which the group information is information indicating the 3-dimensional object corresponding to the group.

<12>
The image processing device according to <1> to <11>,
in which the grouping unit classifies the cameras corresponding to the texture images into the groups for each 3-dimensional space corresponding to the 3-dimensional data generated using the texture images.

<13>
The image processing device according to <12>, further including:
a group information generation unit configured to generate group information regarding each of the plurality of groups,
in which the group information is information indicating the 3-dimensional space corresponding to the group.

<14>
An image processing method including steps of:
classifying a plurality of cameras that acquire texture images necessary to generate 3-dimensional data of a subject into a plurality of groups; and
setting a priority of the plurality of cameras for each of the plurality of groups.

<15>
An image processing device including:
a transmission unit configured to transmit a request for texture images which are based on a viewing position and a visual line direction of a viewer, correspond to a visual field range of the viewer, and are necessary to generate the 3-dimensional data of a subject; and
a reproduction unit configured to reproduce the texture images selected and transmitted in accordance with a priority set in a plurality of cameras selected as a group corresponding to a visual field range of the viewer on the basis of the request and belonging to the group among a plurality of groups into which the plurality of cameras that acquire the texture images necessary to generate the 3-dimensional data of the subject are classified.

<16>
The image processing device according to <15>, in which the request includes information designating one of the entire celestial sphere image and the enclosure image.

<17>
An image processing method including steps of:
transmitting a request for texture images which are based on a viewing position and a visual line direction of a viewer, correspond to a visual field range of the viewer, and are necessary to generate 3-dimensional data of a subject; and
reproducing the texture images selected and transmitted in accordance with a priority set in a plurality of cameras selected as a group corresponding to a visual field range of the viewer on the basis of the request and belonging to the group among a plurality of groups into which the plurality of cameras that acquire the texture images necessary to generate the 3-dimensional data of the subject are classified.

REFERENCE SIGNS LIST 12 content server
13 home server
52 first layer generation unit
54 second layer generation unit
57 metadata generation unit
239 drawing unit
256 3D model generation unit
261 occlusion processing unit
403 reproduction device
501 content server
502 home server
551 grouping unit
552 priority setting unit
523 selection unit
561 grouping unit
562 global table generation unit
563 group table generation unit
651 evaluation unit
652 priority determination unit
671 division unit
672 projection unit
673 determination unit
674 computation unit
675 calculation unit
781 global table acquisition unit
782 group selection unit
783 priority table acquisition unit
784 surface selection unit

The invention claimed is:
1. An image processing device, comprising:
a central processing unit (CPU) configured to:
classify a plurality of cameras into a plurality of groups, wherein the plurality of cameras acquires a plurality of texture images necessary to generate 3-dimensional data of a subject;
calculate an evaluation value of disposition of the plurality of cameras, with regard to the generation of the 3-dimensional data, wherein
the evaluation value is calculated based on the disposition of the plurality of cameras that photograph the plurality of texture images,
the plurality of texture images is used for the generation of the 3-dimensional data of the subject, and
the evaluation value is calculated for each group of the plurality of groups of the plurality of cameras; and
set a priority level for cameras of each group of the plurality of groups, based on the calculated evaluation value for each group of the plurality of groups.

2. The image processing device according to claim 1, wherein the CPU is further configured to:
receive a request for the plurality of texture images, based on a viewing position and a visual line direction of a viewer,
wherein the viewing position and the visual line direction of the viewer correspond to a visual field range of the viewer;
select, from the plurality of groups, a group of cameras that acquire the plurality of texture images including the subject, from within the visual field range of the viewer;
select the plurality of texture images corresponding to the visual field range of the viewer based on the priority level of cameras in the selected group of cameras; and
transmit the plurality of texture images.

3. The image processing device according to claim 1, wherein
the plurality of texture images includes an entire celestial sphere image and an enclosure image, and
the CPU is further configured to:
set an entire celestial sphere priority level for cameras of each group of the plurality of groups, based on the entire celestial sphere image and the evaluation value; and
set an enclosure priority level for cameras of each group of the plurality of groups, based on the enclosure image and the evaluation value.

4. The image processing device according to claim 3, wherein
the CPU is further configured to receive a request including information which designates one of the entire celestial sphere image and the enclosure image,
when the request includes the information which designates the entire celestial sphere image, the CPU is further configured to:
select the plurality of texture images which are necessary to generate the entire celestial sphere image, wherein the plurality of texture images correspond to a visual field range of a viewer based on the entire celestial sphere priority level of cameras in a selected group of the plurality of groups; and
transmit the plurality of texture images; and
when the request includes the information which designates the enclosure image, the CPU is further configured to:
select the plurality of texture images which are necessary to generate the enclosure image, wherein the plurality of texture images correspond to the visual field range of the viewer based on the enclosure priority level of cameras in the selected group; and
transmit the plurality of texture images.

5. The image processing device according to claim 3, wherein
the plurality of cameras is included in a plurality of multi-camera units that perform photographing in a plurality of directions, and
the CPU is further configured to classify the plurality of multi-camera units into a plurality of multi-camera groups.

6. The image processing device according to claim 5, wherein the CPU is further configured to set the entire celestial sphere priority level of cameras in each multi-camera unit of the plurality of multi-camera units, for each of the plurality of multi-camera groups, based on the evaluation value.

7. The image processing device according to claim 1, wherein the CPU is further configured to classify the plurality of cameras into the plurality of groups based on positions of the plurality of cameras.

8. The image processing device according to claim 7, wherein
the CPU is further configured to generate group information regarding each group of the plurality of groups, and
the group information is information indicating a centroid position of a region including cameras classified into a group of the plurality of groups.

9. The image processing device according to claim 1, wherein a group of the plurality of groups is for a 3-dimensional object corresponding to the 3-dimensional data.

10. The image processing device according to claim 9, wherein
the CPU is further configured to generate group information regarding each group of the plurality of groups, and
the group information is information indicating the 3-dimensional object corresponding to a respective group.

11. The image processing device according to claim 1, wherein a group of the plurality of groups is for a 3-dimensional space corresponding to the 3-dimensional data.

12. The image processing device according to claim 11, wherein
the CPU is further configured to generate group information for each group of the plurality of groups, and
the group information is information indicating the 3-dimensional space corresponding to a respective group.

13. An image processing method, comprising:
classifying a plurality of cameras into a plurality of groups, wherein the plurality of cameras acquires a plurality of texture images necessary to generate 3-dimensional data of a subject;
calculating an evaluation value of disposition of the plurality of cameras, with regard to the generation of the 3-dimensional data, wherein
the evaluation value is calculated based on the disposition of the plurality of cameras that photograph the plurality of texture images,
the plurality of texture images is used for the generation of the 3-dimensional data of the subject, and
the evaluation value is calculated for each group of the plurality of groups of the plurality of cameras; and
setting a priority level for cameras of each group of the plurality of groups, based on the calculated evaluation value for each group of the plurality of groups.

14. An image processing device, comprising:
a central processing unit (CPU) configured to:
transmit a request for a plurality of texture images which are based on a viewing position and a visual line direction of a viewer, wherein
the viewing position and the visual line direction correspond to a visual field range of the viewer,
the request includes information which designates an entire celestial sphere image, and
the plurality of texture images is necessary to generate 13-dimensional data of a subject; and
reproduce the plurality of texture images based on the request and a priority level set in a plurality of cameras selected as a group, wherein
the group is selected based on the visual field range of the viewer, the plurality of cameras acquires the plurality of texture images necessary to generate the 3-dimensional data of the subject, and the group is one of a plurality of groups into which the plurality of cameras is classified.

15. An image processing method, comprising:

transmitting a request for a plurality of texture images which are based on a viewing position and a visual line direction of a viewer, wherein the viewing position and the visual line direction correspond to a visual field range of the viewer, the request includes information which designates an entire celestial sphere image, and the plurality of texture images is necessary to generate 3-dimensional data of a subject; and reproducing the plurality of texture images based on the request and a priority level set in a plurality of cameras which are selected as a group, wherein the group is selected based on the visual field range of the viewer, the plurality of cameras acquires the plurality of texture images necessary to generate the 3-dimensional data of the subject, and the group is one of a plurality of groups into which the plurality of cameras is classified.

* * * * *